United States Patent
Sudo et al.

(10) Patent No.: US 6,932,476 B2
(45) Date of Patent: Aug. 23, 2005

(54) STEREOSCOPIC IMAGE DISPLAY APPARATUS AND STEREOSCOPIC IMAGE DISPLAY SYSTEM

(75) Inventors: Toshiyuki Sudo, Tokyo (JP); Hiroshi Nishihara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 10/665,301

(22) Filed: Sep. 18, 2003

(65) Prior Publication Data

US 2004/0056824 A1 Mar. 25, 2004

(30) Foreign Application Priority Data

Sep. 20, 2002 (JP) ........................................ 2002-275223
Dec. 6, 2002 (JP) ........................................ 2002-355059

(51) Int. Cl.[7] .............................................. G03B 21/00
(52) U.S. Cl. .......................................... 353/7; 359/462
(58) Field of Search ............................ 353/7; 359/462; 348/51, 54, 55, 159; 345/6

(56) References Cited

U.S. PATENT DOCUMENTS

| | | | | |
|---|---|---|---|---|
| 3,814,513 A | * | 6/1974 | Nims et al. ............... | 353/7 |
| 5,855,425 A | * | 1/1999 | Hamagishi ............... | 353/7 |
| 5,936,767 A | * | 8/1999 | Favalora ............... | 359/462 |
| 6,195,069 B1 | * | 2/2001 | Rhoads ............... | 345/6 |
| 2004/0041747 A1 | * | 3/2004 | Uehara et al. ............... | 345/6 |

FOREIGN PATENT DOCUMENTS

JP  11-103474  4/1999  .......... H04N/13/04

OTHER PUBLICATIONS

Honda, et al. "Three–Dimensional display technologies satisfying super multiview condition" SPIE Critical Reviews vol. CR76.

* cited by examiner

Primary Examiner—W. B. Perkey
(74) Attorney, Agent, or Firm—Morgan & Finnegan, LLP

(57) ABSTRACT

A stereoscopic image display apparatus which can reproduce two-dimensional images of high resolution corresponding to a number of viewpoints, for displaying a three-dimensional image, by using a minimized number of light sources. The stereoscopic image display apparatus comprises a light deflection member which has a deflection element deflecting a light beam from a light source unit to form a convergence point, and a beam scanning device which two-dimensionally scans the light beam from the light source unit with respect to the light deflecting member. The light deflection member is movable. The movement of the light deflection member is preformed in synchronization with modulation of the light beam by the light source unit and the scanning of the light beam by the beam scanning device.

35 Claims, 45 Drawing Sheets

PRIOR ART

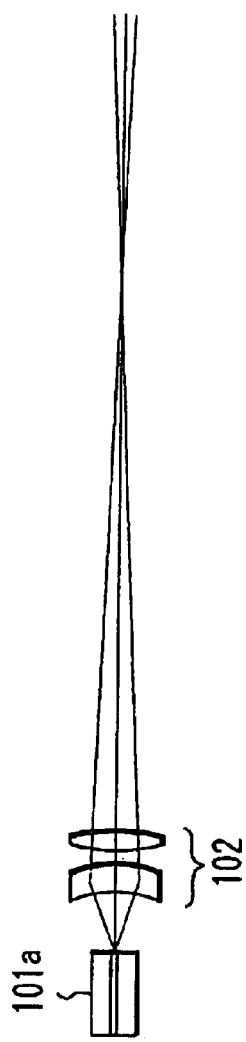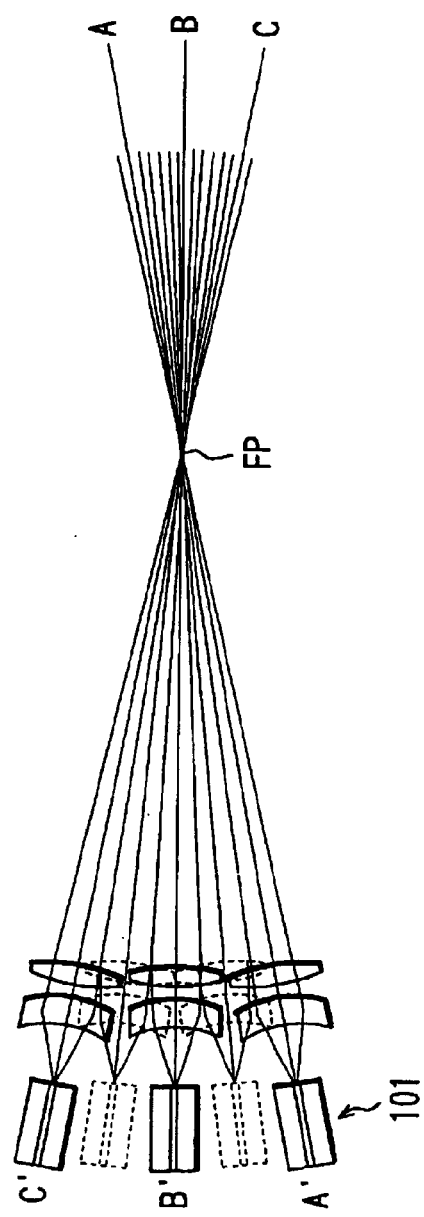
FIG.53 (A)
FIG.53 (B)
PRIOR ART

PRIOR ART

PRIOR ART

STEREOSCOPIC IMAGE DISPLAY APPARATUS AND STEREOSCOPIC IMAGE DISPLAY SYSTEM

BACKGROUND OF THE INVENTION

1. Field of the Invention

The present invention relates to a stereoscopic image display apparatus which provides a stereoscopic image observable three-dimensionally.

2. Description of Related Art

Conventionally, various attempts have been made to reproduce and display a three-dimensional image. Of the attempts, a widely used approach is to utilize binocular parallax to provide an observer with stereoscopic vision. However, a parallax image provided for an observer in the typical approach using binocular parallax is a two-dimensional image. When such a two-dimensional image is observed, a focal point for an observed object adjusted in the eyeballs of an observer is fixed to the two-dimensional image plane, so that a contradiction arises between stereoscopic recognition by the function of adjusting the focal point in the eyeballs and stereoscopic recognition by the binocular parallax, and thus the observer often feels fatigued and irritated. For this reason, several approaches have been studied which do not rely only on the binocular parallax but make use of the stereoscopic recognition function provided by the eyeballs.

As one of those methods, Telecommunications Advancement Organization of Japan issued "Final Outcome Reports of Advanced Stereoscopic Motion Picture Communication Project" in 1997. In Section 8 of Chapter 3 of this document, "Studies of Stereoscopic Vision of Super-Multiview Regions" describes that, in displaying a stereoscopic image of "super-multiview regions" for displaying parallax images from a multiplicity of viewpoints corresponding to small angle increments in parallax such that a plurality of parallax images are incident on the pupil of a single eye of an observer, a focal point adjusted by the eyes of the observer is brought near a pseudo-stereoscopic image induced by binocular parallax to reduce fatigue and irritation of the observer.

In other words, the Report remarks that stereoscopic display with less fatigue of the eyes can be achieved through "a monocular parallax effect" when the conventional method of displaying stereoscopic images captured on two viewpoints to the two eyes of an observer is extended to a method of presenting parallax images captured on n viewpoints to the single eye of an observer keeping a distance between two adjacent points of the n viewpoints is set to be smaller than the pupil of the observer.

In addition, "Research and Development of Multiview Stereoscopic Display with Focused Light Array (FLA)" in Section 6 of Chapter 3 of the Report shows a specific example for putting the theory into practice. FIG. 52 shows the structure of the specific example. In FIG. 52, reference numeral 101 shows an FLA which has the structure as shown in FIGS. 53(A) and 53(B).

The FLA 101 has a plurality of units, each of which is shown in FIG. 53(A). In each unit, light from a light source 101*a* such as a semiconductor laser is shaped into thin luminous flux by an optical system 102. Such units are arranged in arc form as shown in FIG. 53(B) to constitute the FLA 101 which converges all luminous flux to the center (a focal point FP) of the circle.

As shown in FIG. 52, the focal point FP thus formed is again formed into an image on a vertical diffuser 106 through optical systems 102 and 105, and two-dimensional scanning is performed at high speed by scanning systems 103 and 104 to form a two-dimensional image 108. When the scanning is performed in a cycle shorter than the permissible time of persistence of vision (after image) of an observer 107 (equal to or smaller than approximately 1/50 seconds), the image can be observed without flicker.

It is presumed that a focal point at an instant forms each pixel of the two-dimensional image, and the respective pixels serve as bright points from which light rays emerge in different directions corresponding to the number of the light sources. The direction in which a light ray emerges can be determined by selecting which light source emits light. Since the light ray emerging directions are different from one another by a very small angle, two or more different light rays are incident on the pupil of an observer at the position of observation.

In other words, according to the structure, the light sources are provided corresponding to the number of viewpoints for observing a two-dimensional image, and the number of the light sources can be increased to sufficiently reduce the distance between adjacent focal points for reproducing the two-dimensional image, thereby allowing a plurality of parallax images to be incident on a single eye of the observer. It is thus possible to display a stereoscopic image of the "super-multiview regions" in which a plurality of parallax image light rays are incident on the single eye of the observer, and the focal point adjusted in the eyes of the observer is brought near the stereoscopic image, so that fatigue or irritation of the observer can be reduced.

Japanese Patent Application Laid-Open No. H11-103474 (No. 1999-103474) discloses a stereoscopic image display apparatus based on the similar principle. FIG. 54 is a conceptual view of the stereoscopic image display apparatus proposed in Japanese Patent Application Laid-Open No. H11-103474 (No. 1999-103474). In FIG. 54, reference numeral 111 shows a modulation signal generator, 112 a start sensor which detects a start timing of beam scanning, 113 a semiconductor laser driving circuit, 114 a motor control circuit, 115 a semiconductor laser (light source), 116 a collimator lens, 117 a polygon mirror for laser beam scanning in a main scanning direction, 118 an fθ lens, 119 a first cylindrical lens array which deflects a laser beam in the main scanning direction, 121 a galvano mirror for laser beam scanning in a sub-scanning direction, 120 a motor which rotates the galvano mirror 121, 122 a second cylindrical lens array which diffuses a laser beam in a vertical direction, and 123 an observer.

The basic structure of the stereoscopic image display apparatus is the same as that of the stereoscopic image display apparatus shown in FIG. 52. However, the former differs from the latter in that the single laser light source 115 is used and the cylindrical lens array 119 with a periodic structure in the main scanning direction is arranged near the surface on which two-dimensional image information should be formed by laser beam scanning.

In such a structure, the emerging direction of the laser beam from the cylindrical lens array 119 is changed depending on the position of the incidence of the beam. Thereby, beam deflection is repetitively performed a number of times only by laser beam scanning on the cylindrical lens array 119 in the main scanning direction.

FIG. 55 shows how the deflection is achieved. A laser beam a perpendicular to the cylindrical lens array 119 is incident on the array 119 at a position at a large field angle, so that the laser beam is deflected in a direction designated with a' after it passes through the focal point of the cylindrical lens. After a very short time period, as a laser beam b is incident on the cylindrical lens at a position shown in FIG. 55, the beam is deflected by a smaller deflection angle and emerges in a direction designated with b'. Similarly, laser beams c and d are deflected in directions designated with C' and d' in FIG. 55, respectively.

As described above, while the bright points (pixels) are formed corresponding to the number of the light sources in the stereoscopic image display apparatus shown in FIG. 52, the same number of bright points (pixels) are formed by the scanning with the single laser beam in the stereoscopic image display apparatus shown in FIG. 54.

Specifically, as the laser beam is incident on the cylindrical lens array 119, the beam is focused for each of the element lenses constituting the cylindrical lens array 119. Thus, the scanning with the laser beam once on the cylindrical lens array 119 can reproduce a two-dimensional image associated with viewpoints of which the number is equal to the number of the element lenses. This eliminates the need to provide light sources and associated driving circuits or the like corresponding to the number of the viewpoints to enable display of a number of parallax images required for stereoscopic display of the "super-multiview regions" with a simple structure.

The apparatus proposed in Japanese Patent Application Laid-Open No. 11-103474 (No. 1999-103474), however, has the following disadvantages.

As shown in FIG. 54, when the single light source is used to reproduce two-dimensional images associated with the plurality of viewpoints, the number of the reproduced two-dimensional images is the same as the number of the element lenses constituting the cylindrical lens array 119. However, if the number of the element lenses constituting the cylindrical lens array 119 is increased to increase the number of two-dimensional images, each element lens gets smaller and has an insufficient size with respect to the diameter of the laser beam used.

FIG. 56 shows an element lens 119a which has an insufficient size for the diameter of the laser beam. In the case shown in FIG. 56, the laser beam diameter is increased after it passes through the element lens. Each laser beam represents a pixel of the reproduced tow-dimensional image. However laser beam with a diameter larger than a pupil of an eyeball of an observer cannot represents a pixel independent of other laser beams to the observer. Then stereoscopic display in "super-multiview regions", in which a plurality of beams representing pixels must incident into an eyeball of an observer independently of each other, cannot be achieved.

SUMMARY OF THE INVENTION

It is an object of the present invention to provide a stereoscopic image display apparatus which can reproduce two-dimensional images corresponding to a number of viewpoints by using a minimal number of light sources and can prevent a reduction in resolution of the reproduced two-dimensional images, and a stereoscopic image display system which has the stereoscopic image display apparatus.

To achieve the aforementioned object, according to one aspect of the present invention, a stereoscopic image display apparatus comprises a light source unit which modulates and emits a light beam having directivity, a light deflection member which has a deflection element which deflects the light beam from the light source unit to form a convergence point, and a beam scanning device which two-dimensionally scans the light beam from the light source unit with respect to a predetermined portion of the light deflection member. The light deflection member is movable in a plane in which the light deflection member is disposed. The movement of the light deflection member is performed in synchronization with the modulation of the light beam by the light source unit and the scanning of the light beam by the light beam scanning device.

According to another aspect of the present invention, a stereoscopic image display apparatus comprises a light source unit which modulates and emits a light beam having directivity, a light deflection member which has a deflection element which deflects the light beam incident from the light source unit to form a convergence point, a relay optical system which forms an image from the light beam emerging from the light deflection member and passing through the convergence point. The apparatus also comprises a first beam scanning device which horizontally scans the light beam emerging from the light source unit with respect to the light deflection member, and a second beam scanning device which vertically scans the light beam emerging from the light deflection member with respect to the relay optical system. The light deflection member is movable in a plane in which the light deflection member is disposed. The movement of the light deflection member is performed in synchronization with the modulation of the light beam by the light source and the scanning with the light beam by the first and second beam scanning devices.

According to another aspect of the present invention, a stereoscopic image display apparatus comprises a light source unit which modulates and emits a light beam having directivity, a light deflection member which has a plurality of deflection elements, each of which deflects the light beam from the light source unit to form a convergence point and a beam scanning device which two-dimensionally scans the light beam from the light source unit with respect to a predetermined portion of the light deflection member. The plurality of deflection elements are arranged in the light deflection member such that the number of the convergence points formed in a horizontal direction is larger than the number of the deflection elements arranged in the horizontal direction.

These and other characteristics of the stereoscopic image display apparatus and the stereoscopic image display system according to the present invention will be apparent from the following description of specific embodiments with reference to the drawings.

BRIEF DESCRIPTION OF THE DRAWINGS

FIG. 53 shows a light source array used in the stereoscopic image display apparatus in FIG. 52;

DETAILED DESCRIPTION OF THE PREFERRED EMBODIMENTS

Preferred embodiments of the present invention are hereinafter described with reference to the drawings.

(Embodiment 1)

Figure 1:
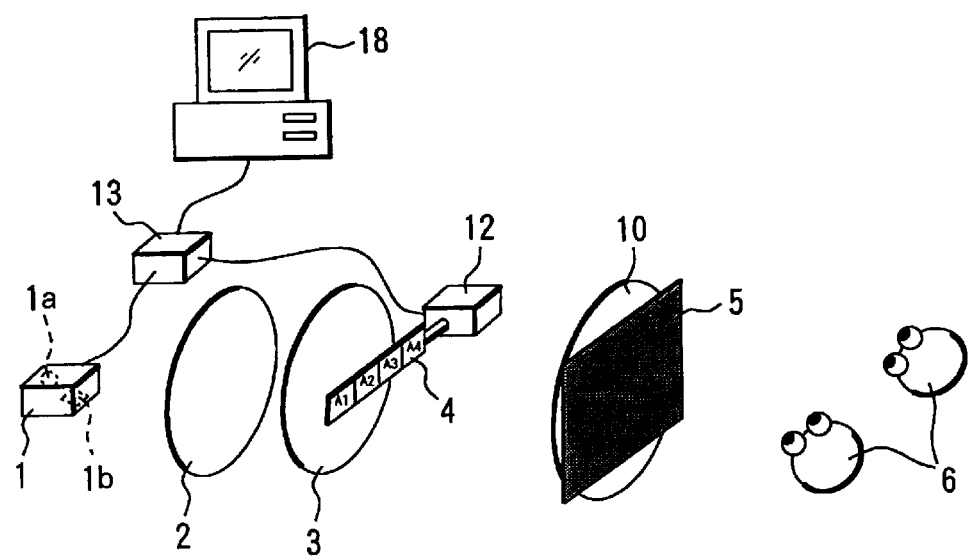
FIG. 1 is a schematic diagram showing the structure of a stereoscopic image display apparatus according to Embodiment 1 of the present invention.

FIG. 1 is a schematic diagram showing the structure of a stereoscopic image display apparatus which is Embodiment 1 of the present invention.

The stereoscopic image display apparatus of Embodiment 1 comprises a display optical system consisting of a light beam scanning unit 1 which emits a light beam and deflects the beam for scanning, a correction optical system 2, a field optical system 3, a light deflection member 4 in which a plurality of deflection elements A1 to A4 each having a light deflecting action is arranged to, a relay optical system 10, and a vertical direction diffusion member (hereinafter referred to simply as the diffusion member) 5 which provides a light diffusing property in a vertical direction.

The stereoscopic image display apparatus also comprises a driving unit 12 which drives the light deflection member 4 and a synchronization circuit 13 which synchronizes the operation of the light beam scanning unit 1 and the driving unit 12. The stereoscopic image display apparatus formed of these components displays a three-dimensional image to an observer 6.

The light beam scanning unit 1 can scan a light beam to perform scanning two-dimensionally in arbitrary directions within a predetermined area. The light beam scanning unit 1 includes a light source 1a, an optical system (not shown) such as a lens for shaping a beam (the light source 1a and the optical system constitute a light source unit), and a beam deflection device (beam scanning device) 1b. As the light source 1a, a semiconductor laser, an LED or the like is used, for example. The light source 1a is combined with the lens optical system for beam shaping to generate a light beam. The generated light beam is deflected to perform scanning in the arbitrary directions within the predetermined area by the beam deflection device 1b which can deflect the beam at high speed, such as a polygon mirror, a galvano mirror, an AOM (Acousto-Optic Modulator), and an MEMS (Microelectromechanical System).

Connected to the synchronization circuit 13 is an image information supply apparatus 18 such as a personal computer, a VCR, and a DVD player. The synchronization circuit 13 modulates the intensity of a luminous flux emitted from the light source 1a in response to a plurality of pieces of image information (image signals) with parallax included therein input from the image information supply apparatus 18.

While FIG. 1 shows the stereoscopic image display apparatus which has the single light beam scanning unit 1, the present invention is applicable to a stereoscopic image display apparatus which has a plurality of light beam scanning units. The increased number of light beam scanning units can provide the observer with images from a larger number of viewpoints.

The correction optical system 2 corrects the direction of a beam, for example, to provide beams in parallel with one another. Typically, an fθ lens is used for the correction optical system 2. The field optical system 3 is responsible for adjusting the direction of a light beam to lead it toward a desired optical path in the apparatus. The correction optical system 2 and the field optical system 3 may be omitted, or one of them may have the functions of both of them. Alternatively, the field optical system 3 may be disposed after the light deflection member 4, described later.

The light deflection member 4 includes the regularly arranged deflection elements A1 to A4 each having the light deflecting action, described later, on an incident light beam. Specifically, the light deflection member 4 has the function of deflecting a light beam in different directions depending on which deflection element receives the light beam.

Figure 2:
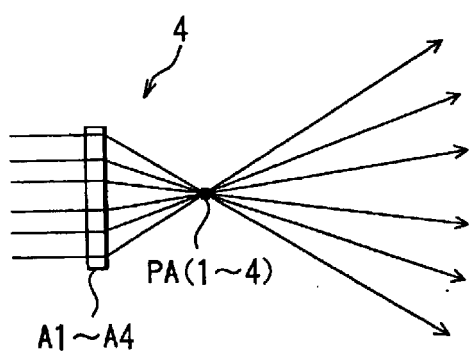
FIG. 2 is a schematic diagram for explaining the effect of a light deflection member used in Embodiment 1.
Figure 3:
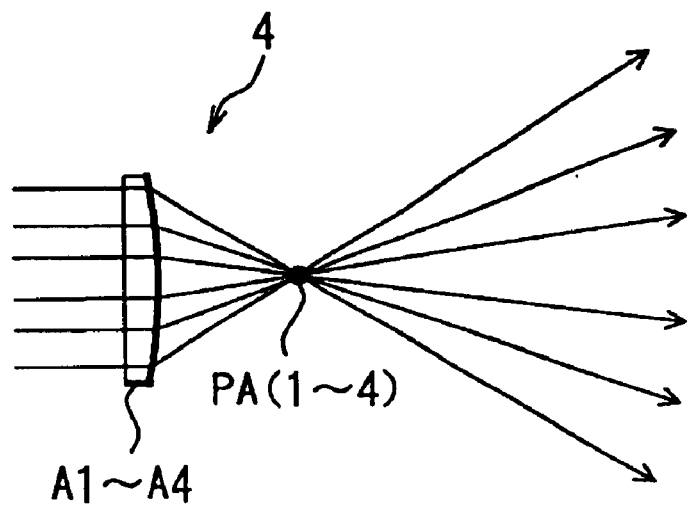
FIG. 3 is a schematic diagram showing the light deflection member used in Embodiment 1 formed of a convex lens array.
Figure 4:
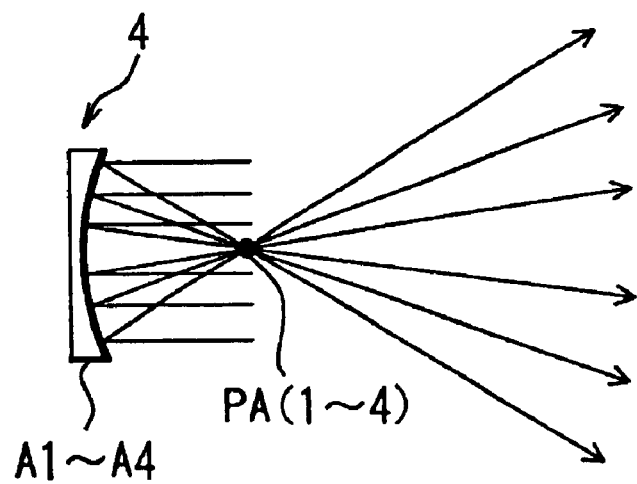
FIG. 4 is a schematic diagram showing the light deflection member used in Embodiment 1 formed of a concave mirror array.

FIG. 2 shows the light deflecting action provided by each of the deflection elements constituting the light deflection member 4. As shown in FIG. 2, each deflection element has the action of deflecting any incident light beam to pass through the same convergence point PA. The deflection element having such an action, a hologram element, a diffraction grating or the like can be used. Alternatively, a typical convex lens as shown in FIG. 3 or a concave mirror having a focal point as shown in FIG. 4 may be used as the deflection element.

Figure 5:
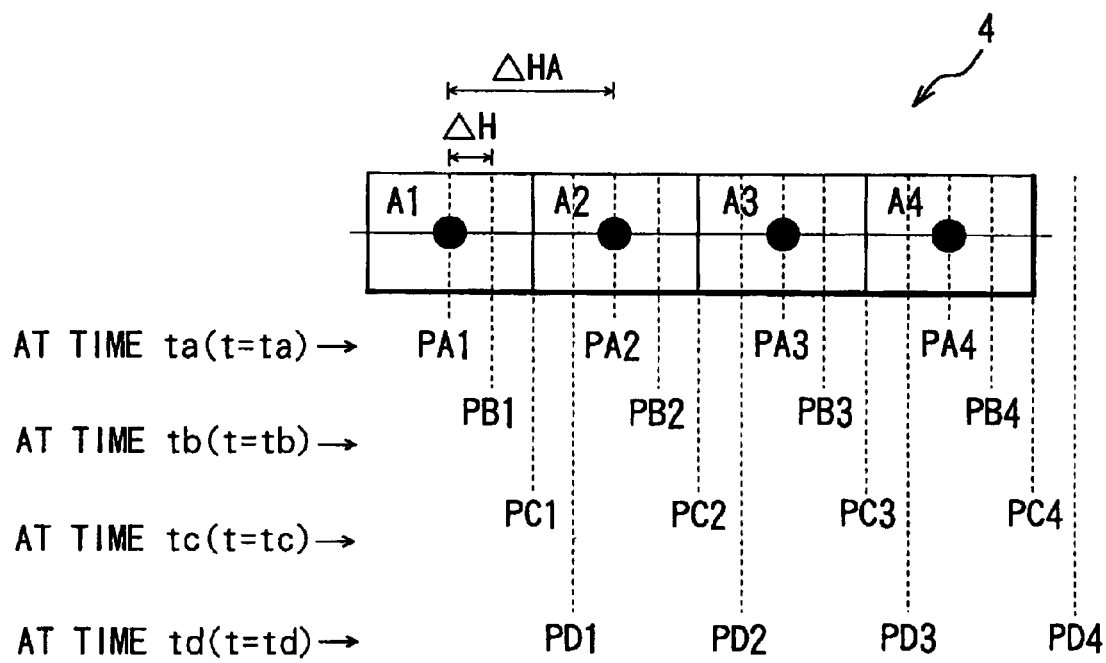
FIG. 5 is a front view schematically showing the structure of the light deflection member of Embodiment 1.

FIG. 5 is a front view of the light deflection member 4 and shows the relationship between the deflection elements A1 to A4 constituting the light deflection member 4 and arranged in a horizontal direction and light convergence points PA1 to PA4 formed by the deflection elements A1 to A4, respectively.

Figure 6:
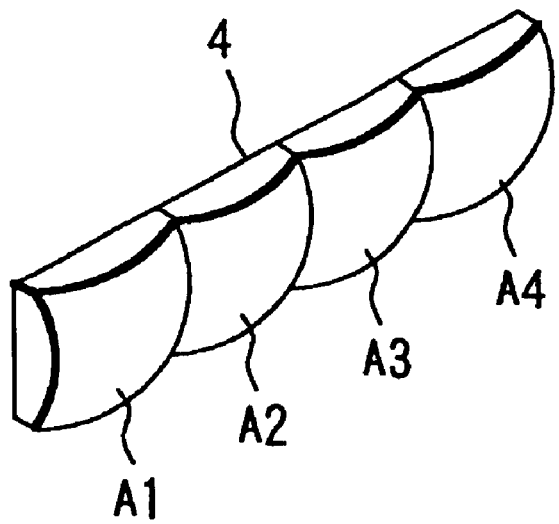
FIG. 6 is a schematic diagram showing the light deflection member used in Embodiment 1 formed of a convex lens array.
Figure 7:
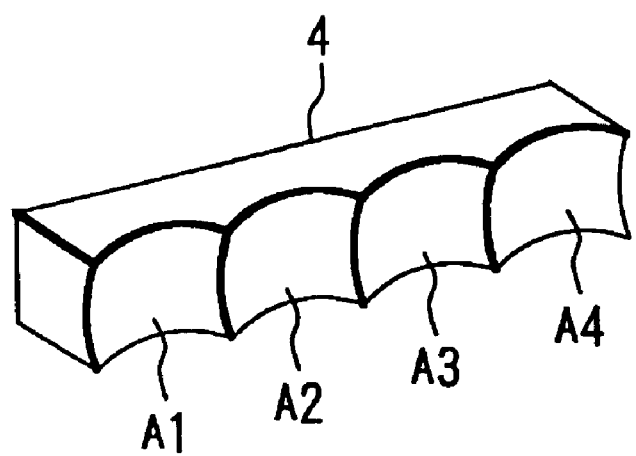
FIG. 7 is a schematic diagram showing the light deflection member used in Embodiment 1 formed of a concave mirror array.

When a convex lens is used as the deflection element, the light deflection member 4 is a lens array as shown in FIG. 6. When a concave mirror is used as the deflection element, the light deflection member 4 is a mirror array as shown in FIG. 7.

The diffusion member 5 is an optical element which is responsible for diffusing an incident light beam only in the vertical direction without changing its directivity in the horizontal direction. Embodiment 1 employs a lenticular lens having a very small periodic structure in the vertical direction as the diffusion member 5. The periodic structure has a very fine pitch in the lenticular lens to allow the diffusion of a light beam only in the vertical direction while its directivity is not changed in the horizontal direction, regardless of the incident position thereof.

The relay optical system 10 has the action of again converging the light beam toward the observer after the light beam is converged to the convergence points PA1 to PA4 by the actions of the deflection elements A1 to A4 constituting the light deflection member 4.

The driving unit 12 causes the light deflection member 4 to linearly reciprocate at high speed in the horizontal direction in the plane in which the deflection elements A1 to A4 are arranged. The driving unit 12 can be formed of a voice coil motor which drives a shaft in the axis direction, by way of example.

Figure 8:
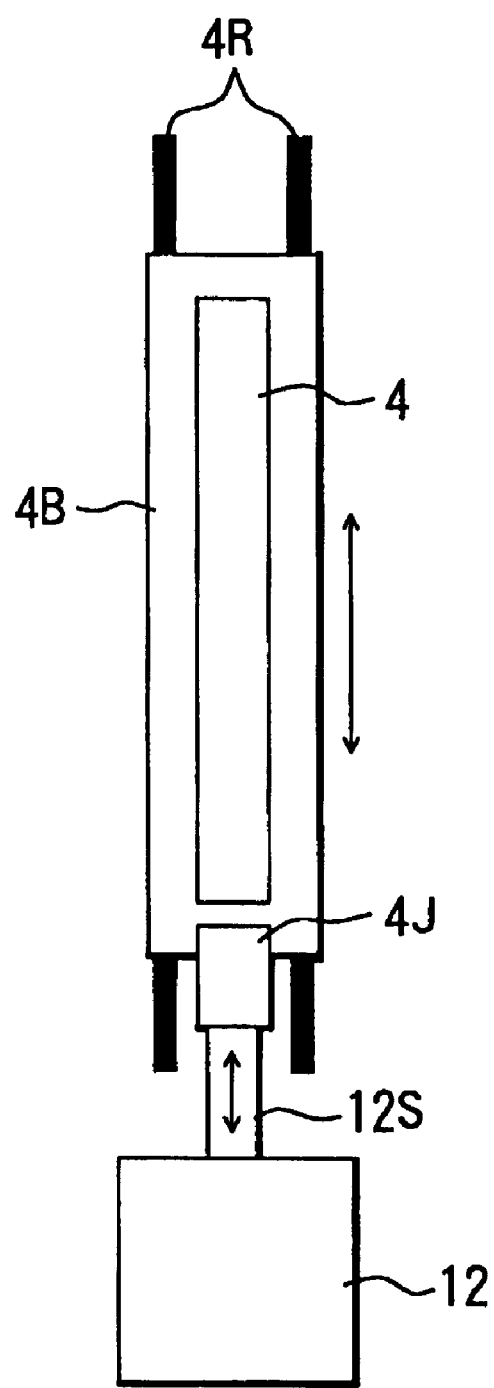
FIG. 8 is a schematic diagram showing the structure of a driving unit of the light deflection member used in Embodiment 1.

FIG. 8 shows how the light deflection member 4 is driven by using the voice coil motor. A base 4B to which the light deflection member 4 is fixed is mounted on a rail 4R and can move smoothly in a direction along the rail 4R by external forces. The base 4B is coupled to a shaft 12S of the voice coil motor serving as the driving unit 12 through a joint 4J. With this structure, the voice coil motor is driven to move the base 4B on the rail 4R at high speed through the shaft 12S, thereby enabling the linear reciprocation of the light deflection member 4 at high speed.

Figure 9:
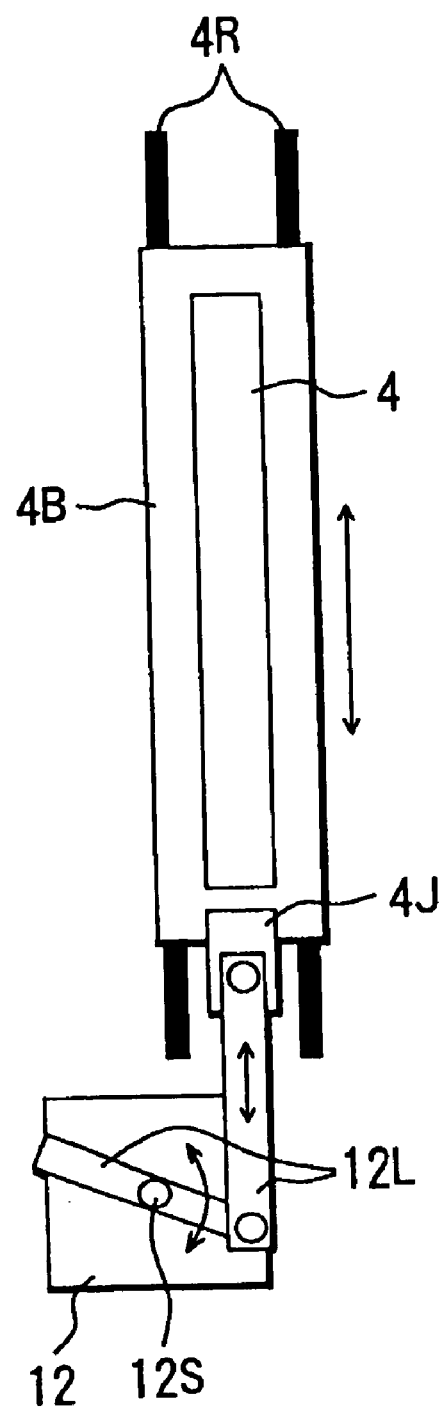
FIG. 9 is a schematic diagram showing the structure of another exemplary driving unit of the light deflection member used in Embodiment 1.

FIG. 9 shows the structure of a galvano motor used as the driving unit 12. A link mechanism 12L is provided on a shaft 12S of the galvano motor to convert rotational motion into linear motion. This allows the light deflection member 4 to linearly reciprocate at high speed.

The synchronization circuit 13 provides the driving unit 12 with a signal for the motion of the light deflection member 4, and in synchronization therewith, provides the light beam scanning unit 1 with a signal for the intensity and direction of a light beam radiated therefrom. This synchronizes the displacing state of the light deflection member 4 and the light beam scanning state of the light beam scanning unit 1. It should be noted that the synchronization circuit 13 may control the light beam scanning unit 1 in accordance with the movement of the light deflection member 4, or control the movement of the light deflection member 4 in accordance with a signal from the light beam scanning unit 1.

Figure 10:
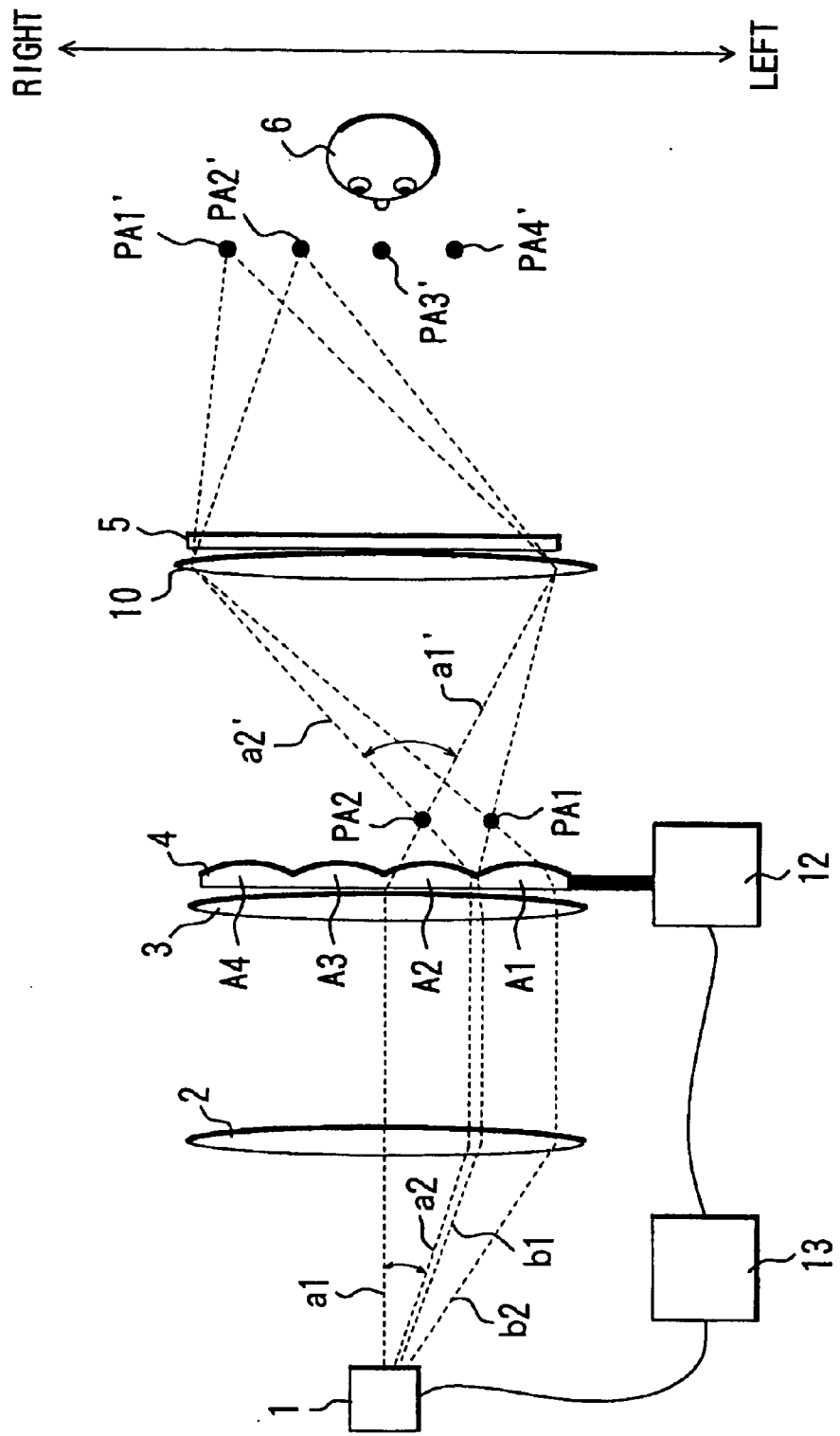
FIG. 10 is a schematic diagram showing optical paths of light beams in a horizontal plane in Embodiment 1.

Next, description is made with reference to FIG. 10 especially for optical paths formed by scanning in a horizontal plane among optical paths formed by scanning of a light beam emitted from the light beam scanning unit 1 in the stereoscopic image display apparatus of Embodiment 1. The term "horizontal plane" used in the description means the plane including the line connecting the right and left eyeballs of the observer of the stereoscopic image display apparatus. FIG. 10 is a schematic diagram showing the stereoscopic image display apparatus shown in FIG. 1 from the top. As the light deflection member 4, a convex lens array is used. In FIG. 10, dotted lines a1, a2, b1, b2 and the like show optical paths of a light beam emitted from the light beam scanning unit 1 at different points in time.

When a light beam travels on, for example, the optical path a1 among the optical paths of a light beam emitted from the light beam scanning unit 1, the beam is incident near the right end of the light deflection element A2 of the light deflection member 4. The light beam is deflected by the light deflection element A2, passes through the convergence point PA2, travels on a optical path a1', and is incident on the relay optical system 10. On the other hand, when a light beam travels on the optical path a2, the light beam is incident near the left end of the light deflection element A2 of the light deflection member 4. The light beam is deflected by the light deflection element A2, passes through the convergence point PA2, travels on an optical path a2', and is incident on the relay optical system 10.

By means of such an action of the light deflection element A2 of the light deflection member 4, a light beam is emitted from the light beam scanning unit 1 in a direction changing over time from the optical path a1 to the optical path a2 to allow scanning of the diffusion member 5 across the full width of the back. In this case, the optical paths of the light beam have the convergence point PA2 as the center of deflection to scan the diffusion member 5 across the full width of the back. Similarly, when a light beam emitted from the light beam scanning unit 1 travels on optical paths b1 to b2, the optical paths of the light beam have the convergence point PA1 as the center of deflection to scan the diffusion member 5 across the full width through the relay optical system 10.

In addition, when a light beam is emitted from the light beam scanning unit 1 to scan the light deflection elements A3 and A4 of the light deflection member 4, the light beam is deflected to scan the diffusion member 5 across the full width in each case. As a result, the diffusion member 5 is scanned four times during scanning of one cycle in the horizontal direction with the light beam emitted from the light beam scanning unit 1.

If scanning with a light beam emitted from the light beam scanning unit 1 is also performed in the vertical direction and the intensity of the light beam is modulated in accordance with the incident position thereof on the light deflection member 4, a two-dimensional image information distribution can be formed four times on the back of the diffusion member 5 during scanning of the light deflection member 4 of one cycle by the light beam scanning unit 1 as if the distribution is produced by light emitted from light sources located at the convergence points PA1 to PA4 and projected onto the back of the diffusion member 5. These two-dimensional image information distributions form images at conjugate positions PA1' to PA4' with respect to the relay optical system 10 to allow the observer 6 to see reproduced two-dimensional images at the respective positions.

While Embodiment 1 has been described for the case where the light deflection member 4 is formed of the four light deflection elements, the present invention is not limited thereto. The number of the light deflection elements can be increased to increase the number of the convergence points serving as apparent light sources of scanning light to provide an increased number of two-dimensional images formed in front of the diffusion member 5 during one scanning by the light beam scanning unit 1.

Next, description is made for the state of a light beam at the position where the observer 6 sees the resulting image. The diffusion member 5 has the action of diffusing the incident light beam only in the vertical direction while the directivity thereof is not changed in the horizontal direction. The vertical components of the light beam reaching the diffusion member 5 are diffused, while the horizontal components thereof pass unchanged through the diffusion member 5. As a result, the conjugate position of the convergence point formed by the image-forming action of the relay optical system 10 shows a vertically long shape elongated only in the vertical direction. Specifically, the convergence point PA1 forms an image at PA1', the convergence point PA2 at PA2', the convergence point PA3 at PA3', and the convergence point PA4 at PA4', respectively, in the air and in vertically long shape.

The effect provided by the diffusion member 5 facilitates observation of images since the observer 6 can see the same images even when his eyeballs move in the up-down direction during observation. If the eyeballs of the observer 6 can be positioned accurately, the diffusion member 5 can be omitted.

If deflection elements constituting the light deflection member 4 are formed with a smaller pitch in order to increase the number of two-dimensional images formed in front of the diffusion member 5 during one scanning by the light beam scanning unit 1 as described above, the shape of a light beam emitted from the light beam scanning unit 1 is significantly changed by each light deflection element to diverge the beam. This results in the width of the beam in the horizontal direction larger than a single eye of the observer at the position of the observer to make it impossible to perform stereoscopic display of "super-multiview regions", described later. In this manner, there is a limit to the improvement of three-dimensional image display intended by an increased number of the light deflection elements, primarily in association with the diameter of the light beam.

As described above, the light deflection member 4 is driven by the driving unit 12 to be moved in the horizontal direction. The effect of the movement of the light deflection member 4 is now described.

Figure 11:
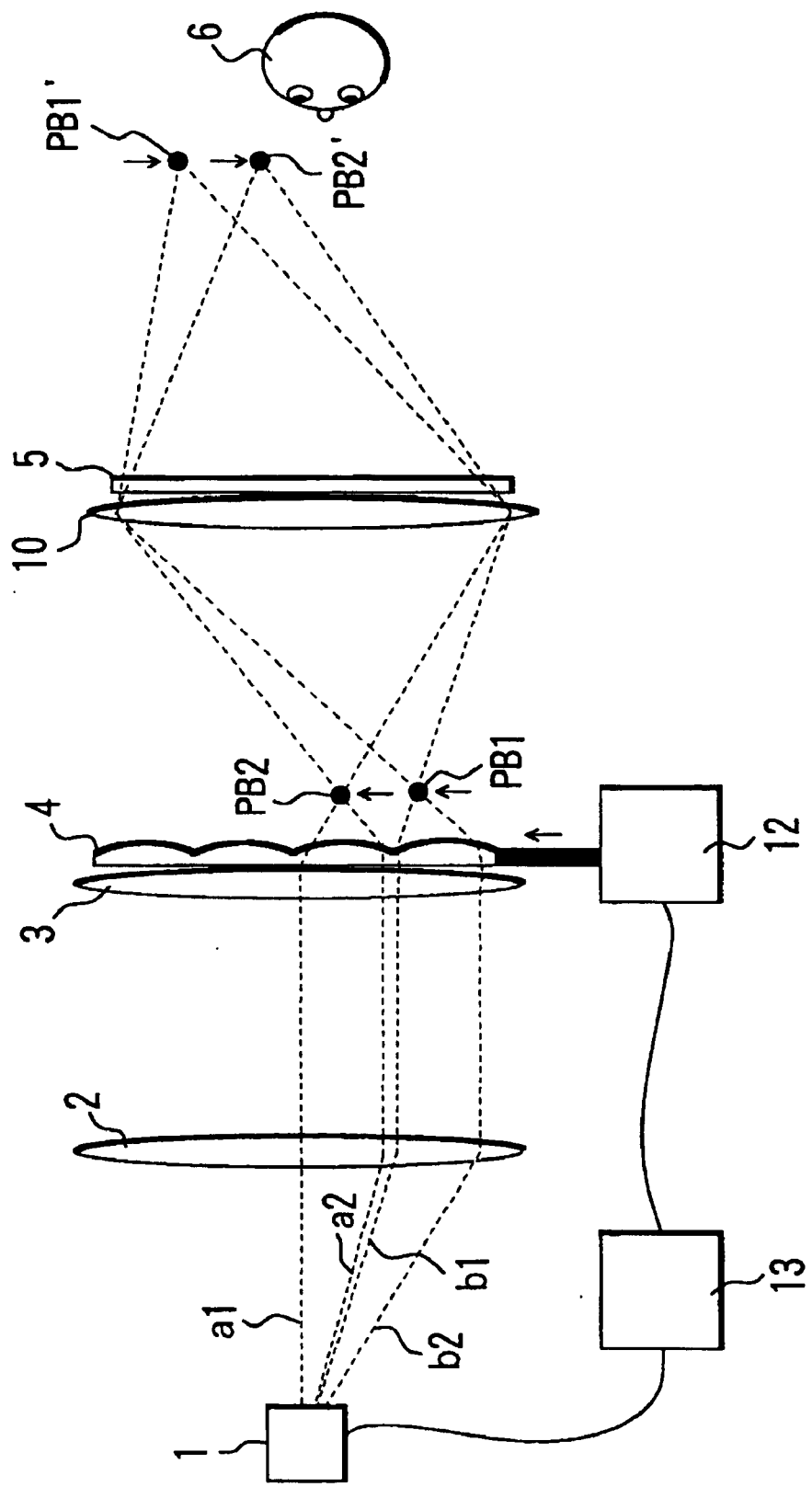
FIG. 11 is a schematic diagram showing the optical paths of the light beams in the horizontal plane in Embodiment 1 formed by movement of the light deflection member.

FIG. 11 shows the light deflection member 4 which has been moved upward in the sheet (to the right of the observer 6) from the status in FIG. 10. In this case, the light deflection member 4 has been moved to the position where the light convergence points PA1 and PA2 are moved to the positions designated with PB1 and PB2, respectively. Since all the convergence points form images in the air near the observer as described above, images PB1' and PB2' produced by the light beams from PB1 and PB2 are also moved, and specifically, they are shifted downward in the sheet (to the left of the observer 6) in FIG. 11 with respect to PA1' and PA2'.

By utilizing the movements of the light convergence points and the corresponding image-forming points which are caused by the movement of the light deflection member 4 in this manner, the light deflection member 4 is moved for the purpose of providing multiplexing of light convergence points in Embodiment 1. As shown in FIG. 5, the adjacent light convergence points of the light deflection member 4 have a distance of $\Delta HA$. Embodiment 1 is described for the case where the light deflection member 4 is moved in increments represented by the following expression:

$$\Delta H = \Delta HA/4$$

to provide 4-fold multiplexing of light convergence points, as an example of the multiplexing of light convergence points.

At a time ta (t=ta), the respective light convergence points are at the positions of PA1, PA2, PA3, and PA4 in FIG. 5. At a time tb (t=tb), the respective light convergence points are moved to the positions of PB1, PB2, PB3, and PB4. Similarly, the respective light convergence points are moved to the positions of PC1, PC2, PC3, and PC4 at a time tc (t=tc), and the respective light convergence points are moved to the positions of PD1, PD2, PD3, and PD4 at a time td (t=td).

Figure 12:
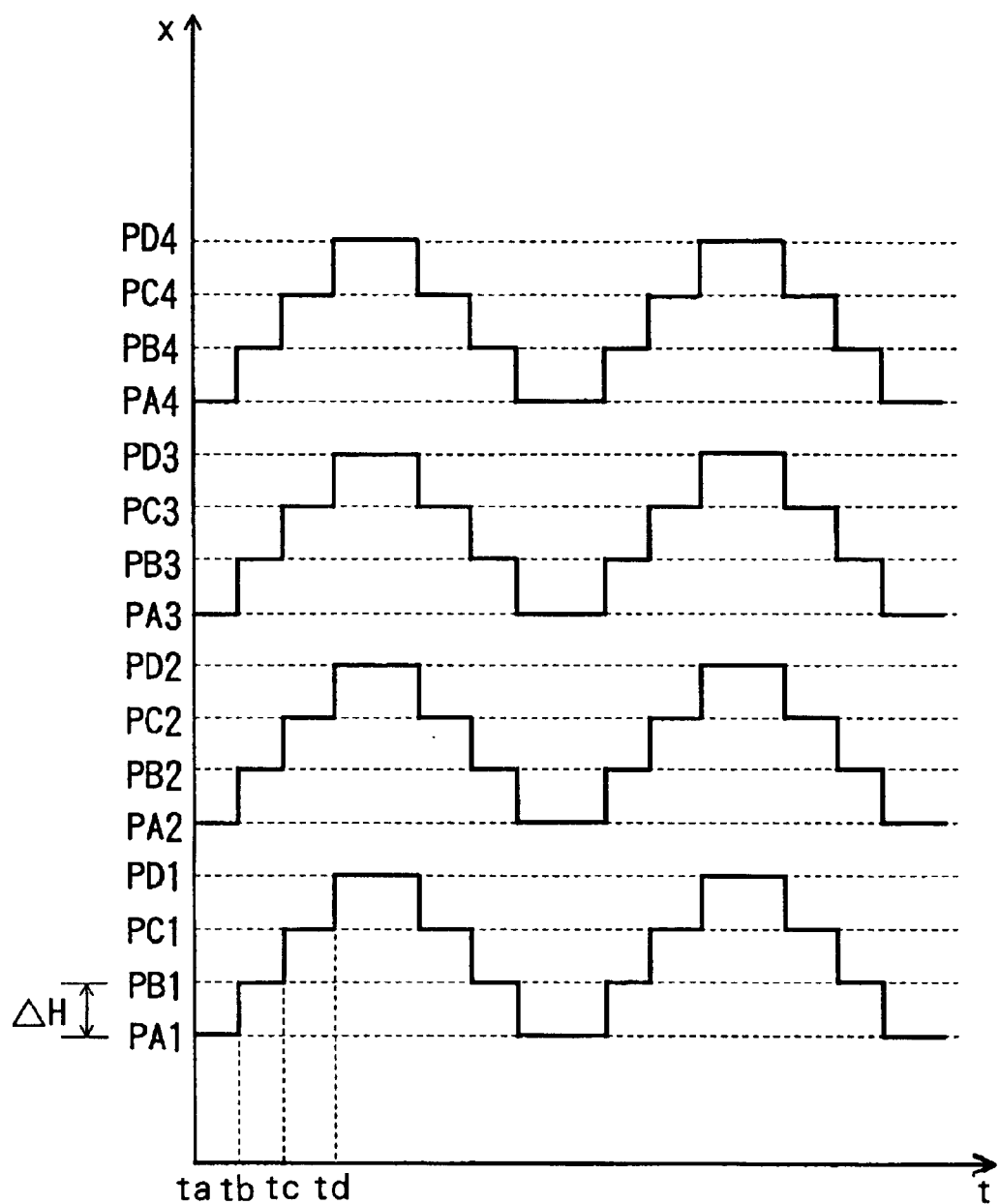
FIG. 12 is a timing chart showing the movement of the light deflection member in Embodiment 1.

FIG. 12 shows a timing chart showing the movement of the light deflection member 4. In the chart, the horizontal axis represents the time t, while the vertical axis represents the position x in the horizontal direction of the light deflection member 4.

As shown in FIG. 12, the light deflection member 4 is moved to a predetermined position, and held at the position for a certain time period, during which the light beam scanning unit 1 performs scanning of one cycle. For example, scanning is performed with PA1, PA2, PA3, and PA4 as the light convergence points. Next, the light deflection member 4 is moved by the amount represented by $\Delta H=\Delta HA/4$ and stopped to perform scanning of one cycle by the light beam scanning unit 1. The cycle of the movement of the light deflection member 4 is set to be equal to or shorter than the time of persistence of vision of a human to allow the eyes of the observer to recognize the resulting images similarly to images which would be formed when sixteen light convergence points simultaneously exist. In this event, all the convergence points have the equal pitch ($\Delta H$) in the horizontal direction.

While the pitch $\Delta H$ of the movement of the light deflection member 4 is set to be ¼ of the pitch $\Delta HA$ of the light deflection elements in Embodiment 1, the present invention is not limited thereto. The pitch $\Delta HA$ of the light deflection elements can be more finely set corresponding to the number of possible scans by the light beam scanning unit 1 within the time of persistence of vision of a human. Furthermore, even when the light deflection member 4 is formed of a single light deflection element, by appropriately setting the pitch of the movement, the observer can recognize the resulting images as if a plurality of light convergence points simultaneously exists.

Figure 13:
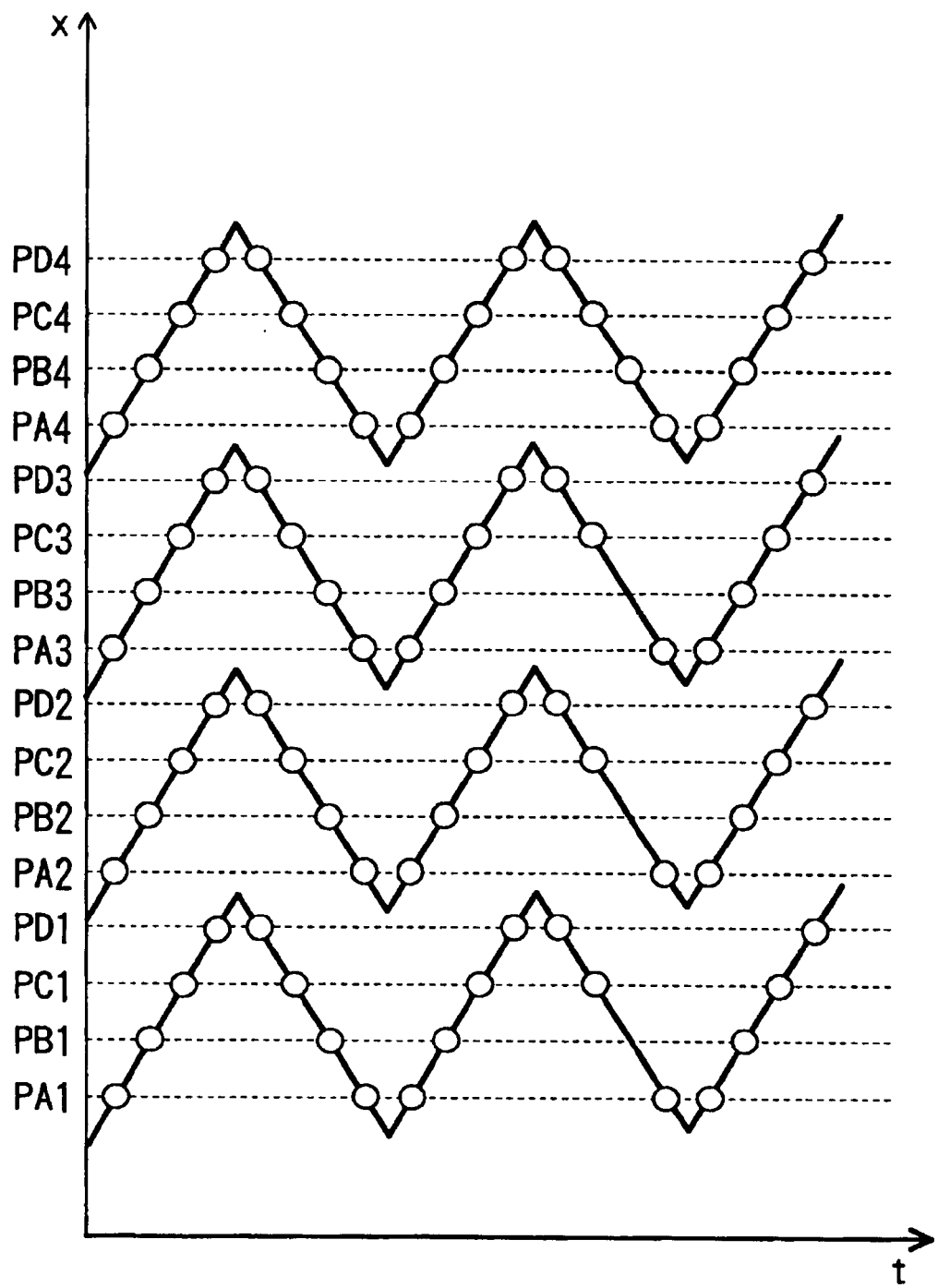
FIG. 13 is another timing chart showing the movement of the light deflection member in Embodiment 1.
Figure 14:
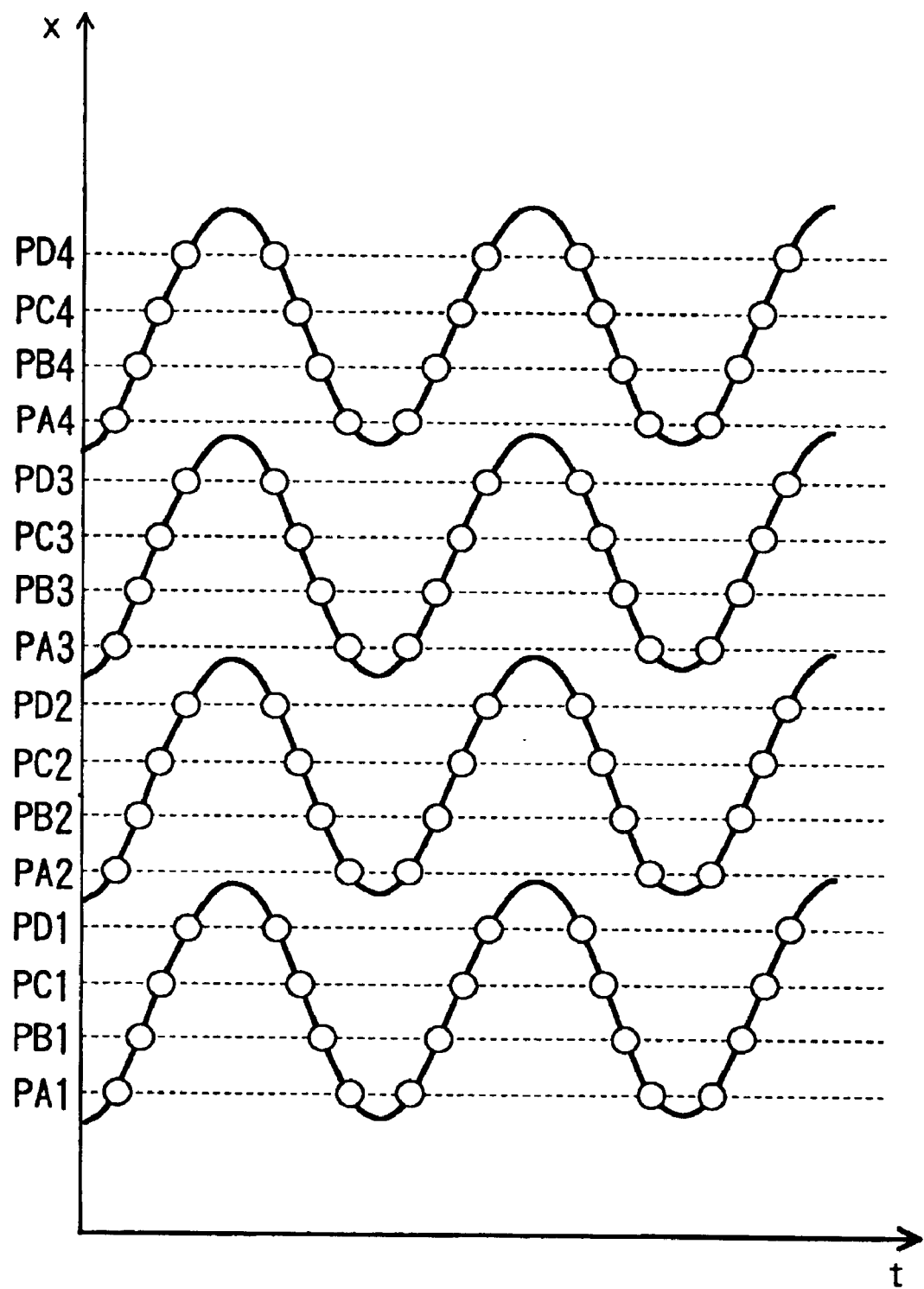
FIG. 14 is a further timing chart showing the movement of the light deflection member in Embodiment 1.
Figure 15:
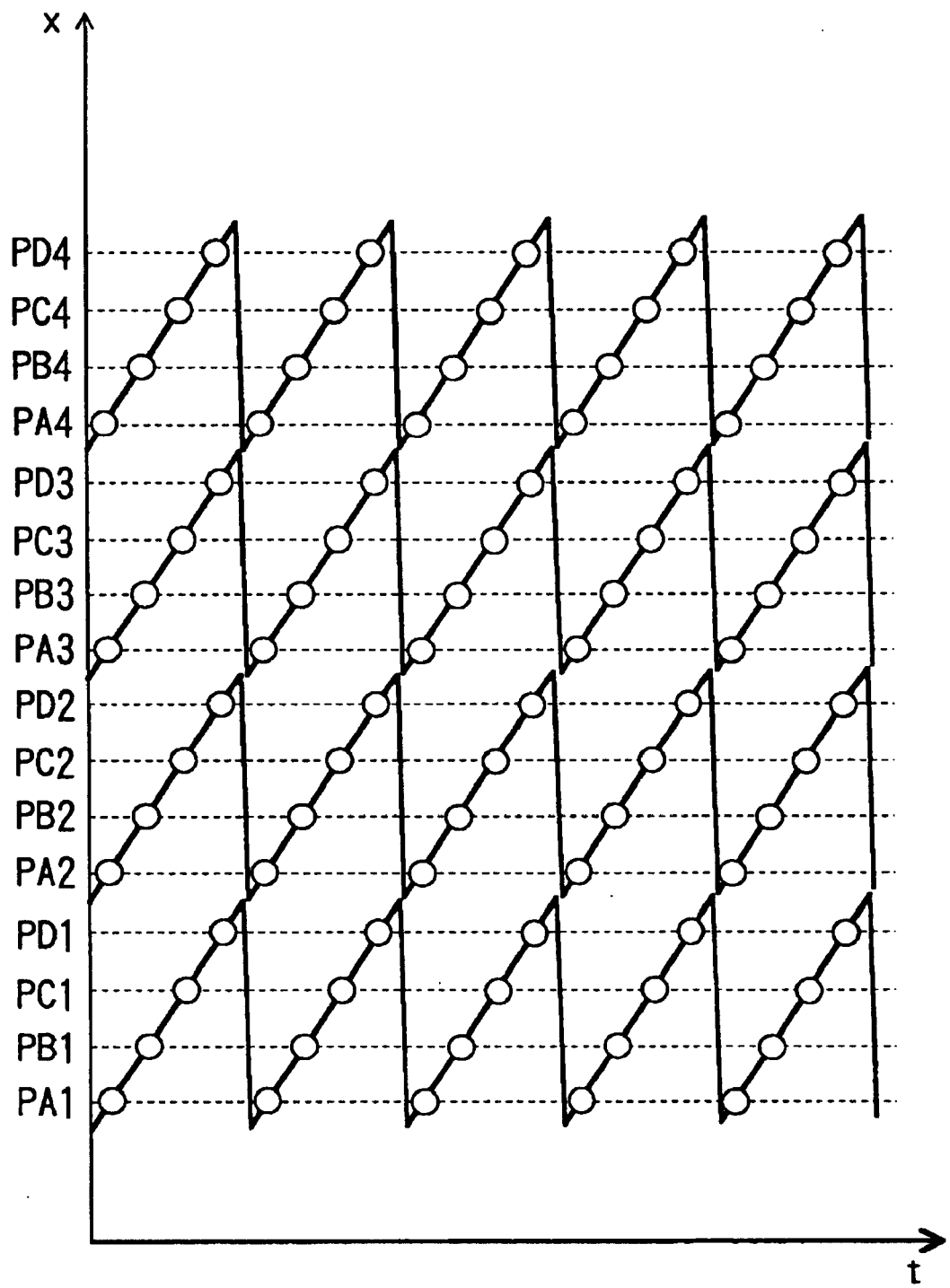
FIG. 15 is a still further timing chart showing the movement of the light deflection member in Embodiment 1.

The timing chart showing the movement of the light deflection member 4 is not limited to the chart in FIG. 12 representing stepped lines as shown in FIG. 12, and triangular waveforms as shown in FIG. 13, sine waveforms as shown in FIG. 14, or sawtooth waveforms as shown in FIG. 15 may be used. In such cases, the scanning by the light beam scanning unit 1 is synchronized with the movement of the light deflection member 4 and is performed on the light deflection member 4 around the timings shown by white circles in FIGS. 13 to 15 to realize the similar effects without diverging the beam diameter.

Figure 16:
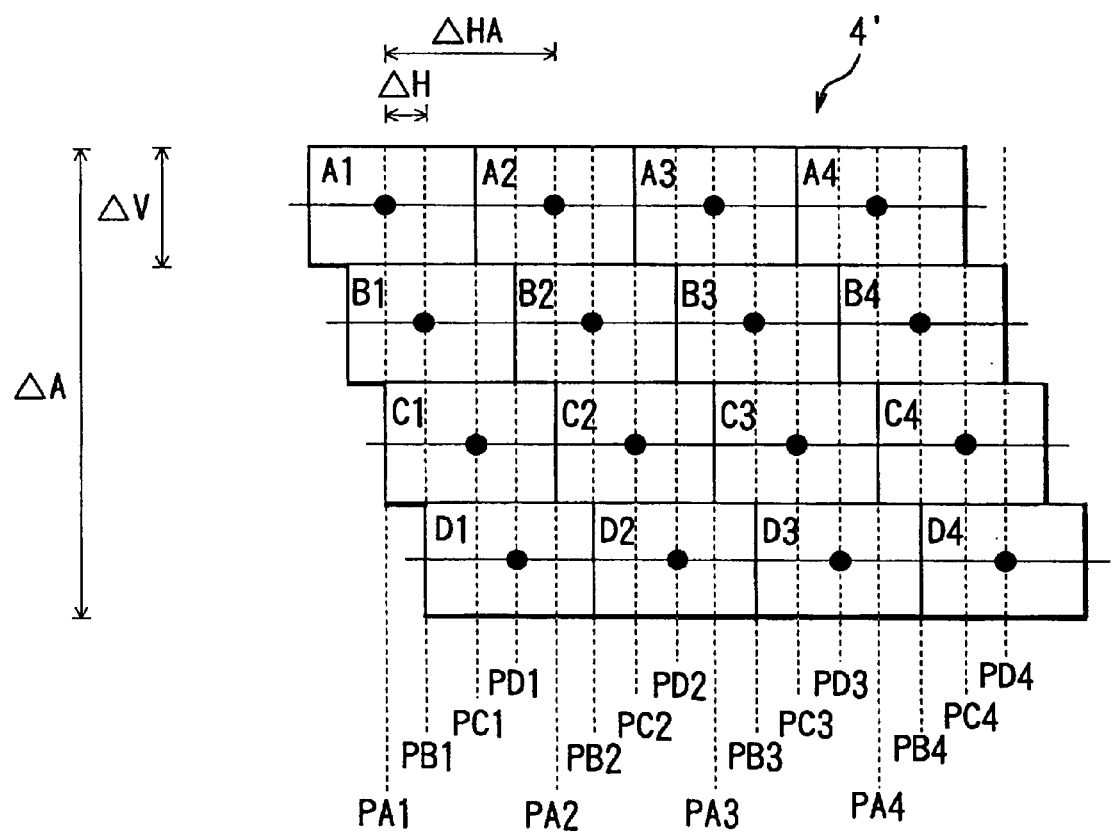
FIG. 16 is a front view schematically showing the structure of another exemplary light deflection member in Embodiment 1.
Figure 17:
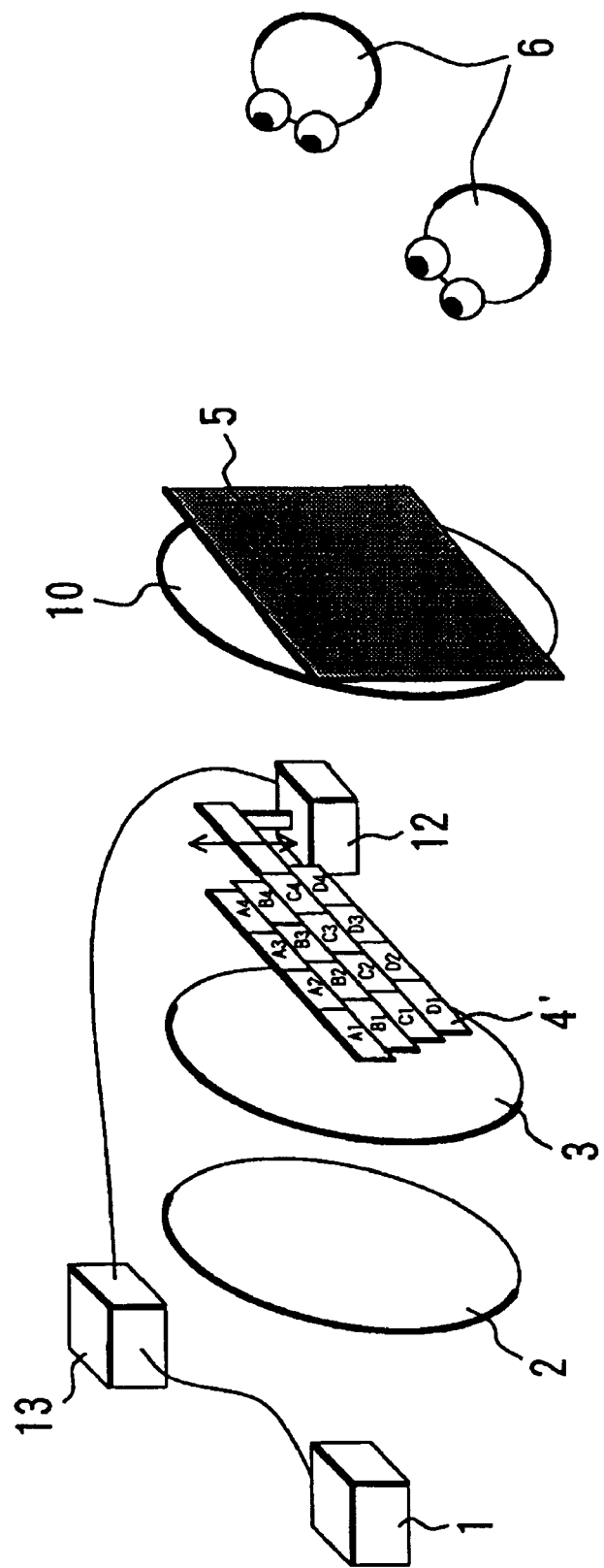
FIG. 17 is a schematic diagram showing the structure of another stereoscopic image display apparatus in Embodiment 1.

FIG. 16 shows a light deflection member 4' in different form from that in FIG. 5. The light deflection member 4' in FIG. 16 has four light deflection members (four stages) as shown in FIG. 5 stacked one on another in which they are offset by the same distance in the horizontal direction. FIG. 17 is a schematic diagram showing the structure of a stereoscopic image display apparatus which uses the light deflection member 4' shown in FIG. 16. As shown in FIG. 17, the light deflection member 4' having the plurality of stages of the light deflection members 4' offset by the same distance as shown in FIG. 16 is used, and the light deflection member 4' is moved in the vertical direction. The structure can also provide the same effects as the apparatus shown in FIG. 1.

Alternatively, in the structure of FIG. 1, the light deflection member 4 may be fixed and the relay optical system 10 may be moved instead in cycles in the horizontal direction in the plane in which it is disposed. Thereby, multiplexing of the light convergence points is provided similarly to the case where the light deflection member 4 is moved.

(Application to Stereoscopic Vision)

Figure 18:
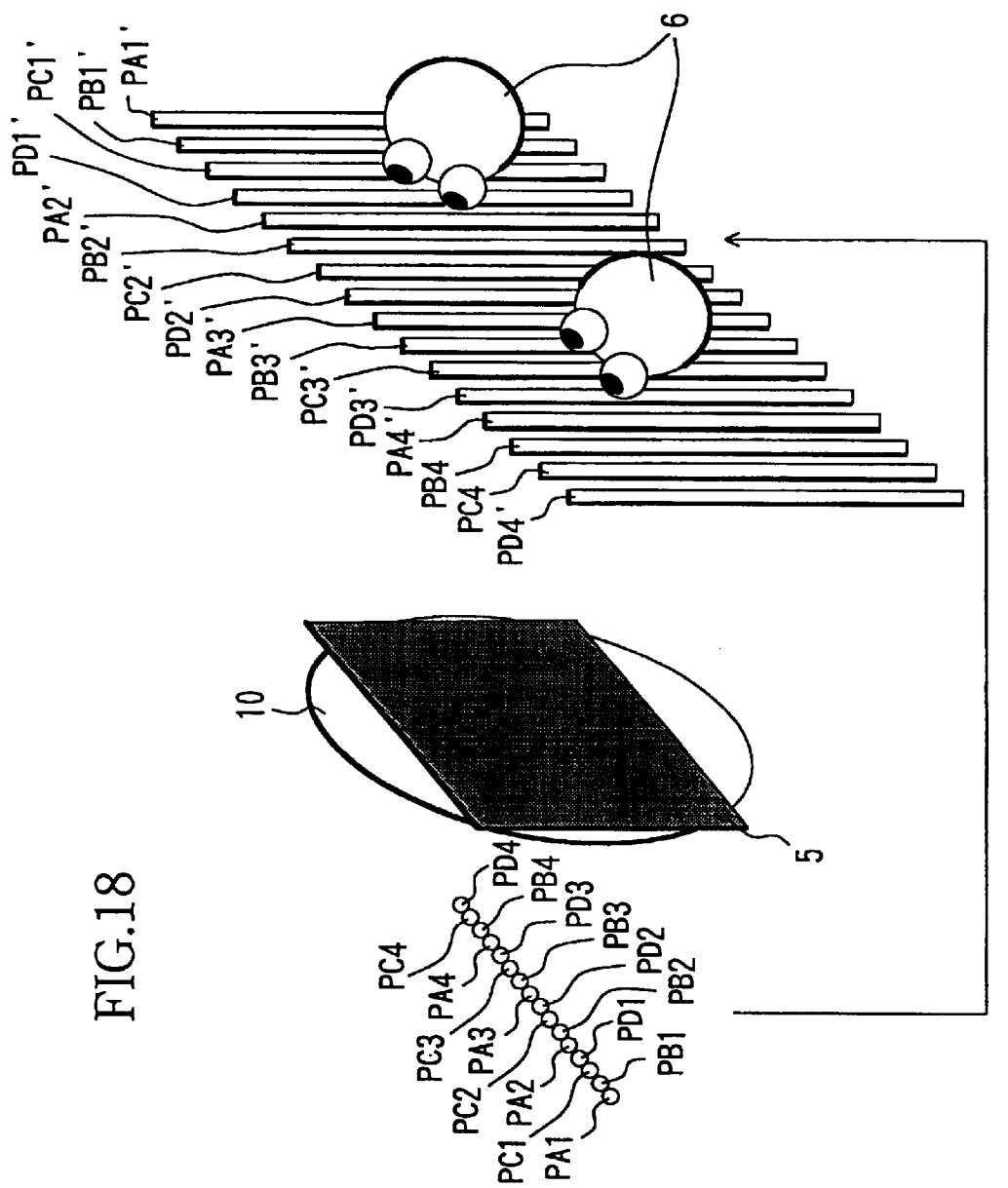
FIG. 18 is a schematic diagram showing pupil image-formation provided by the effect of a relay optical system and a vertical direction diffusion member in Embodiment 1.

FIG. 18 shows pupil image-formation achieved by the light deflection member 4 formed of the plurality of light deflection elements, the multiplexing of the light convergence points by the movement of the light deflection member 4, and the actions of the relay optical system 10 and the diffusion member 5 as described above.

The light convergence point PA1 forms an image at PA1' by the action of the relay optical system 10. In this event, since the light is diffused in the vertical direction by the action of the diffusion member 5, PA1' has a vertically elongated shape as shown in FIG. 18. Other light convergence points also form images in vertically elongated shape. As a result, pupils corresponding to a number of vertically elongated image-forming positions are arranged with substantially equal pitches.

Next, the principle of reproducing a three-dimensional image is described with reference to the apparatus of Embodiment 1. As described above, the light beam is emitted for scanning with each convergence point as the center of deflection, and the intensity of the light can be temporally modulated to form a two-dimensional image information distribution on the diffusion member 5. As can be seen from FIG. 18, the observer must look toward the diffusion member 5 with his eye on the pupil PA1' in order to observe the entire image information distribution formed on the diffusion member 5 by the light beam deflected with the light convergence point PA1 as the center. The observer cannot observe the image information distribution from the other pupils.

Similarly, to observe the entire image information distribution formed on the diffusion member 5 by a light beam emitted for scanning with another light convergence point as the center of deflection, the observer must look toward the diffusion member 5 with his eye on the corresponding pupil. Consequently, a plurality of different pieces of two-dimensional image information can be reproduced separately at the observation positions arranged independently in the horizontal direction. This property can be used to reproduce a three-dimensional image.

When the observer 6 in front of the diffusion member 5 sees the diffusion member 5 with his right and left eyeballs on different pupils, the observer 6 can observe only the images corresponding with the pupil. Thus, the observer can see a three-dimensional image with the effect of binocular parallax by providing his right and left eyeballs with different parallax images associated with the observation positions.

In this event, if the distance between the pupils for observation is smaller than the pupil diameter of the observer, the aforementioned "stereoscopic display of super-multiview regions" is enabled in which the focal point adjusted in the eyes of the observer is brought near the three-dimensional image to reduce tiredness and uncomfortableness of the observer.

Figure 20:
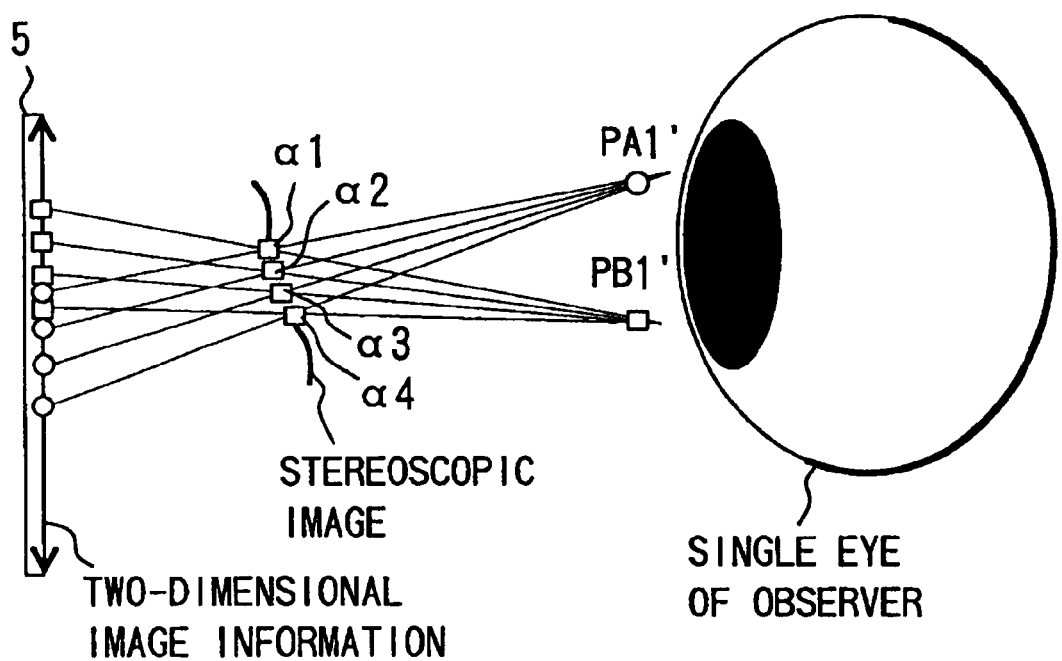
FIG. 20 is a schematic diagram showing the principle of stereoscopic display of "super-multiview regions" realized in the stereoscopic image display apparatus of Embodiment 1.

The "stereoscopic display of super-multiview regions" is described with reference to FIG. 20. FIG. 20 shows the case where the single eye of the observer is provided with two-dimensional images formed at the pupil PA1' and the pupil PB1', and the distance between the pupil PA1' and the pupil PB1' is smaller than the pupil diameter of the observer. In this case, the observer can recognize both of the two-dimensional images formed at the pupil PA1' and the pupil PB1'.

In the state shown in FIG. 20, points $\alpha 1$ to $\alpha 4$ form a three-dimensional image to be reproduced in three-dimensional space between the diffusion member 5 and the eyeball. Each of the two pieces of two-dimensional to form images at the pupil PA1' and the pupil PB1' sends light beams to express the points $\alpha 1$ to $\alpha 4$. The light beams intersect with each other at the corresponding points $\alpha 1$ to $\alpha 4$, form images at the pupil PA1' and the pupil PB1', and then are incident on the eyeball. In the state, the observer sees the light beams which express the points $\alpha 1$ to $\alpha 4$ as if they are emitted from the points $\alpha 1$ to $\alpha 4$. Since the eyeball recognizes the points $\alpha 1$ to $\alpha 4$ as if they are present at different distances due to the difference in the focal position, the single eyeball recognizes the image formed by the points $\alpha 1$ to $\alpha 4$ as a three-dimensional image.

To realize such "stereoscopic display of super-multiview regions," at least it is necessary that the distance between the pupils of the two-dimensional images is equal to or smaller than the pupil diameter of the eyeball and the diameter of the light beam expressing each point forming the three-dimensional image is equal to or smaller than the pupil diameter of the eyeball.

To satisfy the condition, in Embodiment 1, the optical system is optimized such that the horizontal width of the pupil is equal to or smaller than 2 mm based on the pupil diameter of the observer, and the distance between the pupils at the observation position is also equal to or smaller than 2 mm. A smaller diameter of beam light is preferable to improve the resolution of the two-dimensional image, and specifically, the diameter of the light beam is preferably approximately 0.1 mm to 1 mm.

For example, to satisfy the aforementioned condition when a two-dimensional image is displayed on the diffusion member 5 in an area having a width of 200 mm, at least 100 light convergence points are required. If 100 light convergence points are intended to be formed with the light deflection member 4 fixed in the apparatus shown in FIG. 1, it is necessary to form the light deflection member 4 of 100 light deflection elements. In this case, when the entire width of the light deflection member 4 is, for example 100 mm, the light deflection elements in the light deflection member 4 have a horizontal pitch of 1 mm.

Figure 56:
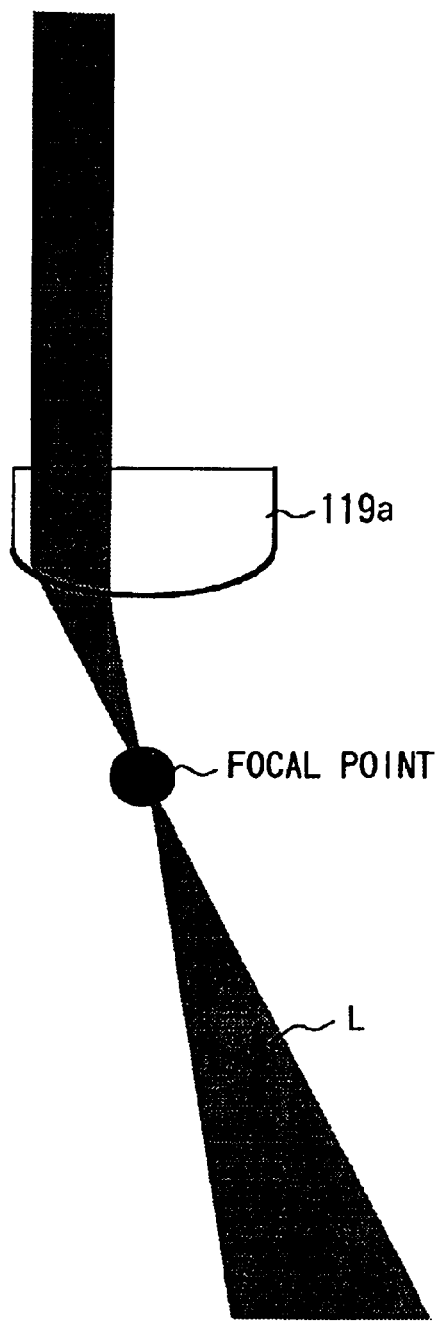
FIG. 56 is a schematic diagram for explaining a disadvantage caused when a smaller deflection element is used in the stereoscopic image display apparatus in FIG. 54.

FIG. 56 shows the convex lens (119a) as the deflection element which does not have a sufficient size for the diameter of beam light. In the case as shown in FIG. 56, the light deflection element presents the significant action of changing the shape of the light beam in addition to the deflection of the beam light. As a result, when the size of the light deflection element is not sufficient for the diameter of the beam light, the diameter of the beam light at the observation position is larger than the pupil diameter of the eyeball, and the aforementioned condition for the "stereoscopic display of super-multiview regions" is not satisfied.

In contrast, the light deflection member 4 is moved to provide the multiplexing of the light convergence points in Embodiment 1. For example, the light deflection member 4 including 10 light deflection elements arranged in the horizontal direction with a 10-mm pitch can be used to provide 10-fold temporal multiplexing to form 100 light convergence points. It is thus possible to provide each deflection element of sufficient size for the diameter of the beam light from the light source to minimize a change in the shape of the beam light.

Embodiment 1 has been described on the precondition that, for example in FIG. 18, all the light convergence points such as PA1 and PB1 form images in the air as the pupils PA1', PB1' and the like. However, for performing the stereoscopic display of super-multiview regions, a three-dimensional display can be reproduced even when pupil image-formation is not achieved, as long as a light beam is incident on the pupil of an observer with its directivity maintained and with no divergence, and several light beams after beam intersections are formed are incident on a single eye of the observer.

Figure 21:
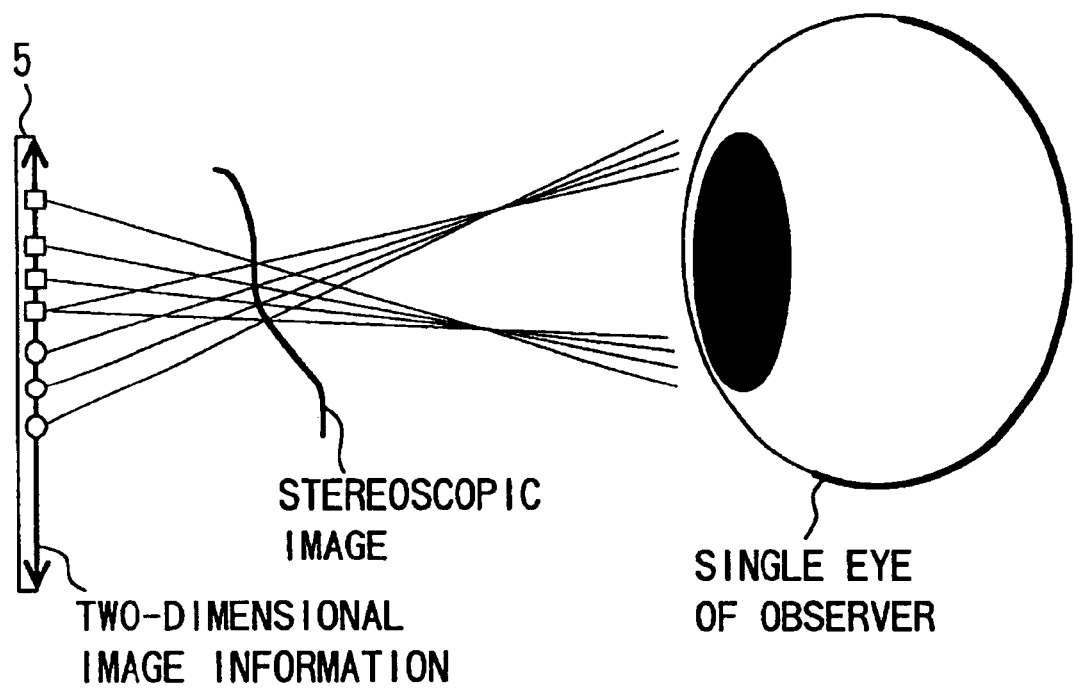
FIG. 21 is a schematic diagram showing the principle of stereoscopic display of the super-multiview regions realized in the stereoscopic image display apparatus of Embodiment 1.

This is hereinafter described with reference to FIG. 21. FIG. 21 shows how a three-dimensional image is reproduced when light beams from light convergence points do not achieve pupil image-formation. Such failure to form images is caused mainly by aberration of the relay optical system 10. In the case in FIG. 21, however, if light beams from each reproduced two-dimensional image shown in FIG. 21 intersect each other at each point forming a three-dimensional image correctly, and several light beams after the intersections are formed are incident on a single eye of an observer, the observer can recognize these intersections only by the single eye. In other words, when the light beam is incident on the pupil of the observer with no divergence and with directivity, and several light beams after the intersections are formed are incident on the single eye of the observer, the observer can recognize a three-dimensional image of super-multiview regions even if the image at the light convergence point does not correctly form an image as the pupil.

Figure 19:
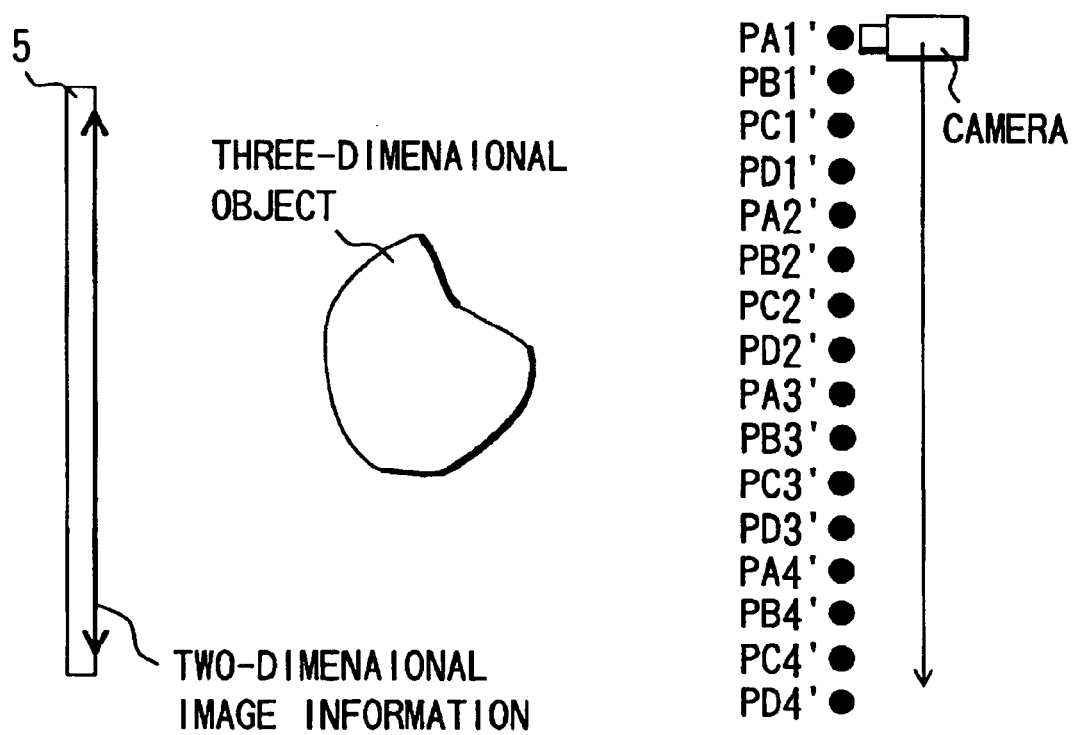
FIG. 19 is a schematic diagram showing an exemplary method of producing a parallax image displayed in the stereoscopic image display apparatus of Embodiment 1.

FIG. 19 shows an example of a method of producing a typical parallax image used in stereoscopic vision in the structure of FIG. 18 or a parallax image used in the "stereoscopic display of super-multiview regions." As shown in FIG. 19, a moving camera takes images of a three-dimensional object to be reproduced in turn at the respective pupil positions (PA1', PB1' and the like) to form a set of parallax image information associated with the respective pupil positions. The information is used as two-dimensional image information formed on the diffusion member 5 by the light beam.

For example, the parallax image information taken at the viewpoint PA1' is used as image information formed by beam deflection with the light convergence point PA1 as the center, and the parallax image information taken at the viewpoint PB1' is used as image information formed by beam deflection with the light convergence point PB1 as the center. In this manner, the intensity of a light beam emitted from the light beam scanning unit 1 shown in FIG. 1 is modulated to form parallax image information associated with each viewpoint, thereby obtaining necessary parallax images.

In Embodiment 1, the parallax images are formed by the input from the moving camera taking the images at a number of viewpoints as shown in FIG. 19. However, a plurality of cameras may be used to input a plurality of two-dimensional image information, or the technique of computer graphics may be utilized to artificially take a plurality of two-dimensional image information with a virtual camera.

Figure 22:
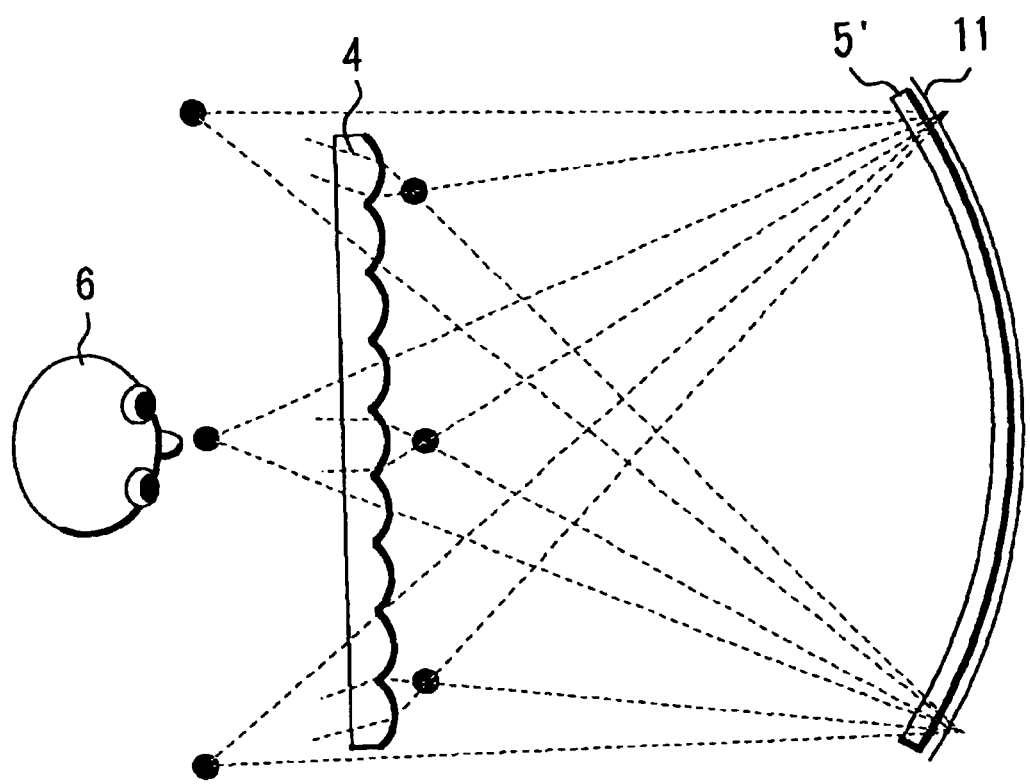
FIG. 22 is a schematic diagram showing another structure of the stereoscopic image display apparatus of Embodiment 1.
Figure 23:
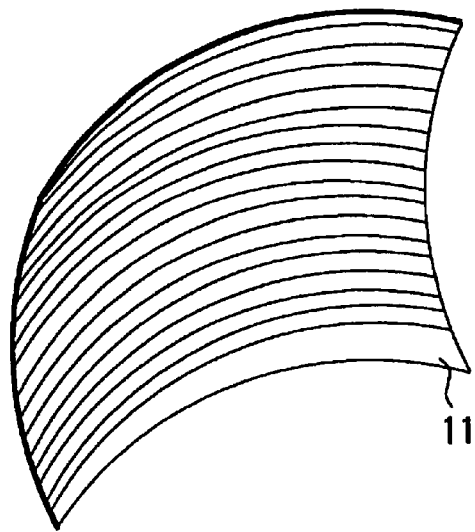
FIG. 23 shows an exemplary concave mirror used in the apparatus in FIG. 22.

Next, possible changes in the components of Embodiment 1 are described. First, the relay optical system 10 can be formed of a convex lens, but a reflection optical system such as a concave mirror 11 may be used as shown in FIGS. 22 and 23. For easy recognition, the members and the optical paths on the side of the field optical system 3 closer to the light source are omitted in FIG. 22.

In this case, however, if the diffusion member 5' is disposed in front of the concave mirror 11, a beam passes through the diffusion member 5' twice to produce image blurring. Thus, as shown in FIG. 23, it is desirable to take measures to diffuse light in the vertical direction on the surface of the concave mirror 11 by forming fine projections and depressions in the vertical direction on the surface of the concave mirror 11 or a lenticular periodic structure.

Since the use of the reflection type optical system tends to cause interference between a reproduced three-dimensional image and the member such as the light beam scanning unit 1, it is desirable to employ optical arrangement decentered in the vertical direction such as a front projector system.

Figure 24:
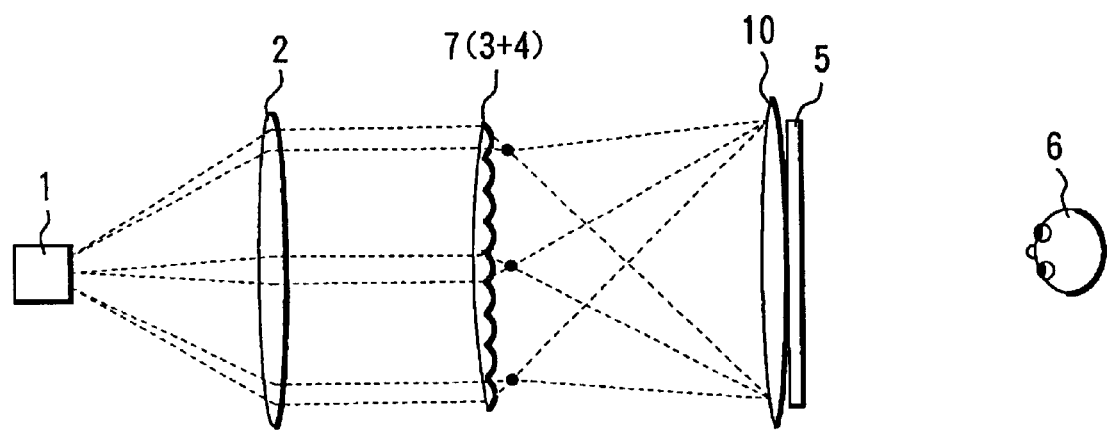
FIG. 24 is a schematic diagram showing yet another structure of the stereoscopic image display apparatus of Embodiment 1.

In addition, several variations of the light deflection member 4 are possible. For example, as shown in FIG. 24, it is possible to use a hybrid light deflection member 7 which is formed of the field optical system 3 and the light deflection member 4 as an integral component. The use of the hybrid light deflection member 7 can reduce the number of the parts to enhance the accuracy of positioning at the time of assembling.

Figure 25:
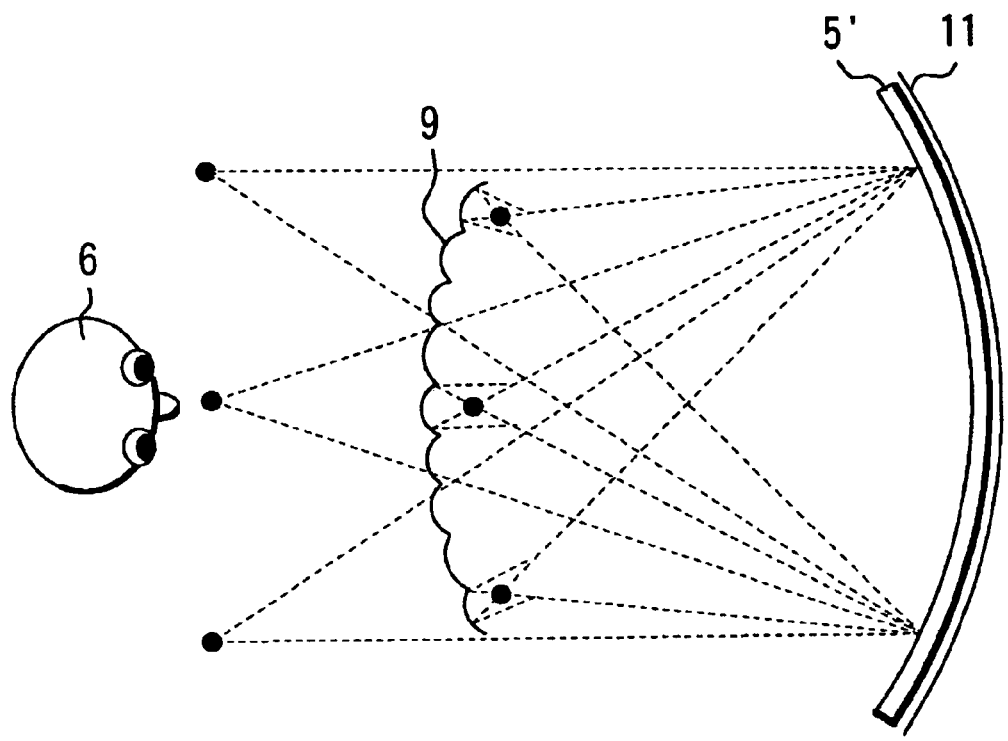
FIG. 25 is a schematic diagram showing still another structure of the stereoscopic image display apparatus of Embodiment 1.

Furthermore, the light deflection member 4 may be formed of a reflection optical system. In this case, a concave mirror array 9 is used as shown in FIG. 25.

Figure 26:
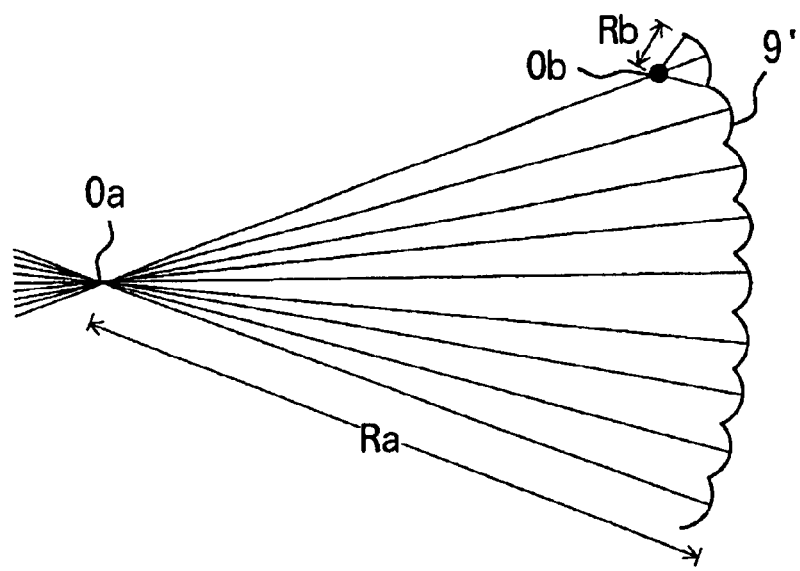
FIG. 26 is a schematic diagram showing a composite concave mirror array used in the apparatus in FIG. 25.

Additionally the concave mirror array can serve as the field optical system 3 to integrate the light deflection member and the field optical system into a single reflection optical system. In this case, a composite concave mirror array 9' formed by providing the concave mirror array 9 with a concave shape as a whole is used as shown in FIG. 26. The composite concave mirror array 9' is formed by combining a concave mirror having a radius Ra and the center Oa and a lenticular concave mirror array, each mirror element of the array having a radius Rb (<Ra) and the center Ob as shown in FIG. 26.

While a transmission type optical system has a limit on the size of a member due to the thickness of the optical system and the like, the reflection optical system can be formed in a considerably large size. The reflection optical system can provide the preferable characteristic in that no chromatic aberration occurs.

Figure 27:
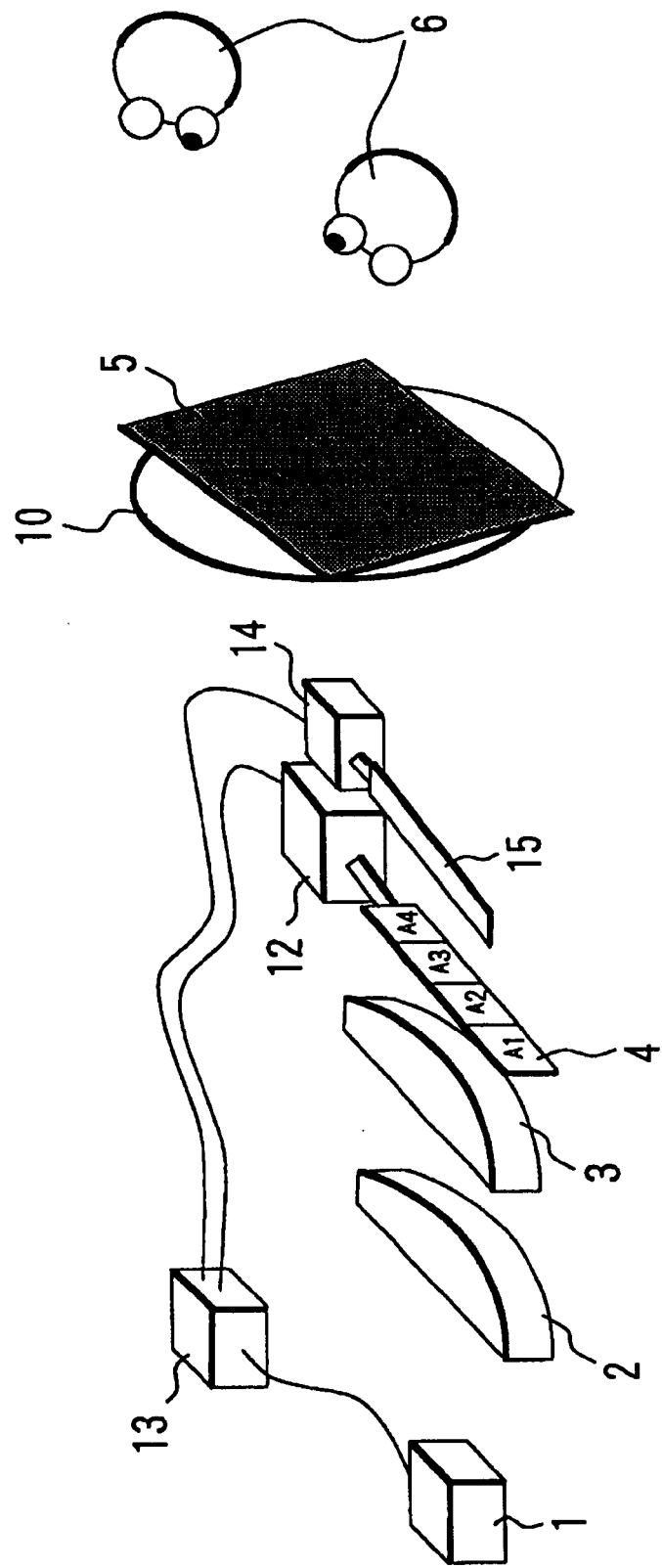
FIG. 27 is a schematic diagram showing another structure of the stereoscopic image display apparatus of Embodiment 1.

In the structure so far described, the light beam scanning unit performs scanning two-dimensionally. However, the light beam scanning unit may perform scanning only in the horizontal direction and a second light beam scanning unit may be provided to perform scanning with a light beam after it emerges from the light deflection member 4 as shown in FIG. 27. The light beam scanning unit in this case includes a galvano motor 14 and a rotation mirror 15 in which the galvano motor 14 drives rotation of the rotation mirror 15 attached thereto. To facilitate the beam scanning in the vertical direction, the correction optical system 2, the field optical system 3, and the individual deflection elements of the light deflection member 4 are formed to have an optical power only in the horizontal direction and have no optical power in the vertical direction.

Figure 28:
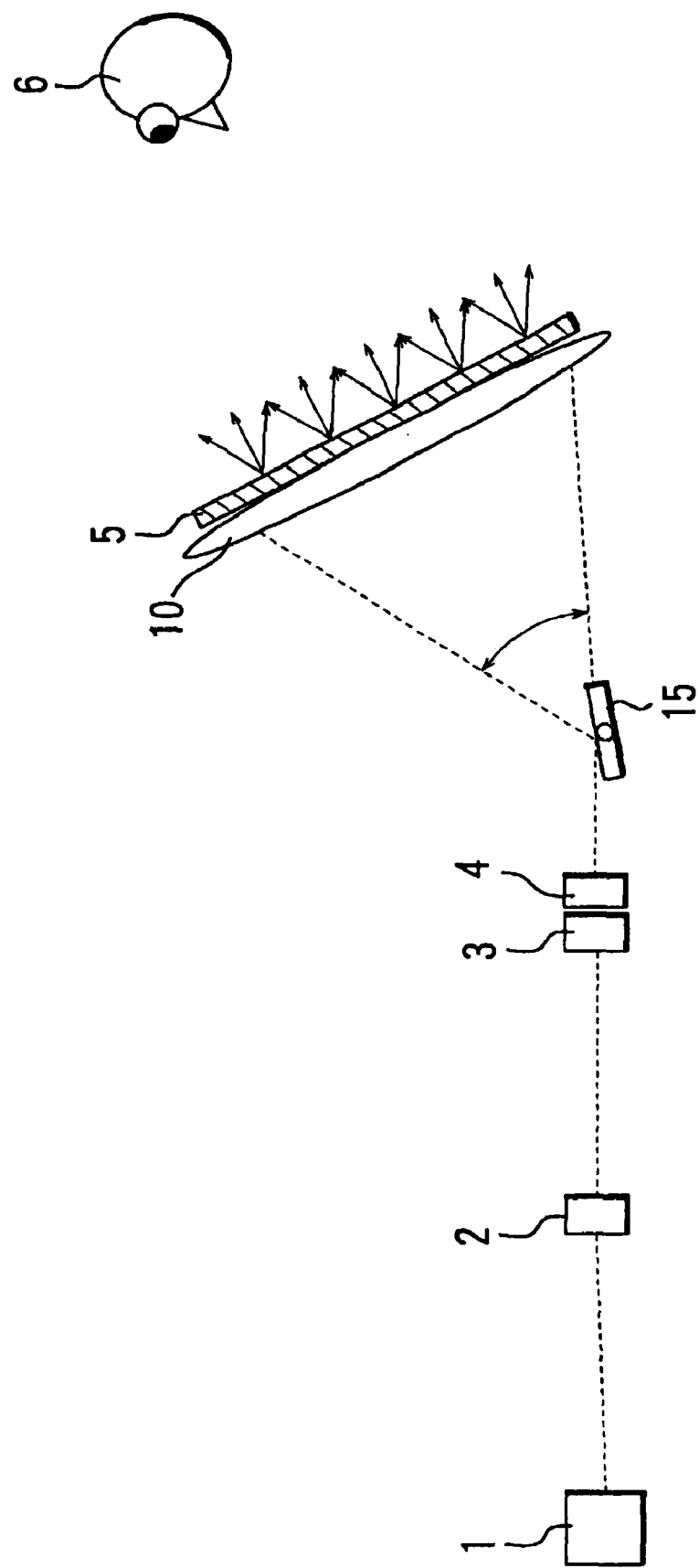
FIG. 28 is a side view schematically showing the structure of the apparatus shown in FIG. 27.

FIG. 28 is a side view of the structure. A light beam scanned by the light beam scanning unit 1 in the horizontal direction passes through the light deflection member 4 and forms a convergence point in the horizontal direction, and then the light beam is scanned by the rotation mirror 15 in the vertical direction.

In this manner, the structure differs from the structure shown in FIG. 1 in that the light beam scanning is later performed in the vertical direction, but the former does not differ from the latter in that two-dimensional image information is formed on the diffusion member 5 and that the convergence point of the light beam in the horizontal direction forms an image near the observer by the relay optical system 10 as an elongated observation pupil. Thus, the structure can achieve three-dimensional image reproduction without problems.

(Embodiment 2)

Figure 29:
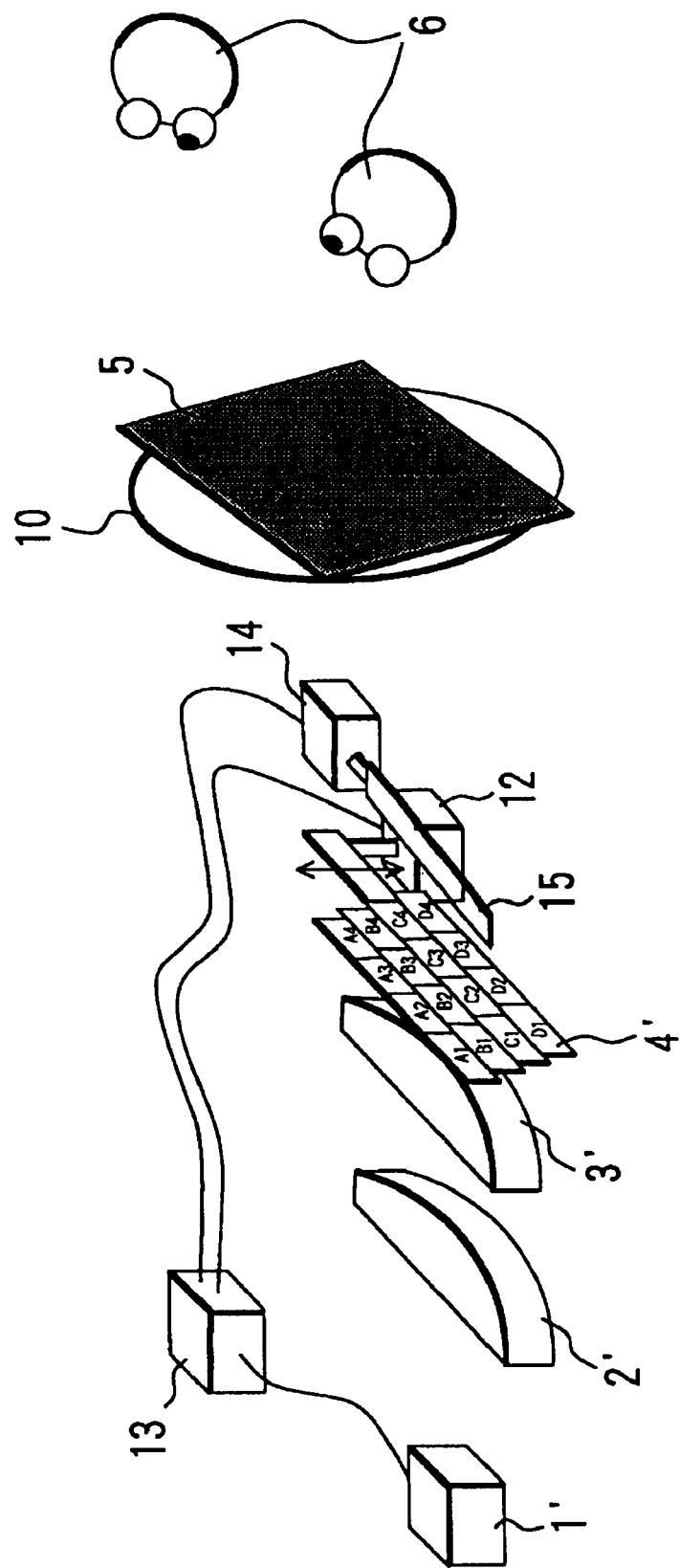
FIG. 29 is a schematic diagram showing the structure of a stereoscopic image display apparatus which is Embodiment 2 of the present invention.

FIG. 29 is a schematic diagram showing the structure of a stereoscopic image display apparatus which is Embodiment 2 of the present invention. Embodiment 2 differs from Embodiment 1 in the two points: (1) a light beam scanning unit 1' performs scanning of a light beam only in the horizontal direction, and a correction optical system 2' and a field optical system 3' have an optical power only in the horizontal direction; and (2) a light deflection member 4' has an optical power only in the horizontal direction, and after a light beam passes through the light deflection member 4', scanning of the light beam is performed by a rotation mirror 15 connected to a galvano motor 14 in the vertical direction.

Figure 30:
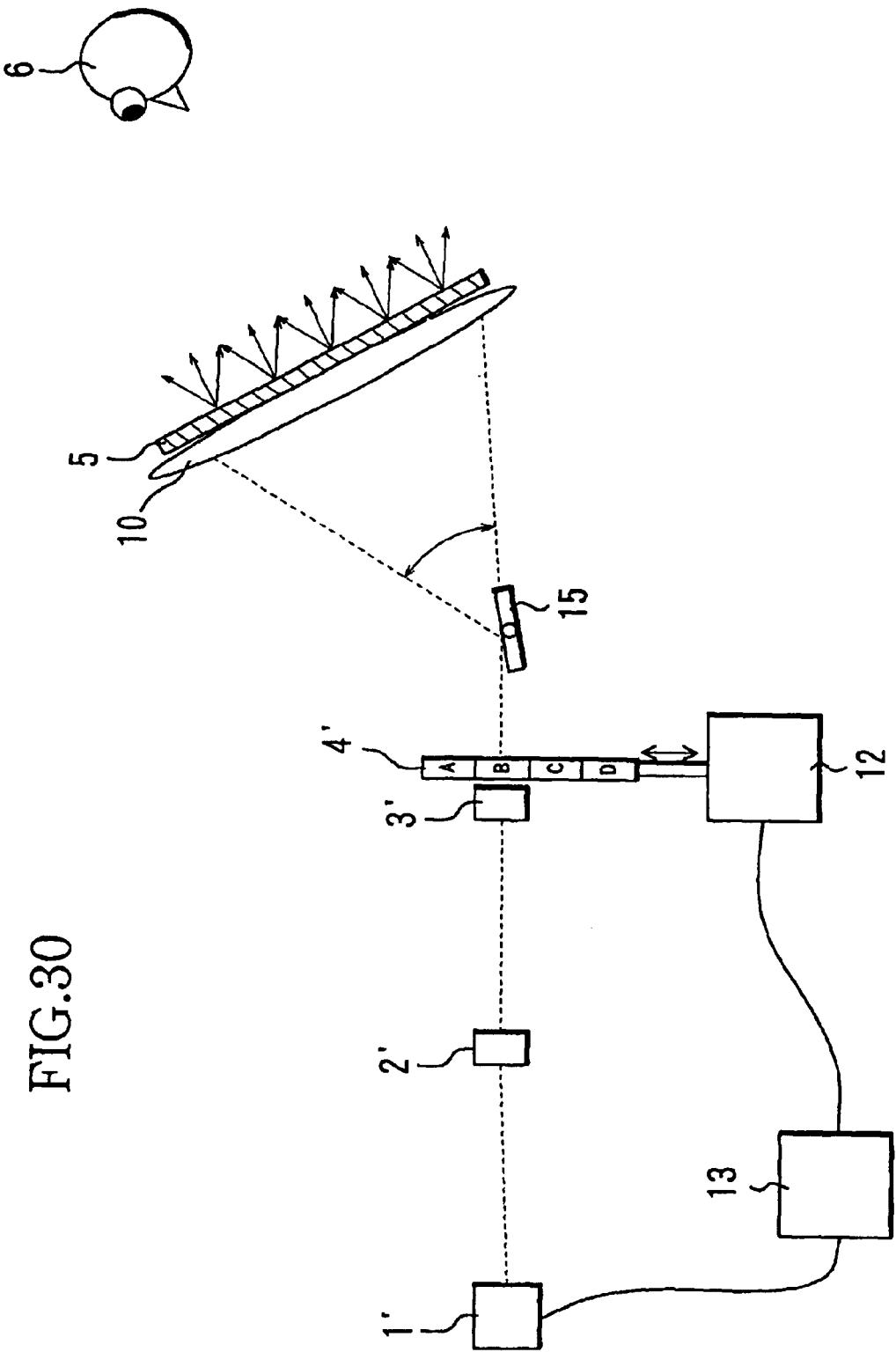
FIG. 30 is a side view schematically showing the structure of the apparatus shown in FIG. 29.

FIG. 30 is a side view of the apparatus of Embodiment 2. With the differences described above, the light beam scanning unit 1' first performs light beam scanning in the horizontal direction in Embodiment 2. The light beam passes through the light deflection member 4' and forms a convergence point, and then is scanned by the rotation mirror 15 in the vertical direction. However, the light deflection member 4' is moved in the vertical direction in synchronization with the light beam scanning, so that the light beam is incident on different deflection elements (light deflection elements of stages A to D) gradually, and accordingly, the positions of the light convergence points are changed in a shaped manner as described later. Thus, similarly to Embodiment 1, temporal multiplexing of the positions of the light convergence points is realized.

Figure 32:
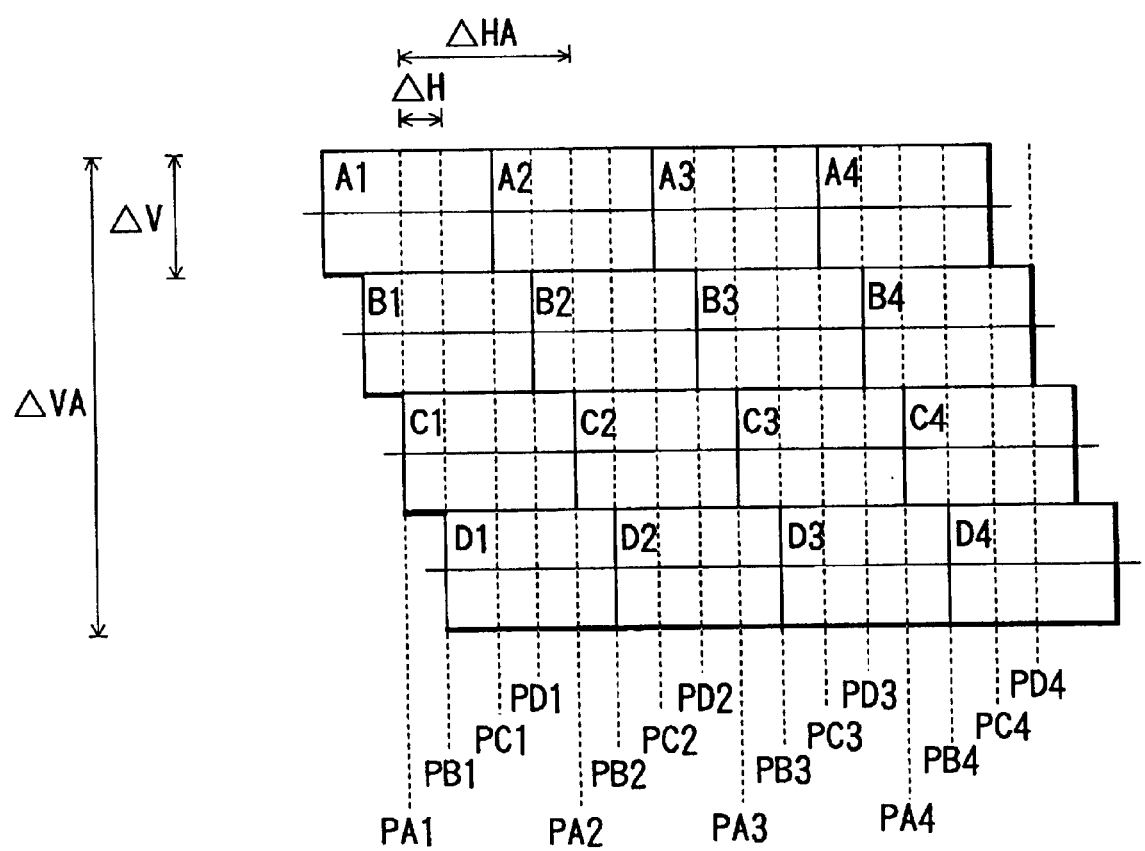
FIG. 32 is a timing chart showing the movement of the light deflection member in Embodiment 2.

FIG. 32 is a front view of the light deflection member 4'. While the light deflection elements of the light deflection member 4 are arranged one-dimensionally in the horizontal direction in Embodiment 1, the light deflection elements are arranged two-dimensionally in a 4 by 4 matrix in Embodiment 2. Groups of light deflection elements located at the same height (stage) are disposed at horizontally shifted positions. Thus, the minimum distance between light convergence points formed by the respective light deflection elements in the horizontal direction is equal to ΔH defined in Embodiment 1. The height of each light deflection element stage is ΔV, and the height of all the stages of the light deflection elements is ΔVA.

Next, description is made for the relationship between the movement of the light deflection member 4' and the multiplexing of the light convergence points in Embodiment 2.

Figure 31:
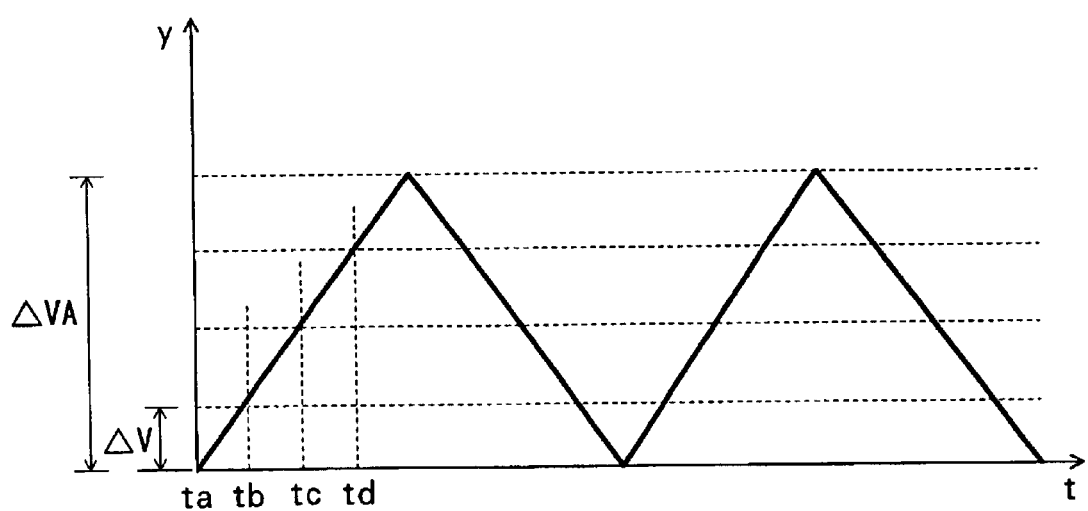
FIG. 31 is a front view schematically showing the structure of a light deflection member used in Embodiment 2.

FIG. 31 is a timing chart showing the movement of the light deflection member 4'. In the chart, the horizontal axis represents a time t, while the vertical axis represents a position y in the vertical direction.

At a time ta (t=ta), a light beam is incident on the top end of the light deflection member 4'. Since the light beam is subjected to the action of the stage A formed of light deflection elements A1 to A4, the light beam is converged to horizontal convergence points PA1, PA2, PA3, and PA4. This is because the light deflection member 4' has an optical power only in the horizontal direction as described above to converge the light beam in the horizontal direction to the horizontal convergence point without changing the height of the light beam when it is incident on the stage A at any height.

The light deflection member 4' is continuously moved in the vertical direction during the transition from the time ta (t=ta) to a time tb (t=tb), but the position of the light convergence point in the horizontal direction is not changed.

At the time tb (t=tb), the light beam is incident on the top end of the stage B. At this point in time, the light convergence points of the light beam are changed to PB1, PB2, PB3, and PB4. The positions of convergence points are maintained from the time tb (t=tb) to a time tc (t=tc).

Similarly, the incident position of the light beam is changed gradually, for example, to the stage B, stage C, stage D, stage C, stage B, stage A, and stage B. When the light convergence point of the light beam in the horizontal direction is defined as x, the timing chart showing the movement of the light convergence position is exactly the same as the timing chart of FIG. 12. In this manner, it is seen that Embodiment 2 can achieve multiplexing of the light convergence points in the same manner as Embodiment 1.

With the apparatus structure as in Embodiment 2, even when the driving unit 12 does not perform discrete driving operation but performs continuous operation as shown in FIG. 31, the similar effects to those obtained through the operation shown in FIG. 12 can be provided without movements of the light convergence points occurring in the operation as shown in FIGS. 13 to 15.

In Embodiment 2, similarly to Embodiment 1, since the movement of the light deflection member 4' is repeated in short cycles equal to or shorter than the time of persistence of vision of a human, the observer recognizes 16 light convergence points as if they simultaneously exist. In this event, the distance ΔH between adjacent ones of all the light convergence points in the horizontal direction is an equal pitch (ΔH).

FIG. 18 also shows pupil image-formation achieved by the multiplexing of the light convergence points and the actions of the relay optical system 10 and the diffusion member 5 in this embodiment. In Embodiment 2, similar effects to those in Embodiment 1 can be achieved.

It goes without saying that the structure of any of the components can be changed in the same manner as in Embodiment 1 since the light beam in Embodiment 2 travels in the same manner as in Embodiment 1 other than the aforementioned differences.

(Embodiment 3)

Figure 33:
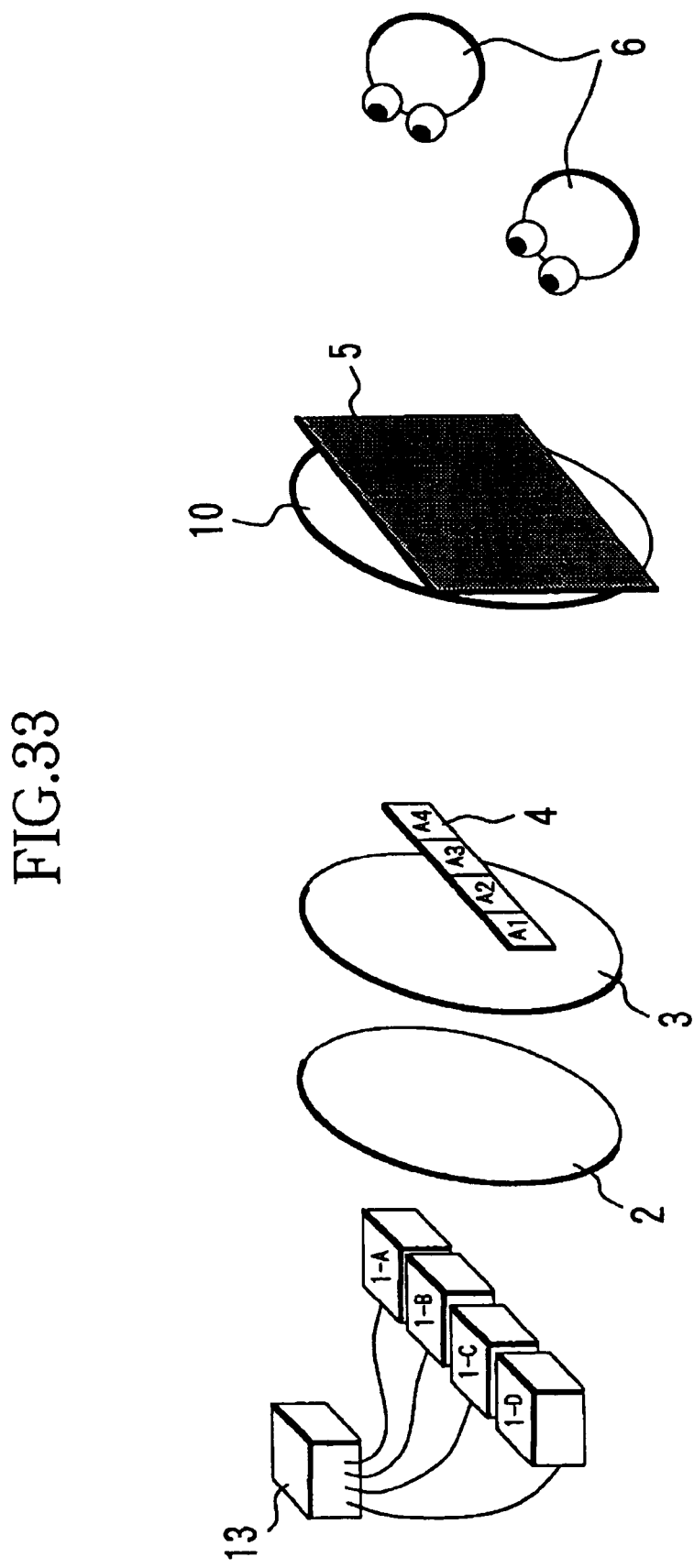
FIG. 33 is a schematic diagram showing the structure of a stereoscopic image display apparatus which is Embodiment 3 of the present invention.

FIG. 33 is a schematic diagram showing the structure of a stereoscopic image display apparatus which is Embodiment 3 of the present invention. Embodiment 3 differs from Embodiment 1 in two points: (1) a plurality of light beam scanning units are arranged in the horizontal direction, and each of them performs beam scanning to cause a light beam to be incident on a light deflection member 4; and (2) the driving unit 12 is not present, and the position of the light deflection member 4 is fixed.

With the differences mentioned above, multiplexing of light convergence points in Embodiment 3 is different from those in the other embodiments in nature. While light convergence points are multiplexed by the movement of the light deflection member 4 on a time series basis in the other embodiments, the emerging positions of light beams are multiplexed spatially to result in realization of spatial multiplexing of light convergence points in Embodiment 3.

Figure 34:
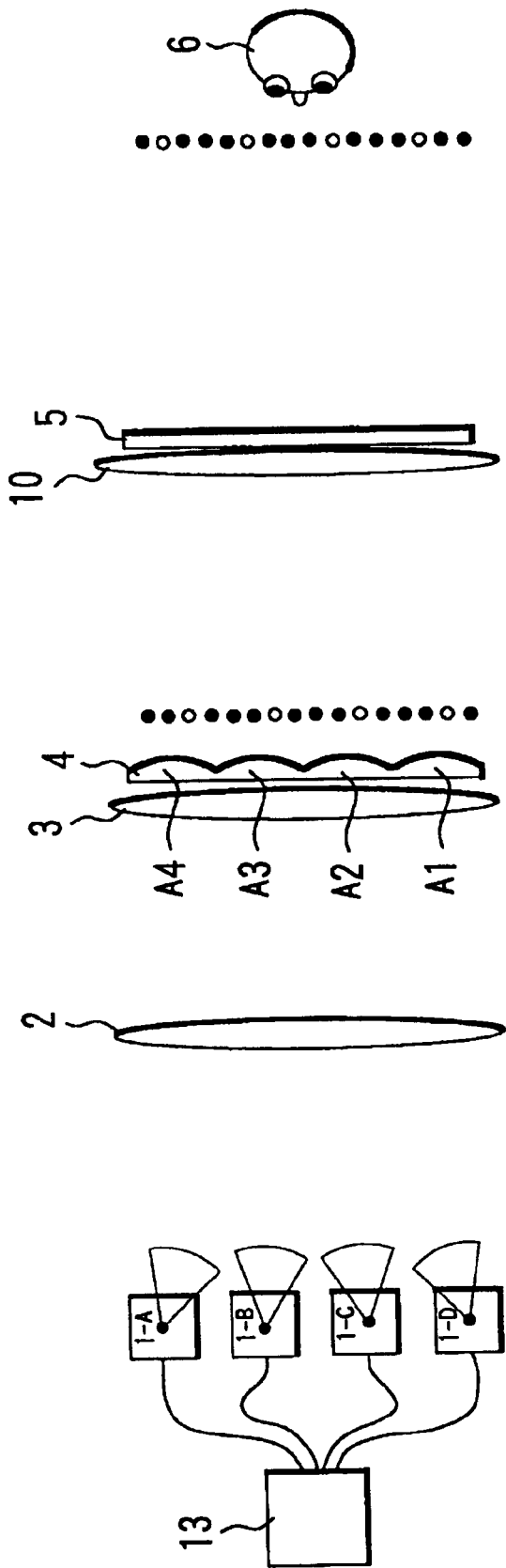
FIG. 34 is a schematic diagram showing viewpoint multiplexing in the stereoscopic image display apparatus of Embodiment 2.

FIG. 34 shows the structure of the apparatus in Embodiment 3 from the top. In Embodiment 3, light beams simultaneously emerge from four light beam scanning units 1-A to 1-D. All the units 1-A to 1-D are connected to a synchronization circuit 13 which can synchronize them in terms of light emission and scanning. All the light beams emitted from the four light beam scanning units 1-A to 1-D are incident on the light deflection member 4, once form light convergence points, and then form image information on a diffusion member 5. The light convergence points again form images in the air near an observer 6 by the action of a relay optical system 10.

For example, a deflection point of scanning in the horizontal direction of the light beam scanning unit 1-B is shown by a black circle within the light beam scanning unit 1-B. A light beam emitted from the deflection point forms a light convergence point after it emerges from the light deflection member 4 by the actions of a correction optical system 2, a field optical system 3, and the light deflection member 4, all of which constitute a display optical system. The light convergence points corresponding to 1-B are shown by white circular marks on the emerging side of the light deflection member 4. In addition, the light beam forming the light convergence point again forms an image at the position of the observer 6 by the action of the relay optical system 10. The image-forming points are shown by circular marks in front of the observer 6. The same applies to light beams emitted from the other light beam scanning units 1-B to 1-D.

As apparent from FIG. 34, the respective light beams from four light beam deflection points form the light convergence points by the actions of four light deflection elements A1 to A4, so that a total of 16 light convergence points are formed. These light convergence points are arranged to spatially interpolate each other. This arrangement can reduce the distance between adjacent ones of the light convergence points in the horizontal direction as compared with the case where one light beam scanning unit is used. For example, when the distance between adjacent ones of the image-forming positions of the light beam from the light beam scanning unit 1-A is defined as p, the distance between adjacent ones of all the light convergence points formed by the four light beam scanning units 1-A to 1-D can be equal to p/4.

In this manner, the plurality of light beam scanning units are disposed in the horizontal direction to provide the special multiplexing of the light convergence points to allow arrangement of a plurality of observation pupils in the horizontal direction with a fine pitch in Embodiment 3. It is thus possible to provide a stereoscopic image display apparatus which has similar effects to those in the other embodiments.

Since the light beam in Embodiment 3 travels in the same manner as in Embodiment 1 other than the aforementioned differences, the structure of any of the components can be changed in the same manner as in Embodiment 1.

As described above, according to Embodiments 1 and 2, the light deflection member comprises the light deflection elements each having the action of deflecting the incident light beam to cause it to pass through the predetermined convergence point, and the light deflection member can be regularly moved. Thereby, when two-dimensional images are reproduced corresponding to a number of viewpoints by using a single or a plurality of light sources, the multiplexing of the viewpoints for observation can be achieved with suppressed deformation of the beam light emitted from the light source(s) and improved resolution. It is thus possible that a stereoscopic image display apparatus which can prevent a reduction in resolution of reproduced two-dimensional images and, conversely, which can reproduce a three-dimensional image of high resolution.

According to Embodiment 3, the light deflection member has the plurality of light deflection elements each having the action of deflecting the incident light beam to cause it to pass through the predetermined convergence point, and the light beams emitted from the plurality of light beam scanning units are incident on the light deflection member. It is thus possible to a stereoscopic image display apparatus which can prevent a reduction in resolution of reproduced two-dimensional images (that is, which can improve resolution) similarly to Embodiments 1 and 2.

While Embodiment 1 to 3 have been described for the case where a monochrome light beam is used for scanning to form a monochrome image, a full color image can be formed by performing scanning with light beams of three colors R, G, and B.

In addition, according to Embodiments 1 to 3, it is possible to a stereoscopic image display apparatus which can favorably display a three-dimensional image of super-multiview regions in reproducing a three-dimensional image for an observer.

(Embodiment 4)

Figure 35:
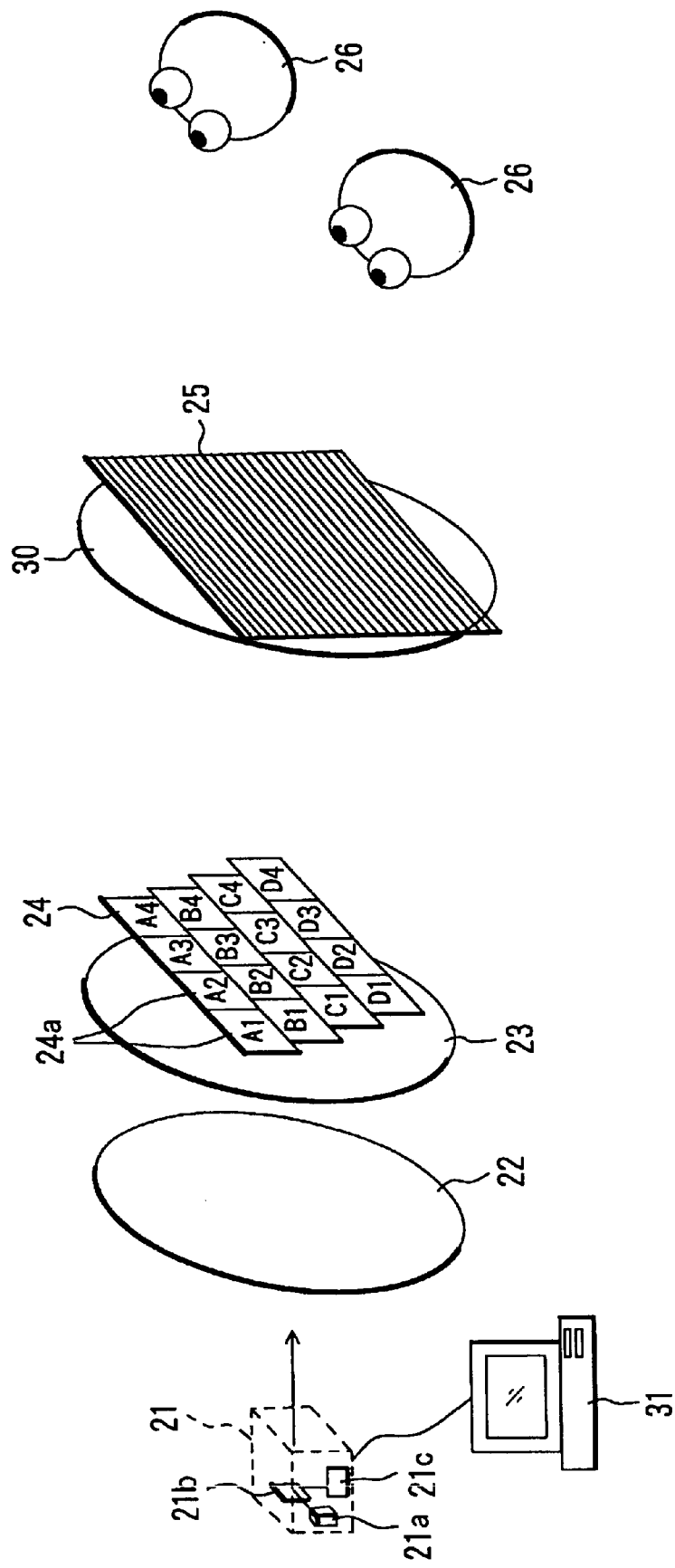
FIG. 35 is a schematic diagram showing the structure of a stereoscopic image display apparatus which is Embodiment 4 of the present invention.

FIG. 35 shows the structure of a stereoscopic image display apparatus which is Embodiment 4 of the present invention.

In FIG. 35, reference numeral 21 shows a beam scanning unit. The beam scanning unit 21 includes a light source 21a, an optical system (not shown) which forms a luminous flux from the light source 21a into a beam shape with high directivity, a scanning device 21b which deflects the light beam for scanning, and a modulation circuit 21c which drives the scanning device 21b at predetermined timings and drives the light source 21a to modulate a light beam emitted therefrom. The beam scanning unit 21 performs scanning with a light beam two-dimensionally within a predetermined scanning area.

Connected to the beam scanning unit 21 is an image information supply apparatus 31 such as a personal computer, a VCR, and a DVD player. The modulation circuit 21c contained in the beam scanning unit 21 modulates the intensity of a luminous flux (light beam) emitted from the light source 21a in response to a plurality of pieces of image information (image signals) with parallax included therein input from the image information supply apparatus 31. The timing at which the light beam is modulated is later described.

As the light source 21a, a semiconductor laser, an LED or the like can be used. The light source 21a is combined with the optical system such as a lens for forming a light beam and the device which can deflect the beam at high speed for scanning, such as a polygon mirror, a galvano mirror, an AOM (Acousto-Optic Modulator), and an MEMS (Microelectromechanical System) to constitute the beam scanning unit 21.

Reference numeral 22 shows a correction optical system which corrects the direction of a light beam. Typically, an fθ lens is used for the correction optical system 22.

Reference numeral 23 shows a field optical system which is responsible for adjusting the direction of a light beam such that it traces a desired optical path in the apparatus.

Figure 36:
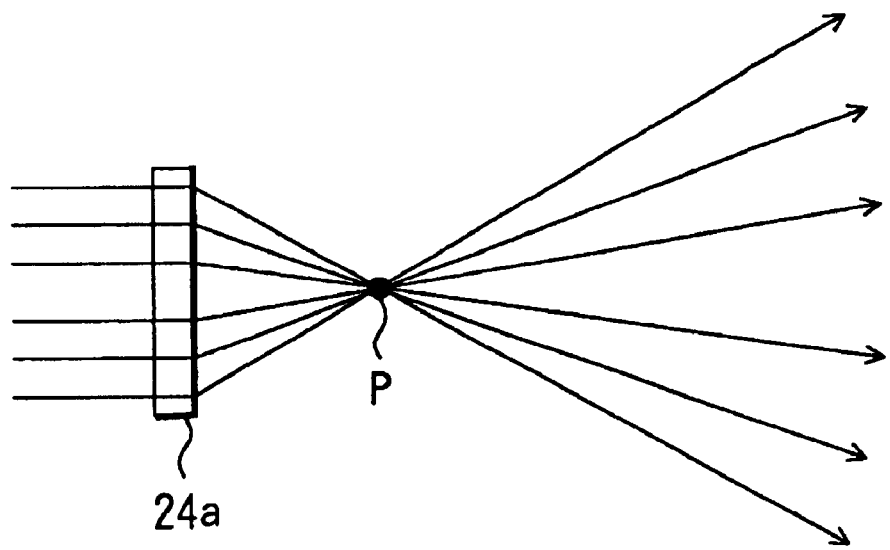
FIG. 36 is an explanatory view showing the effect of a deflection element array used in the stereoscopic image display apparatus of Embodiment 4.
Figure 37:
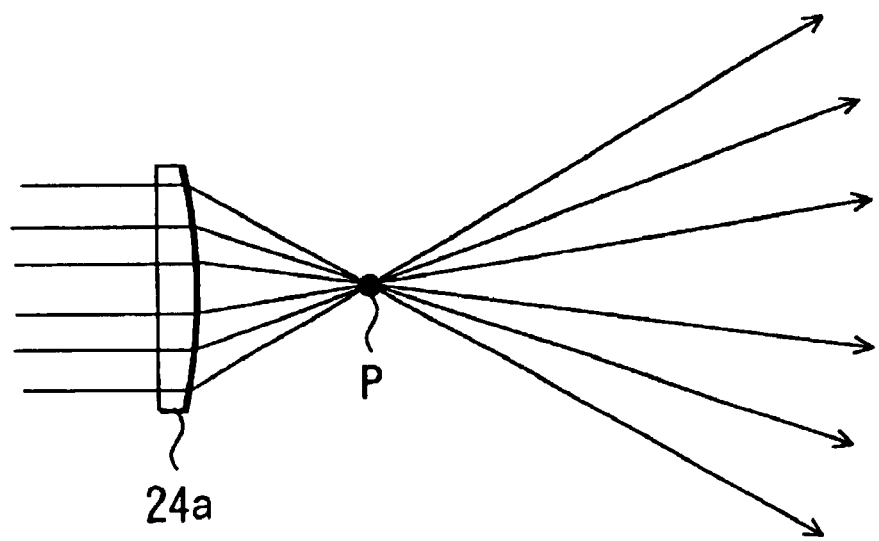
FIG. 37 is an explanatory view showing the effect of the deflection element array formed of a convex lens array used in the stereoscopic image display apparatus of Embodiment 4.
Figure 38:
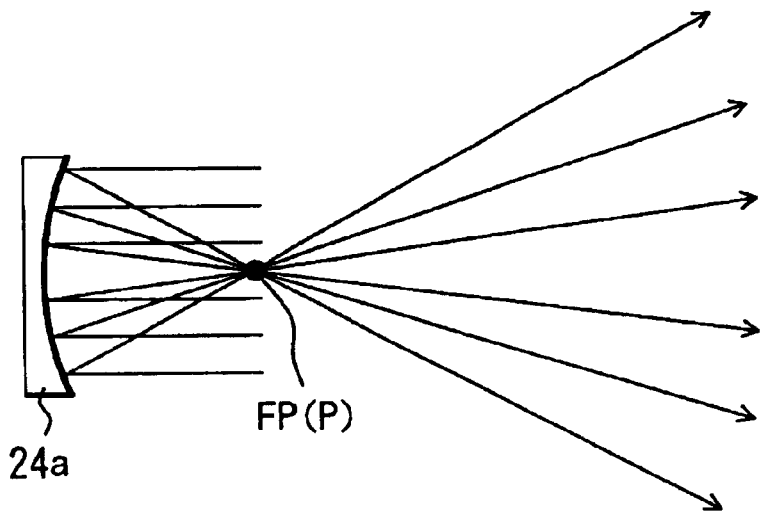
FIG. 38 is an explanatory view showing the effect of the deflection element array formed of a concave mirror array used in the stereoscopic image display apparatus of Embodiment 4.

Reference numeral 24 shows a deflection element array including a plurality of deflection elements each having a light beam deflecting action. The deflection element array 24 is formed of periodically arranged deflection elements 24a which deflect an incident light beam in different directions in accordance with the incident position of the light beam. As shown in FIG. 36, each of the deflection elements 24a constituting the deflection element array 24 has the action of deflecting a plurality of light beams incident thereon at different positions and with a time difference to lead them toward the same convergence point P. As such a deflection element, a hologram element, a diffraction grating or the like can be used. Alternatively, a typical lens (a convex lens) as shown in FIG. 37 may be used as the deflection element 24a. Alternatively, a concave mirror having a focal point FP as a convergence point P, as shown in FIG. 38 may be used as the deflection element 24a.

Figure 39:
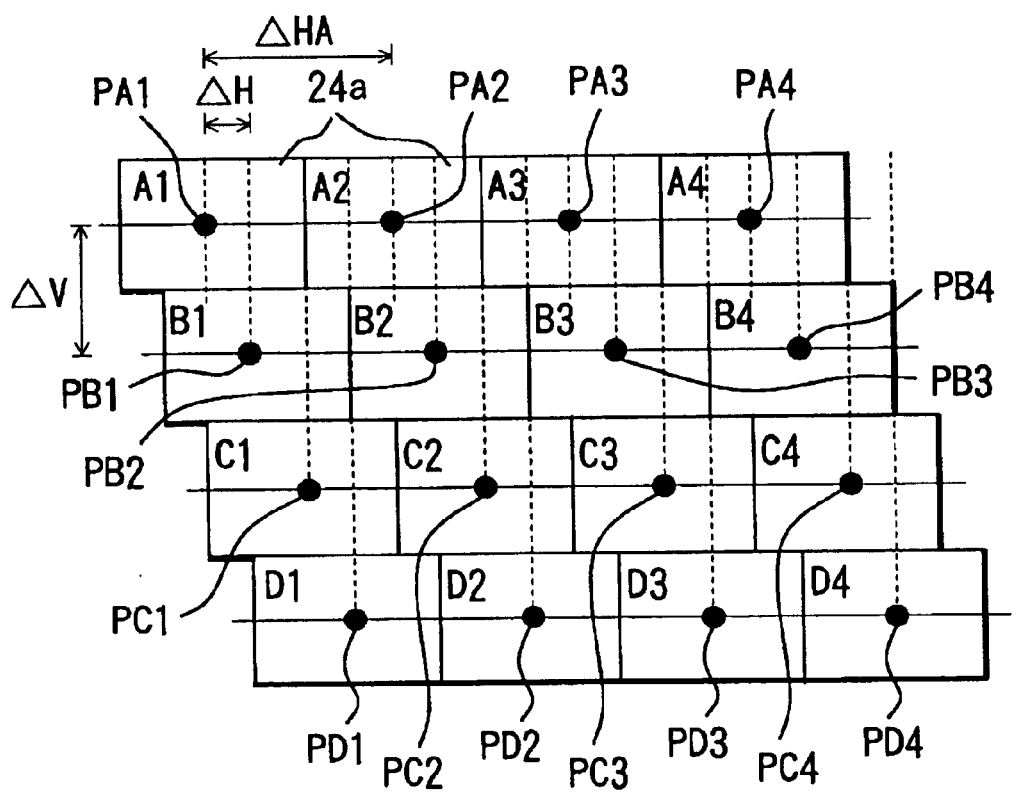
FIG. 39 is a front view of the deflection element array of Embodiment 4.

FIG. 39 is a front view of the deflection element array 24. In Embodiment 4, four deflection elements 24a are arranged in the horizontal direction to form a single deflection element row, and four deflection element rows are provided in the vertical direction. In other words, the deflection element array 24 is formed of a set of the four deflection element rows (rows A, B, C, and D) and have a total of 16 deflection elements A1 to D4. In FIG. 39, PA1, PA2, . . . , PD4 show convergence points of light beams formed by the respective deflection elements and correspond to pixels.

The deflection element array herein described, however, is typical one. Actually, 10 deflection element rows, each having 10 deflection elements 24a arranged in the horizontal direction, are provided in the vertical direction, and thus a total of 100 deflection elements 24a are provided, by way of example.

As described above, the beam scanning unit 21 emits a light beam for two-dimensional scanning. The scanning area matches the entire area of the deflection element array 24. For example, when a main scanning direction of the beam scanning is the horizontal direction, the incident position of the light beam is moved in the horizontal direction along the top of the deflection elements in the row A to pass through the four deflection elements A1 to A4. In this event, a sub-scanning direction is the vertical direction. The incident height of the light beam is changed each time horizontal scanning is completed from the left to the right of each row, and finally, the incident position is moved in the horizontal direction along the bottom of the deflection elements of the row D.

Such scanning can be realized by a technique such as raster scanning with electron beams in a CRT of a television set.

As shown in FIG. 39, in Embodiment 4, the four deflection element rows (the rows A, B, C, and D) are arranged with horizontal shifts from one another to avoid overlap between the horizontal positions of the light convergence points formed by the deflection elements constituting one deflection element row and the horizontal positions of the light convergence points formed by the deflection elements constituting the other deflection element rows. The details on the arrangement are later described.

Figure 40:
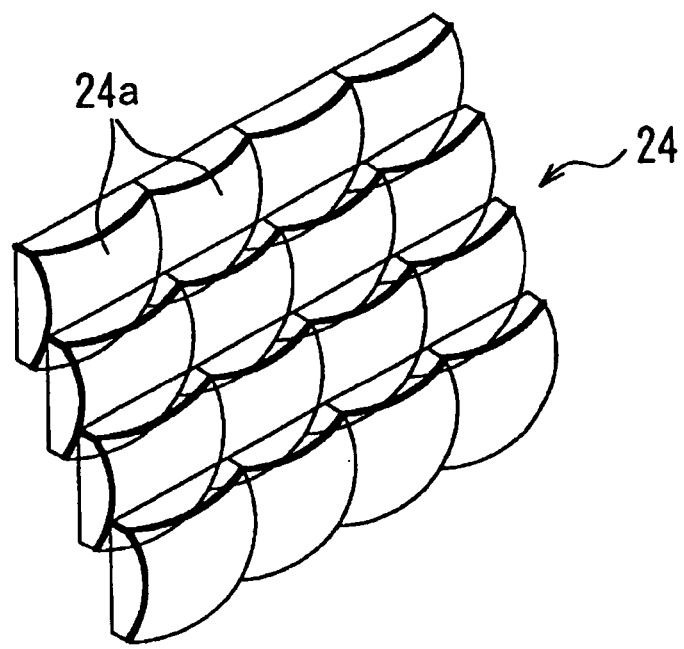
FIG. 40 is a perspective view showing the deflection element array formed of a convex lens array in Embodiment 4.
Figure 41:
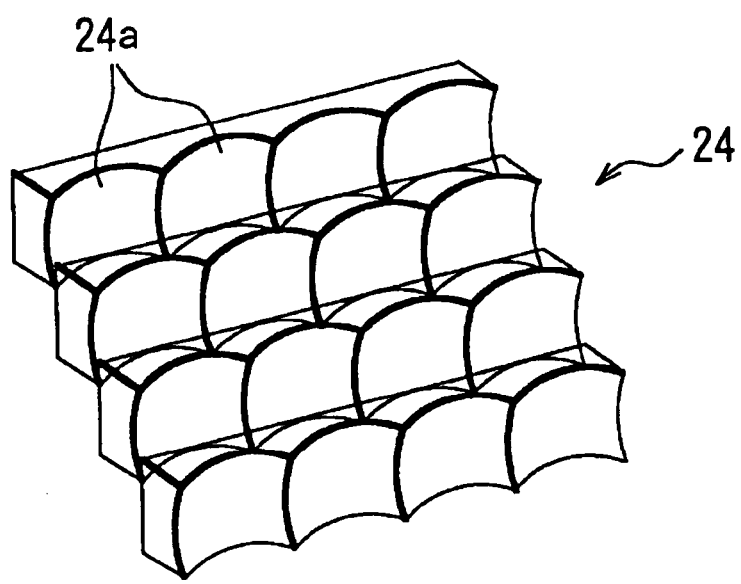
FIG. 41 is a perspective view showing the deflection element array formed of a concave mirror array in Embodiment 4.

As described above, when a convex lens is used as the deflection element 24a, the deflection element array 24 has a lens array as shown in FIG. 40. When a concave mirror is used as the deflection element array 24a, the light element array 24 has a mirror array as shown in FIG. 41.

In FIG. 35, reference numeral 30 shows a relay optical system which is responsible for leading components of light beam diffused by a vertical direction diffusion member (hereinafter referred to simply as the diffusion member) 25, described later, and horizontal components of light beam passing through the diffusion member 25 toward an observer 26 present in front of the apparatus.

The diffusion member 25 is an optical element which is responsible for diffusing a light beam in the vertical direction. Embodiment 4 employs a lenticular lens having a very small periodic structure in the vertical direction as the diffusion member 25. The periodic structure has a very fine pitch to allow the diffusion of the light beam only in the vertical direction while the directivity thereof is not changed in the horizontal direction, regardless of the incident position of the light beam.

Figure 42:
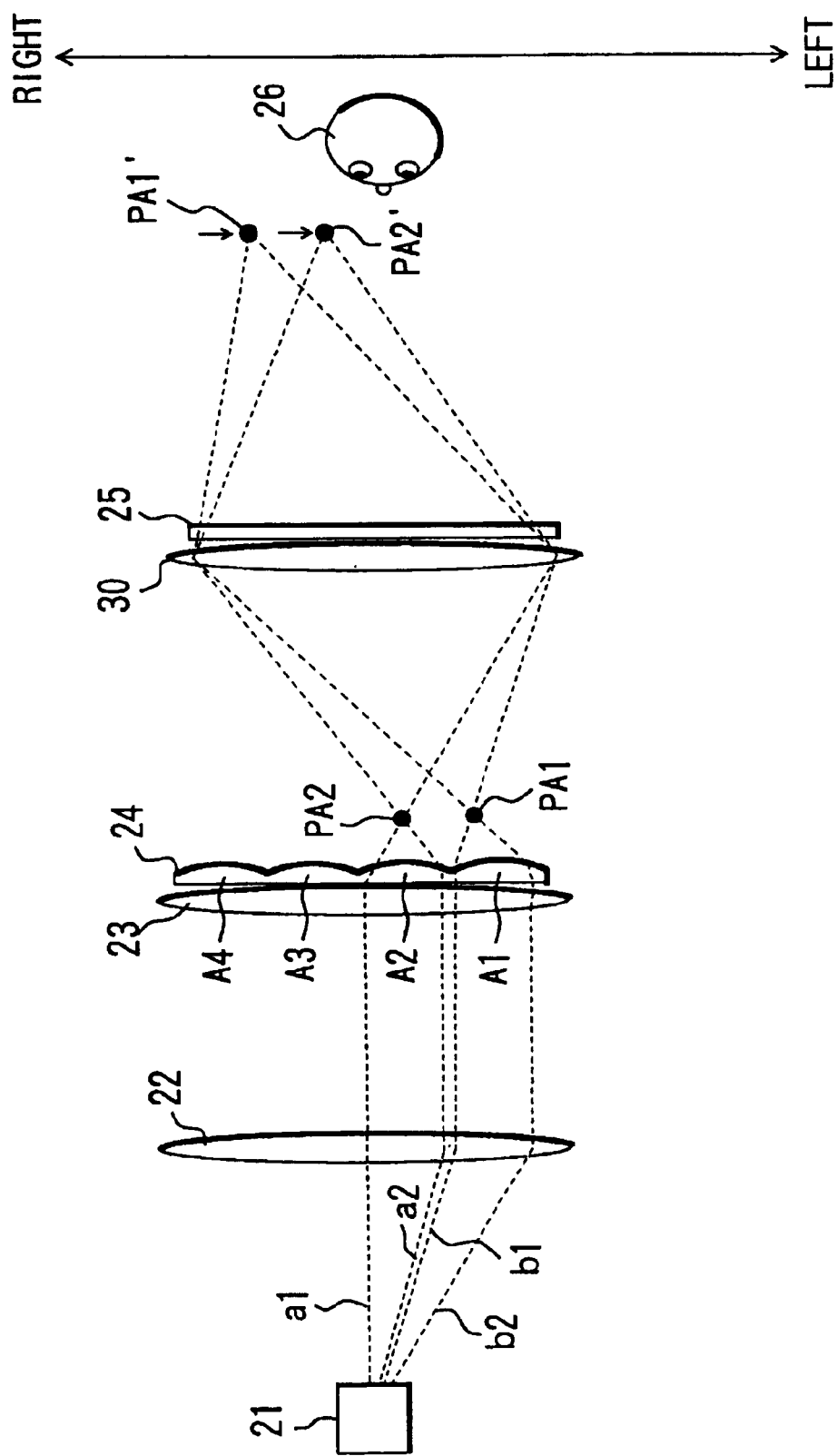
FIG. 42 is a plan view showing the optical effect in the stereoscopic image display apparatus of Embodiment 4.

Next, optical paths on which horizontal components of a light beam travel are described with reference to FIG. 42. FIG. 42 shows the apparatus from the top in section in the horizontal direction at the row A of the plurality of deflection element rows of the deflection element array 24. The same view is provided when the apparatus is shown in section at any of the other deflection element rows.

In FIG. 42, a convex lens array is used as the deflection element array 24. In FIG. 42, dotted lines a1, a2, b1, and b2 show optical paths of a light beam at different points in time. In FIG. 42, the right of the observer 26 (the top in FIG. 42) is defined as the right, while the left of the observer 26 (the bottom in FIG. 42) is defined as the left.

As a light beam travels on an optical path designated with a1, the light beam is incident near the right end of the deflection element A2 of the deflection element array 24. The light beam is deflected to the left by the deflection element A2, passes through the convergence point PA2, and is incident near the left ends of the relay optical system 30 and the diffusion member 25.

On the other hand, as a light beam travels on an optical path designated with a2, the light beam is incident near the left end of the deflection element A2 of the deflection element array 24. The light beam is deflected to the right by the deflection element A2, passes through the convergence point PA2, and is incident near the right ends of the relay optical system 30 and the diffusion member 25.

During the light beam scanning of the deflection element A2, an optical path between the paths a1 and a2 may occur. Thus, in Embodiment 4, it is possible to realize deflection and scanning of a light beam such that the diffusion member 25 is scanned two-dimensionally with the convergence point PA2 as the center of deflection during the light beam scanning from the paths a1 to a2.

Similarly, when a light beam travels on an optical path from b1 to b2 during the light beam scanning of the deflection element A1, deflection and scanning of a light beam on the diffusion member 25 can be realized with the convergence point PA1 as the center of deflection.

The modulation circuit 21c of the beam scanning unit 21 modulates the intensity of a light beam emitted from the light source 21a in accordance with the position of the light beam incident on the deflection element array 24, that is, every time a deflection element on which the light beam is incident is changed to the next, thereby making it possible to form 16 two-dimensional images with parallax on the diffusion member 25.

Next, description is made for the state of a light beam at the observation position where the observer 26 is to be positioned. The vertical components of the light beam reaching the diffusion member 25 are diffused, while the horizontal components thereof pass through the diffusion member 25. However, all the light components are led toward the observer 26 by the action of the relay optical system 30. Especially the horizontal components are subjected to the image-forming action of the relay optical system 30 and the respective convergence points form images in the air in different image-forming areas in the horizontal direction such that the convergence point PA1 forms an image in an image-forming area PA1' and the convergence point PA2 forms an image in an image-forming area PA2'.

Such an image-forming relationship between the convergence points and the image-forming areas is not limited to the deflection element row A but applies to all stages of the deflection element rows. However, as described above, the deflection element rows are arranged to avoid overlap between the horizontal positions of the convergence points of the respective deflection element rows. Specifically, as shown in FIG. 39, when the convergence points have a horizontal pitch ΔHA in each deflection element row, the convergence points of one deflection element row are disposed at horizontally shifted positions by ΔH from the convergence points of the adjacent deflection element row. ΔH is determined by (ΔHA/(the number of the deflection element rows)). Accordingly, all the convergence points have the equal pitch in the horizontal direction.

Embodiment 4 employs the respective deflection element rows disposed at the shifted positions from one another to provide the horizontal shift amount of the convergence points described above. Alternatively, the shape of the deflection element 24a in each deflection element row may be appropriately changed to shift only the convergence points of one deflection element row from the convergence points of the other deflection element rows without shifting the deflection element rows (that is, with the deflection element rows arranged in line in the vertical direction).

Figure 43:
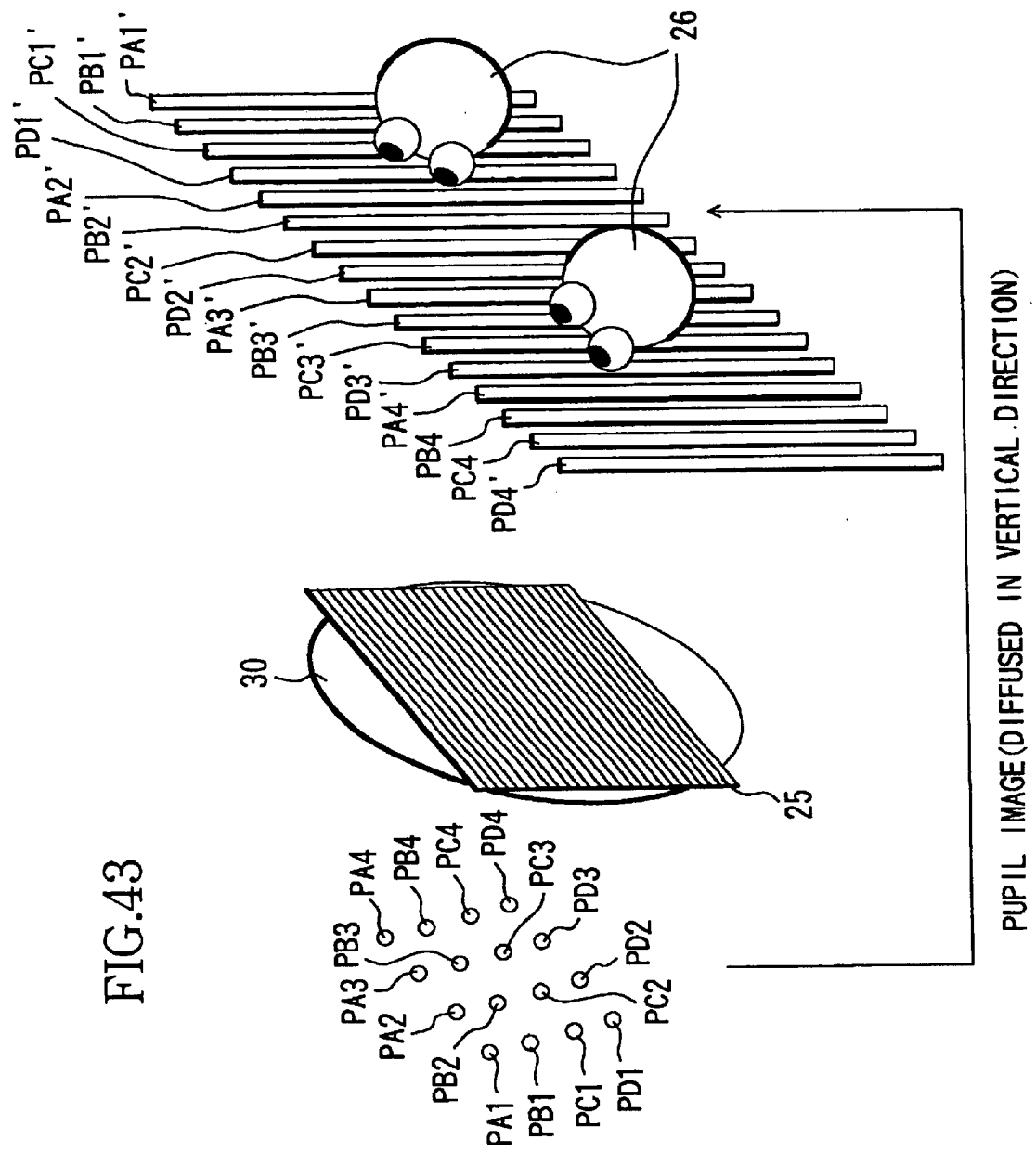
FIG. 43 is conceptual view showing convergence points formed by the deflection element array and observation areas in the stereoscopic image display apparatus of Embodiment 4.

FIG. 43 shows pupil image-formation provided by the arrangement of the convergence points as shown in FIG. 39 and the actions of the relay optical system 30 and the diffusion member 25.

The convergence point PA of the deflection element A1 forms an image in the image-forming area PA1' by the action of the relay optical system 30. Since the light beam emerging from the convergence point PA1 is diffused in the vertical direction by the action of the diffusion member 25, the image-forming area PA1' has a vertically elongated shape as shown in FIG. 43. The convergence point PB1 of the deflection element B1 closest to the convergence point PA1 of the deflection element A1 in the horizontal direction forms an image in the image-forming area PB1' adjacent to the image-forming area PA1' by the action of the relay optical system 30. The image-forming area PB1' also has an elongated shape similarly to the image-forming area PA1'. The image-forming areas corresponding to the other convergence points also have a vertically elongated shape.

The convergence point PC1 of the deflection element C1 closest to the convergence point PB1 of the deflection element B1 in the horizontal direction forms an image in the image-forming area PC1' adjacent to the image-forming area PB1'. The convergence point PD1 of the deflection element D1 closest to the convergence point PC1 of the deflection element C1 in the horizontal direction forms an image in the image-forming area PD1' adjacent to the image-forming area PC1'. The convergence point PA2 of the deflection element A2 closest to the convergence point PD1 of the deflection element D1 in the horizontal direction other than the convergence point PC1 forms an image in the image-forming area PA2' adjacent to the image-forming area PD1'.

In this manner, a number of vertically elongated image-forming areas (that is, pupils) are arranged in the horizontal direction with substantially equal pitches. For example, when 100 deflection elements 24a are provided for the deflection element array 24, 100 image-forming areas are arranged in the horizontal direction.

Next, description is made for how a three-dimensional image is reproduced in Embodiment 4. As described above, two-dimensional images can be formed on the diffusion member 25 by deflecting and scanning the light beam with the individual convergence points as the centers of deflection and temporally modulating the intensity of the light beam. In this event, as seen from FIG. 43, to observe the entire two-dimensional image formed on the diffusion member 25 by the light beam deflected and scanned with the convergence point PA1 as the center, the observer 26 must look toward the diffusion member 25 as his eye on the observation area (pupil) PA1'. The observer 26 cannot see the image from any other observation area.

Similarly, to observe the entire two-dimensional image formed on the diffusion member 25 from a light beam deflected and scanned with another convergence point as the center, the observer 26 must look toward the diffusion member 25 with his eye on the corresponding observation area. In other words, all the positions where the observer can see a plural different two-dimensional images are present independently in the horizontal direction. This is the property which can be used for reproducing a three-dimensional image.

Figure 44:
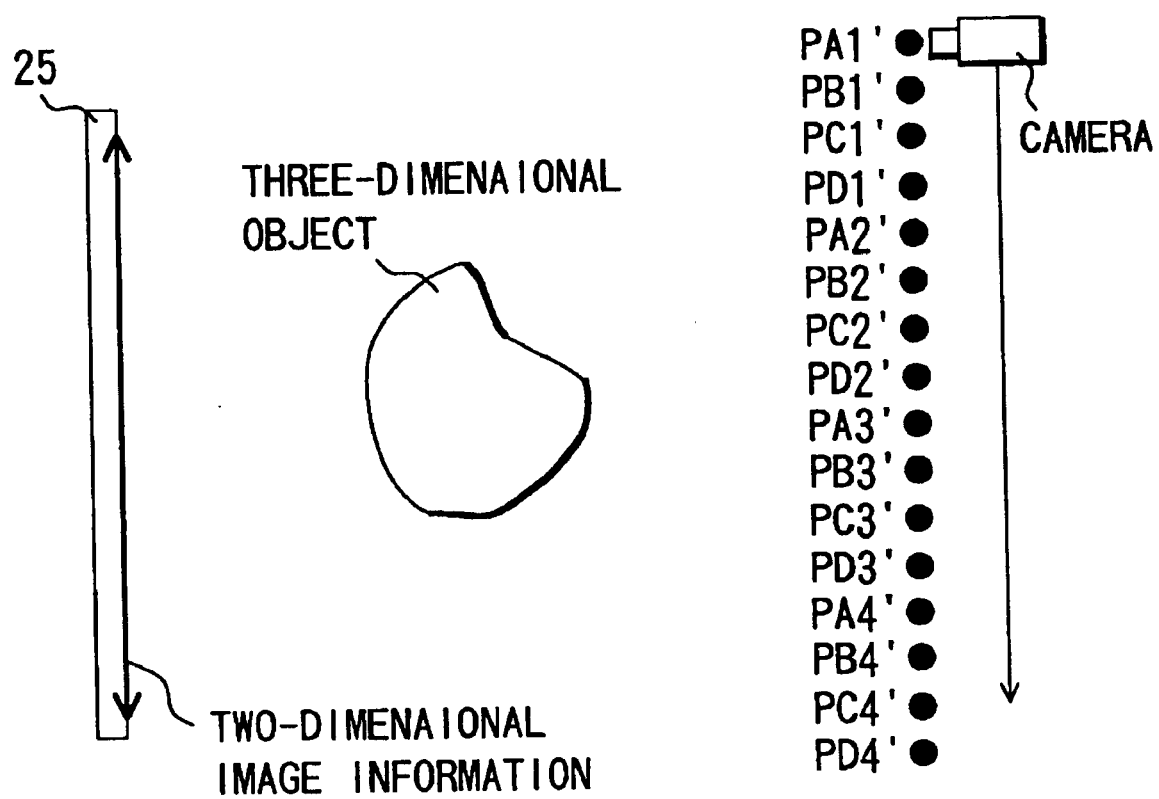
FIG. 44 is a schematic diagram showing how parallax images are taken for display by the stereoscopic image display apparatus of Embodiment 4.

For example, as shown in FIG. 44, a camera which moves through viewpoints PA1', PB1' and the like may take images of a three-dimensional object to form a set of parallax images associated with the respective viewpoints. The images are used as two-dimensional images formed on the diffusion member 25 by the light beam. The information on the plural parallax images taken by the camera are stored in the aforementioned image information supply apparatus 31 and supplied to the modulation circuit 21c of the beam scanning unit 21 at predetermined timings. The modulation circuit 21c modulates the light beam emitted from the light source 21a to display different parallax images based on an image signal indicating the parallax image information input from the image information supply apparatus 31 every time one deflection element 24a through which the light beam passes is changed to the next.

The parallax image taken at the viewpoint PA1' is used as an image formed by light beam scanning with the convergence point PA1 as the center, and the parallax image taken at the viewpoint PB1' is used as an image formed by light beam scanning with the convergence point PB1 as the center. In this manner, the intensity of a light beam is modulated to form a parallax image associated with each viewpoint.

Since each parallax image can be observed only from the corresponding observation area, the parallax images can be displayed separately corresponding to the observation areas to provide stereoscopic vision for the observer 26 with the effect of binocular parallax. However, this is achieved on the precondition that the scanning and modulation of the light beam are performed at very high speed and the display of the parallax images is performed fast enough to allow the eyes of the observer to recognize no flicker.

In addition, if the distance between the adjacent observation areas is smaller than the pupil diameter of the observer, the "stereoscopic display of super-multiview regions" is enabled. In this case, the focal point adjusted in the eyes of the observer is brought near the three-dimensional image to reduce fatigue and irritation of the observer. To satisfy the condition, in Embodiment 4, the optical system is optimized such that the horizontal width of each observation area is equal to or smaller than 2 mm based on a typical pupil diameter of an observer, and the distance between the adjacent observation areas is also equal to or smaller than 2 mm.

Figure 54:
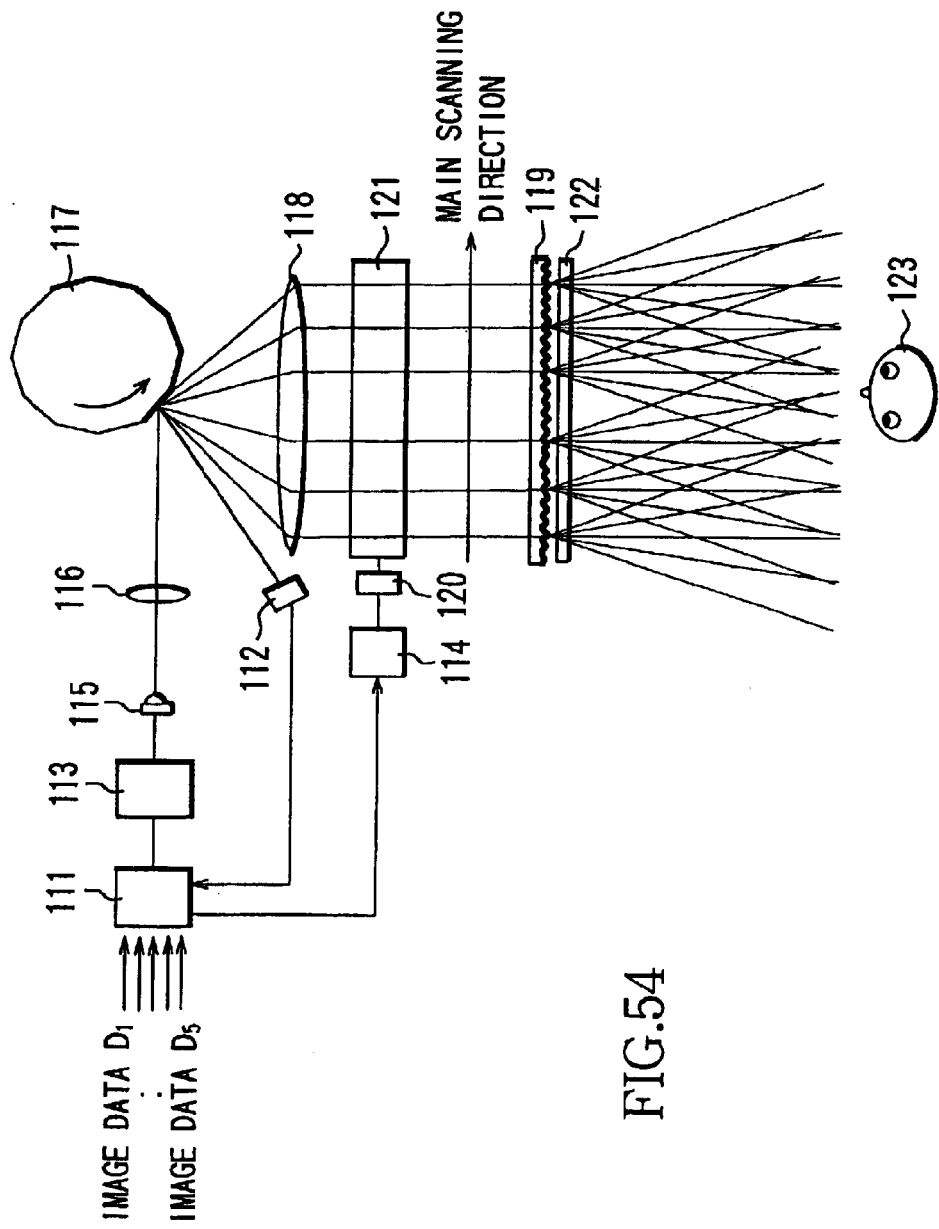
FIG. 54 is an explanatory view showing a conventional stereoscopic image display apparatus.
Figure 55:
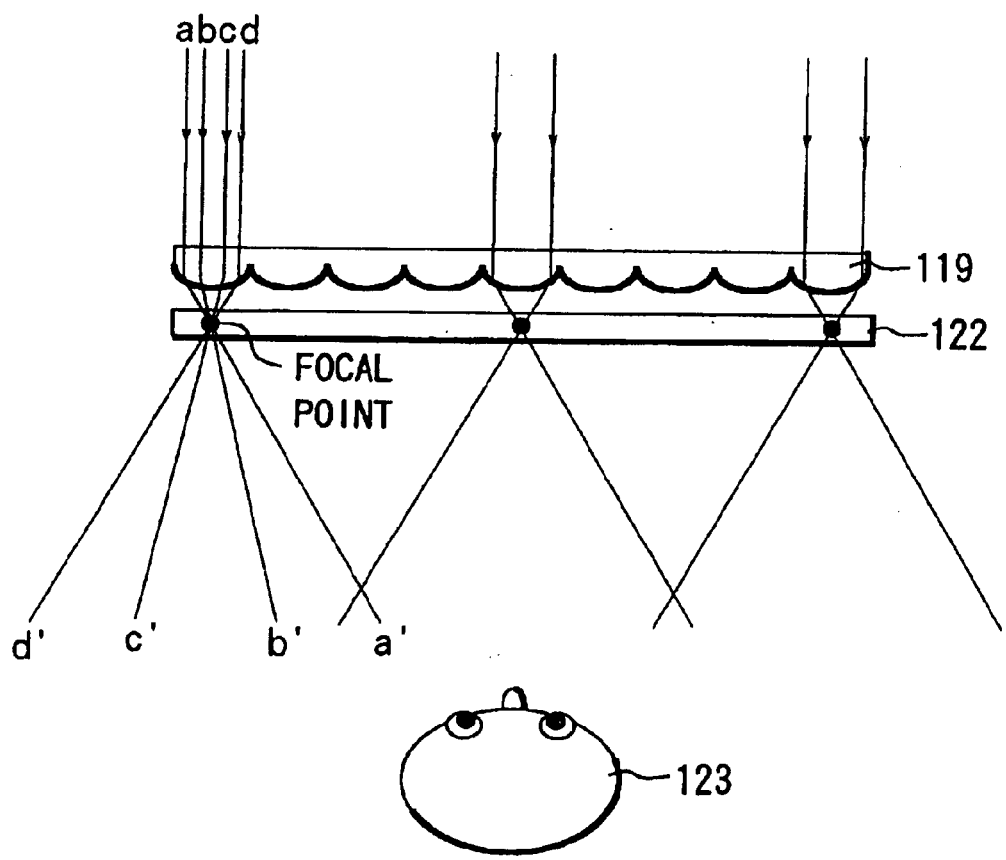
FIG. 55 shows optical effects of the stereoscopic image display apparatus in FIG. 54.

As described above, when a higher resolution of an image is intended in performing the stereoscopic display of "super-multiview regions" in the conventional stereoscopic image display apparatus (see FIG. 54), it is necessary to provide a smaller pitch in the cylindrical lens array 119. However, this increases the diameter of the light beam after it passes through the focal point FP as shown in FIG. 56 to result in its horizontal width larger than the single eye of the observer at the observation position, thereby making it impossible to achieve the stereoscopic display of "super-multiview regions."

According to the stereoscopic image display apparatus of Embodiment 4, however, such a problem can be solved. In Embodiment 4, as shown in FIG. 39, the deflection elements 24a are arranged separately in both of the horizontal and vertical directions in the deflection element array 24 to form 16 observation areas, the number (16) being larger than the number (4) of the deflection elements 24a arranged in the horizontal direction. This arrangement can ensure a large number of the observation areas, and in addition, one deflection element 24a can have a large width in the horizontal direction (that is, the horizontal pitch of the deflection elements 24a).

For example, when 100 deflection elements are disposed in a deflection element array with a horizontal width of 100 mm to form 100 convergence points, the horizontal width of each deflection element is equal to 1 mm in the conventional method. According to Embodiment 4, however, 10 deflection elements 24a are provided in the horizontal direction and 10 stages (rows) of the deflection elements 24a are provided in the vertical direction. Thus, each deflection element 24a can have a horizontal width of 10 mm.

When the deflection element 24a is formed of, for example a convex lens, the size of the deflection element 24 can be increased for the diameter of a light beam to avoid the disadvantage as shown in FIG. 56.

Embodiment 4 has been described on the precondition that all the convergence points PA1, PB1, and the like form images in the air as the pupils in the observation areas PA1', PB1' and the like. However, for performing the stereoscopic display of super-multiview regions, a three-dimensional display can be reproduced even when the pupil image-formation is not achieved, as long as a light beam is incident on the pupil of an observer with its directivity maintained and with no divergence in the horizontal direction, and several light beams after they pass through the convergence points are incident on a single eye of the observer. This is hereinafter described with reference to FIGS. 45 and 46.

Figure 45:
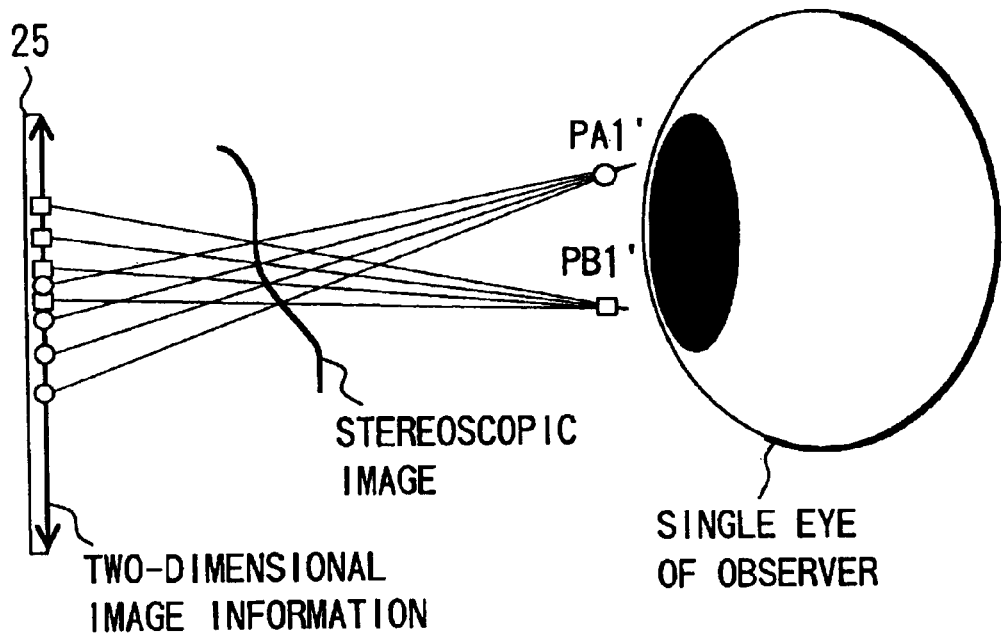
FIG. 45 is a schematic diagram showing image-formation of light beams from light convergence points in the observation areas in Embodiment 4.

FIG. 45 shows how a three-dimensional image is reproduced when light beams from light convergence points form images as pupils in observation areas. Light beams (which are not diffused in the horizontal direction and are diffused in the vertical direction) after they form two-dimensional images convergently reach the observation areas PA1' and PB1'. As shown in FIG. 45, a three-dimensional image reproduced in this event is expressed as a set of intersections of light beams in plane (recognizable by the observer as intersections with the effect of persistence of vision since the light beams arrive with a time difference). As described above, the distance between the observation areas PA1' and PB1' is sufficiently small and equal to or smaller than the pupil diameter of the observer, so that the observer can recognize these intersections only with his single eye.

Figure 46:
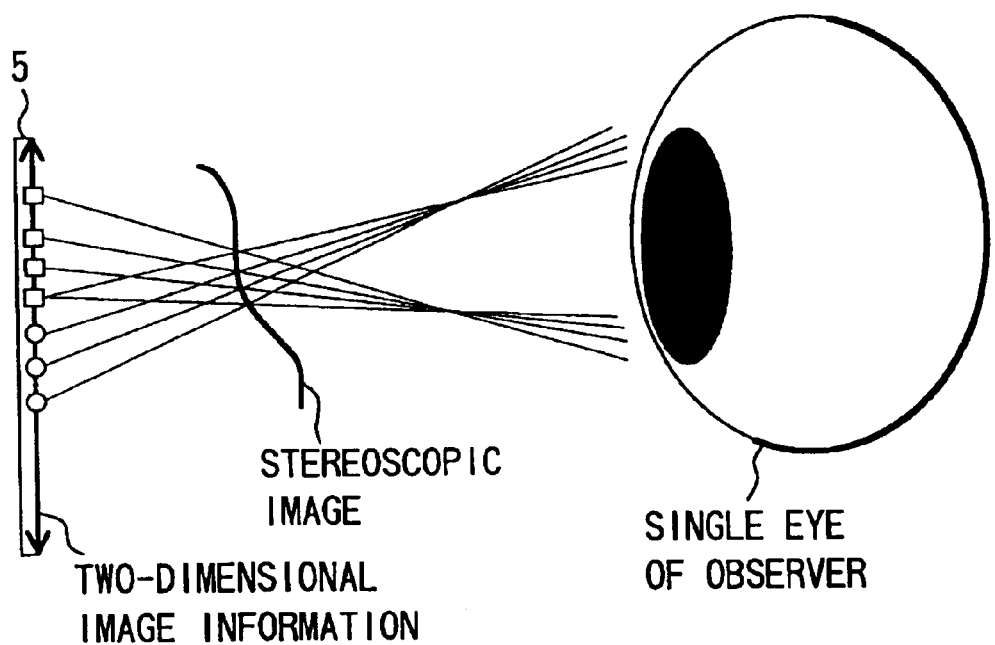
FIG. 46 is a schematic diagram showing failure of light beams from light convergence points to form images in the observation areas in Embodiment 4.

On the other hand, FIG. 46 shows how a three-dimensional image is reproduced when light beams from light convergence points do not form images as pupils in observation areas. Aberration of the relay optical system 30 is a cause of such failure to form images. However, intersections of light beams can be formed accurately at the position of a three-dimensional image as shown in FIG. 46 if only the emerging directions of the light beams after formation of two-dimensional images are defined correctly. While the two-dimensional images in this case are different from those in FIG. 45, proper two-dimensional images can be formed if the light beams passing through the relay optical system 30 are set as appropriate.

When a plurality of light beams after the formation of the intersections is incident on the single eye of the observer, the observer can recognize these intersections only with a single eye. In other words, even if the image at the convergence point does not correctly form an image as the pupil, the observer can recognize a three-dimensional image of super-multiview regions when the light beams are incident on the pupil of the observer with no divergence in the horizontal direction and with directivity maintained, and the plurality of light beams after the intersections is formed are incident on a single eye of the observer.

Embodiment 4 has been described for the case where the parallax images are formed by the input from the moving camera taking the images at a number of viewpoints as shown in FIG. 44. However, a plurality of cameras disposed at the respective viewpoints may be used to input a plurality of two-dimensional images with parallax simultaneously, computer graphics may be utilized to artificially take a plurality of two-dimensional images with parallax by a virtual camera.

Figure 47:
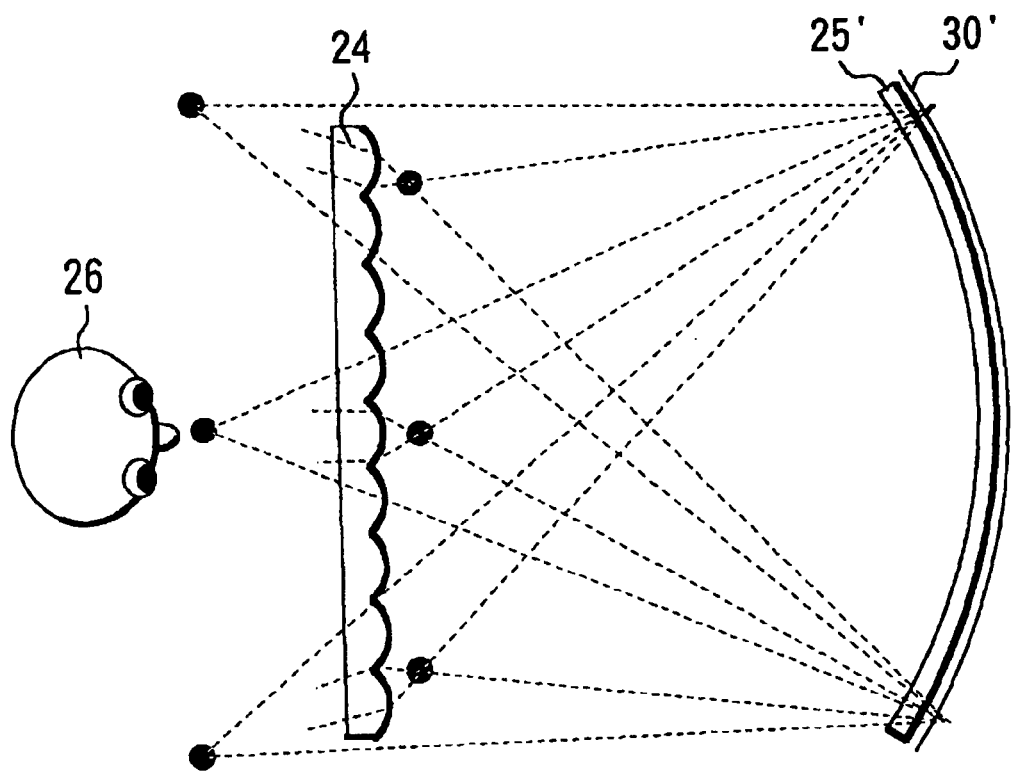
FIG. 47 is a schematic diagram showing a variation of the stereoscopic image display apparatus of Embodiment 4.

Next, possible changes in the components of Embodiment 4 are described. First, the relay optical system 30 can be formed of a convex lens in Embodiment 4, but a reflection optical system such as a concave mirror 30' may be used as shown in FIG. 47. In this case, a diffusion member 25' is formed into a curved shape along the concave mirror 30'. In FIG. 47, the members and the optical paths on the side of the field optical system 23 closer to the light source are omitted.

Figure 48:
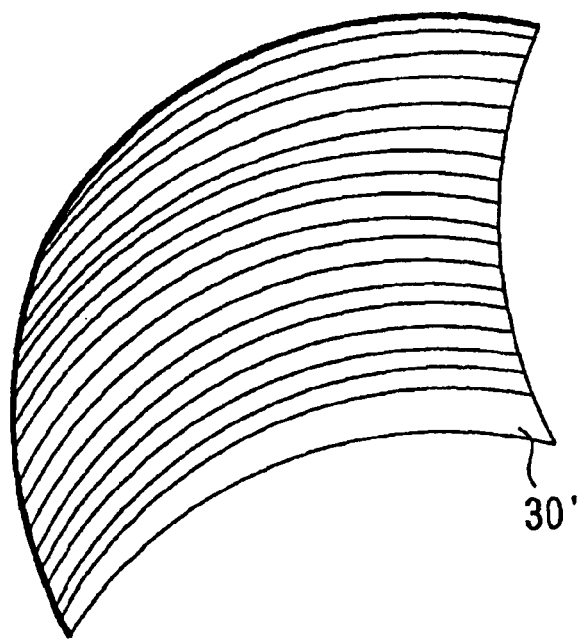
FIG. 48 shows an optical member used in the variation in FIG. 47.

In this case, however, if the diffusion member 25' is disposed in front of the concave mirror 30', a light beam pass through the diffusion member 25' twice to produce image blurring. Thus, as shown in FIG. 48, it is desirable to diffuse the light beam in the vertical direction on the surface of the concave mirror 30' by forming fine projections and depressions in the vertical direction on the surface of the concave mirror 30' or a lenticular periodic structure.

Since the use of the reflection type optical element tends to cause interference between the area where a reproduced three-dimensional image is formed and the area where the component such as the light beam scanning unit 21 is disposed, it is desirable to employ optical arrangement decentered in the vertical direction such as a front projector system.

Figure 49:
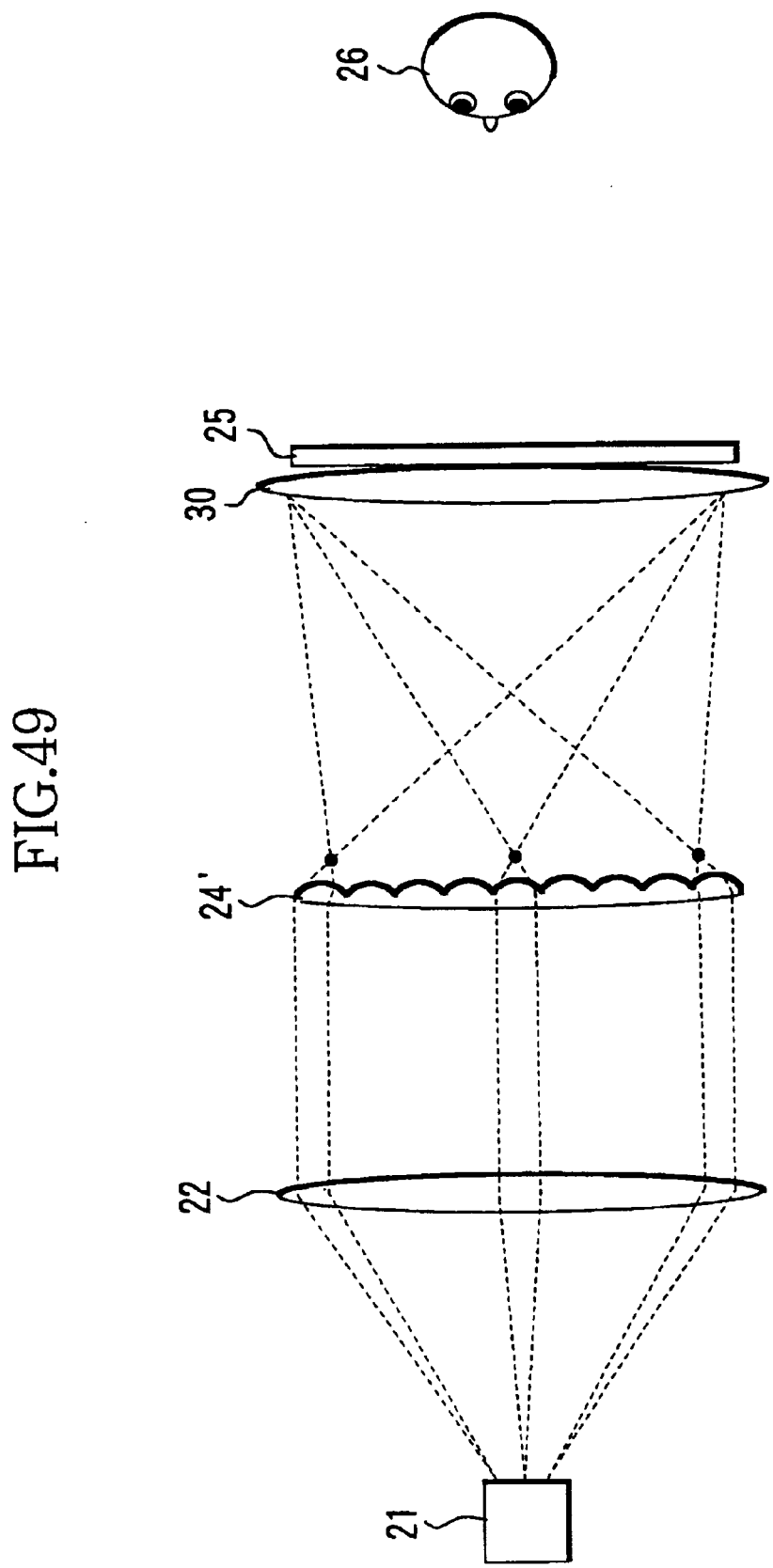
FIG. 49 shows another variation of Embodiment 4.

In addition, several variations of the deflection element array 24 are possible. For example, as shown in FIG. 49, it is possible to use a hybrid deflection element array 24' which is formed of the field optical system 23 and the deflection element array 24 in Embodiment 4 as an integral component. The use of the hybrid deflection element array 24' can reduce the number of the parts to enhance the accuracy of positioning at the time of assembling.

Figure 50:
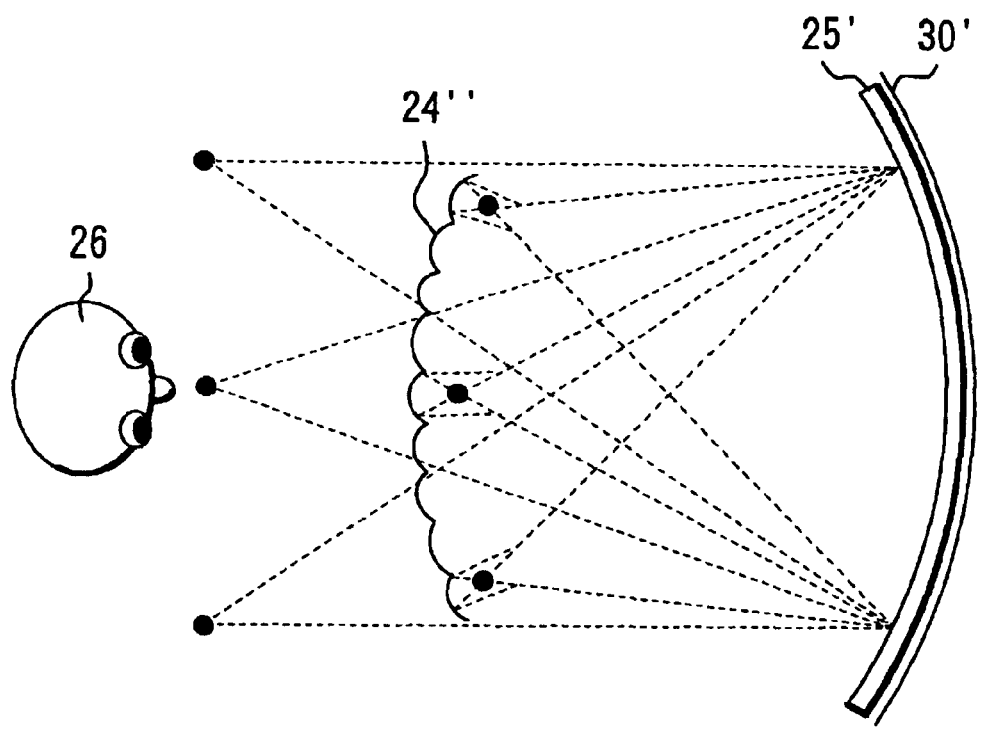
FIG. 50 shows yet another variation of Embodiment 4.
Figure 51:
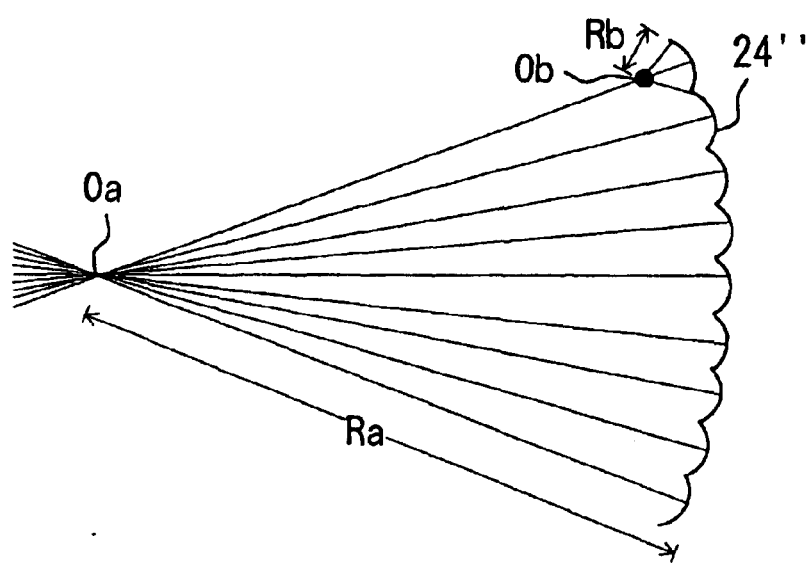
FIG. 51 shows a deflection element array used in the variation in FIG. 50.
Figure 52:
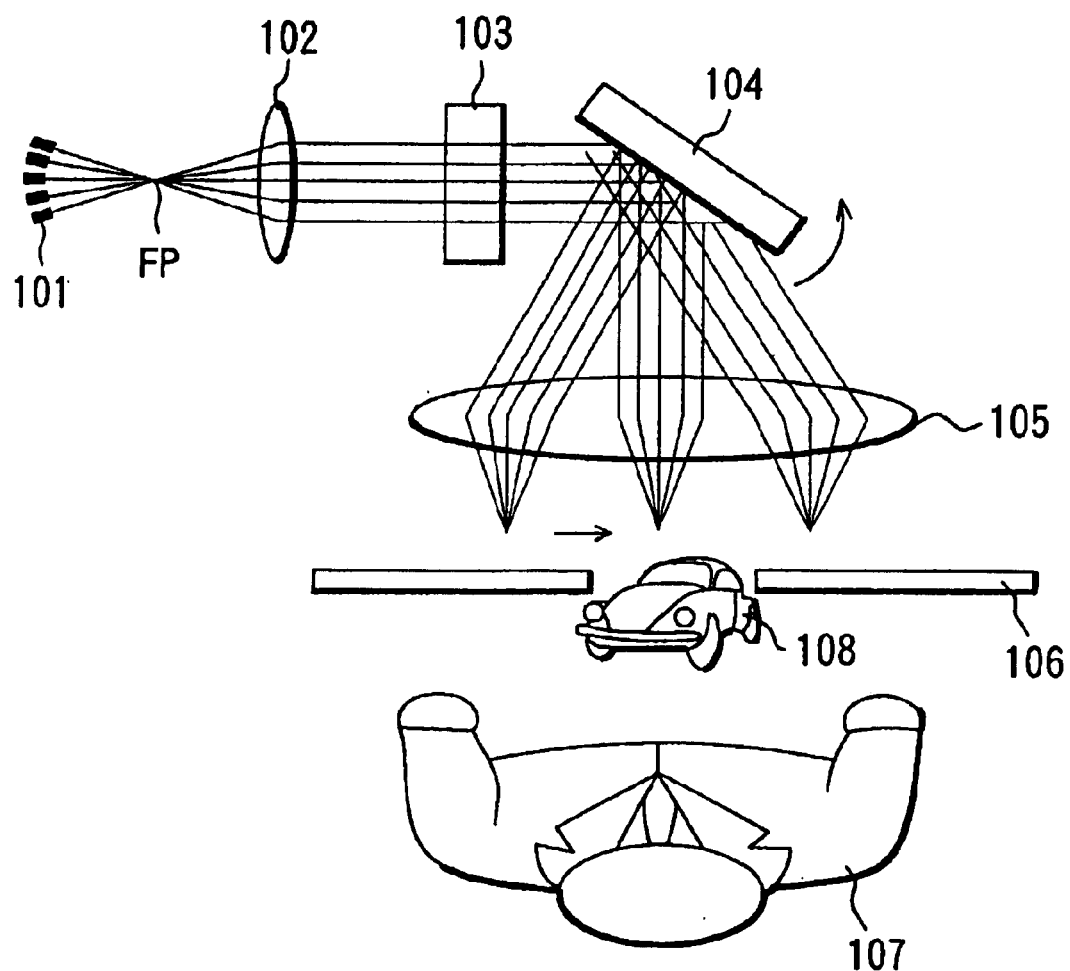
FIG. 52 is an explanatory view showing a conventional stereoscopic image display apparatus.

Furthermore, the deflection element array 24 may be formed of a reflection optical element such as a concave mirror. In this case, a concave mirror array is used as shown in FIG. 41. The concave mirror array can serve as the field optical system 23 as an integral optical member. In this case, a composite concave mirror array 24" formed by providing the concave mirror array with a concave shape as a whole is used as shown in FIG. 50. The composite concave mirror array 24" is formed by combining a concave mirror having a radius Ra with a center of curvature Oa as the center and a concave mirror having a radius Rb (<Ra) with a center of curvature Ob as the center as shown in FIG. 51, by way of example.

The use of the transmission type optical system causes the resulting apparatus to be increased in size due to a larger thickness of the optical system and the like when an increased size of a reproduced three-dimensional image is intended. However, the use of the aforementioned reflection optical system allows an increase in size of a reproduced three-dimensional image while the resulting apparatus can be reduced in size. In addition, chromatic aberration can be prevented by using the reflection optical system.

While Embodiment 4 has been described for the case where a monochrome light beam is used for scanning to form a monochrome image, a full color image can be formed by performing scanning with light beams of three colors R, G, and B.

As described above, according to Embodiment 4, it is possible to provide an increased number of the positions where a three-dimensional image can be observed (the observation positions) with a minimized number of light sources. For reproducing two-dimensional images (that is, for reproducing three-dimensional image) associated with a number of viewpoints with the light source, the observation viewpoints can be multiplexed with suppressed deformation of the beam light emitted from the light source and improved resolution.

In addition, since the light convergence points formed by each deflection element row are at the horizontally shifted positions from the light convergence points formed by the other deflection element rows by the amount smaller than the pitch of the light convergence points in the horizontal direction, so that the horizontal pitch of the convergence points corresponding to pixels can be finely set to increase resolution in the horizontal direction of the three-dimensional image. It is thus possible to achieve "super-multiview regions" three-dimensional image.

While preferred embodiments have been described, it is to be understood that modification and variation of the present invention may be made without departing from the scope of the following claims.

What is claimed is:

1. A stereoscopic image display apparatus comprising:
   a light source unit which modulates and emits a light beam having directivity;
   a light deflection member which comprises a deflection element deflecting the light beam from the light source unit to form a convergence point; and
   a beam scanning device which two-dimensionally scans the light beam from the light source unit with respect to a predetermined portion of the light deflection member, wherein the light deflection member is movable in a plane in which the light deflection member is disposed, and the movement of the light deflection member is performed in synchronization with the modulation of the light beam by the light source unit and the scanning of the light beam by the light beam scanning device.

2. The stereoscopic image display apparatus according to claim 1, wherein the light deflection member is movable in a horizontal direction.

3. The stereoscopic image display apparatus according to claim 2, wherein the light deflection member is formed of a plurality of the deflection elements arranged in the horizontal direction.

4. The stereoscopic image display apparatus according to claim 1, wherein the light deflection member is formed of a plurality of the deflection elements stacked one on another in a vertical direction, the deflection elements are shifted horizontally with one another by a predetermined rate, and the light deflection member is movable in the vertical direction.

5. The stereoscopic image display apparatus according to claim 1, further comprising a relay optical system which makes the light beam that has passed through a plurality of the convergence points, form plural image-forming points,
wherein a distance between the image-forming points adjacent to each other is equal to or smaller than a pupil diameter of an observer.

6. The stereoscopic image display apparatus according to claim 1, further comprising a relay optical system which makes the light beam that has passed through a plurality of the the convergence points, form images,
wherein, at a position of an eyeball of an observer, a distance between the light beams emerged from the relay optical system and adjacent to each other is equal to or smaller than a pupil diameter of the observer.

7. The stereoscopic image display apparatus according to claim 1, further comprising a relay optical system which makes the light beam that has passed through the convergence point, form an image, and a diffusion member which diffuses the light beam only in a vertical direction is disposed closer to an observer than the relay optical system.

8. The stereoscopic image display apparatus according to claim 1, further comprising a field optical system which is disposed between the beam scanning device and the light deflection member.

9. The stereoscopic image display apparatus according to claim 1, wherein the deflection element is a convex lens.

10. The stereoscopic image display apparatus according to claim 1, wherein the deflection element is concave mirror.

11. The stereoscopic image display apparatus according to claim 1, wherein the deflection element is a diffraction optical element.

12. A stereoscopic image display apparatus comprising:
a light source unit which modulates and emits a light beam having directivity;
a light deflection member which comprises a deflection element deflecting the light beam from the light source unit to form a convergence point;
a relay optical system which makes the light beam that has passed through the convergence point, form an image;
a first beam scanning device which horizontally scans the light beam from the light source unit with respect to the light deflection member; and
a second beam scanning device which vertically scans the light beam from the light deflection member with respect to the relay optical system,
wherein the light deflection member is movable in a plane in which the light deflection member is disposed, and the movement of the light deflection member is performed in synchronization with the modulation of the light beam by the light source unit and the scanning of the light beam by the first and second beam scanning devices.

13. The stereoscopic image display apparatus according to claim 12, wherein the light deflection member is movable in a horizontal direction.

14. The stereoscopic image display apparatus according to claim 13, wherein the light deflection member is formed of a plurality of the deflection elements arranged in the horizontal direction.

15. The stereoscopic image display apparatus according to claim 12, wherein the light deflection member is formed of a plurality of the deflection elements stacked one on another in a vertical direction, the deflection elements are shifted horizontally with one another by a predetermined rate, and the light deflection member is movable in the vertical direction.

16. The stereoscopic image display apparatus according to claim 15, wherein the deflection element has an optical power only in a horizontal direction.

17. The stereoscopic image display apparatus according to claim 12, wherein the relay optical system makes the light beam that has passed through a plurality of the convergence points, form plural image-forming points, and a distance between the image-forming points adjacent to each other is equal to or smaller than a pupil diameter of an observer.

18. The stereoscopic image display apparatus according to claim 12, wherein the relay optical system makes the light beam that has passed through a plurality of the convergence points, form images, and at a position of an eyeball of an observer, a distance between the light beams emerged from the relay optical system and adjacent to each other is equal to or smaller than a pupil diameter of the observer.

19. The stereoscopic image display apparatus according to claim 12, further comprising a diffusion member which diffuses light only in a vertical direction is disposed closer to an observer than the relay optical system.

20. The stereoscopic image display apparatus according to claim 12, further comprising a field optical system which is disposed between the beam scanning devices and the light deflection member.

21. The stereoscopic image display apparatus according to claim 12, wherein the deflection element is a convex lens.

22. The stereoscopic image display apparatus according to claim 12, wherein the deflection element is concave mirror.

23. The stereoscopic image display apparatus according to claim 12, wherein the deflection element is a diffraction optical element.

24. A stereoscopic image display apparatus comprising:
a light source unit which modulates and emits a light beam having directivity;
a light deflection member which comprises a plurality of deflection elements, each of which deflects the light beam from the light source unit to form a convergence point; and
a beam scanning device which two-dimensionally scans the light beam from the light source unit with respect to a predetermined portion of the light deflection member,
wherein the plurality of deflection elements are arranged in the light deflection member such that the number of the convergence points formed in a horizontal direction is larger than the number of the deflection elements arranged in the horizontal direction.

25. The stereoscopic image display apparatus according to claim 24, wherein, in the light deflection member, a plurality of the deflection elements are arranged as a row in the horizontal direction, a plurality of the row are provided in a vertical direction, and the convergence points formed by each of the deflection element rows are horizontally shifted with the convergence points formed by the other deflection element rows.

26. The stereoscopic image display apparatus according to claim 25, wherein the convergence points formed by each of the deflection element rows are horizontally shifted with the convergence points formed by the other deflection element rows by an amount smaller than a pitch of the convergence points in the horizontal direction.

27. The stereoscopic image display apparatus according to claim 25, wherein each of the deflection element rows is horizontally shifted with the other deflection element rows.

28. The stereoscopic image display apparatus according to claim 24, wherein the deflection element is a convex lens.

29. The stereoscopic image display apparatus according to claim 24, wherein the deflection element is concave mirror.

30. The stereoscopic image display apparatus according to claim 24, wherein the deflection element is a diffraction optical element.

31. The stereoscopic image display apparatus according to claim 24, further comprising a relay optical system which makes the light beam that has passed through the convergence point, form an image.

32. The stereoscopic image display apparatus according to claim 24, further comprising a diffusion member which diffuses the light beam from each of the convergence points in a vertical direction.

33. A stereoscopic image display system comprising:
the stereoscopic image display apparatus according to claim 1; and
an image information supply apparatus which supplies image information for modulating the light beam emitted from the light source unit to the stereoscopic image display apparatus.

34. A stereoscopic image display system comprising:
the stereoscopic image display apparatus according to claim 12; and
an image information supply device which supplies image information for modulating the light beam emitted from the light source unit to the stereoscopic image display apparatus.

35. A stereoscopic image display system comprising:
the stereoscopic image display apparatus according to claim 24; and
an image information supply apparatus which supplies image information for modulating the light beam emitted from the light source unit to the stereoscopic image display apparatus.

* * * * *